US011323621B2

(12) United States Patent
Aikawa et al.

(10) Patent No.: US 11,323,621 B2
(45) Date of Patent: May 3, 2022

(54) IMAGE COMMUNICATION SYSTEM, IMAGE CAPTURING DEVICE, COMMUNICATION TERMINAL, AND MODE SWITCHING METHOD

(71) Applicants: Tomonori Aikawa, Kanagawa (JP); Kenichiro Morita, Tokyo (JP); Hidekuni Annaka, Saitama (JP); Takeshi Homma, Kanagawa (JP); Takuya Soneda, Kanagawa (JP); Hideki Shiro, Kanagawa (JP); Takafumi Takeda, Tokyo (JP)

(72) Inventors: Tomonori Aikawa, Kanagawa (JP); Kenichiro Morita, Tokyo (JP); Hidekuni Annaka, Saitama (JP); Takeshi Homma, Kanagawa (JP); Takuya Soneda, Kanagawa (JP); Hideki Shiro, Kanagawa (JP); Takafumi Takeda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/785,661

(22) Filed: Feb. 10, 2020

(65) Prior Publication Data
US 2020/0296284 A1 Sep. 17, 2020

(30) Foreign Application Priority Data

Mar. 11, 2019 (JP) .............................. JP2019-044187

(51) Int. Cl.
H04N 5/232 (2006.01)
(52) U.S. Cl.
CPC ..... H04N 5/23245 (2013.01); H04N 5/23227 (2018.08); H04N 5/23296 (2013.01); H04N 5/23299 (2018.08)

(58) Field of Classification Search
CPC .......... H04N 5/23245; H04N 5/23227; H04N 5/23299; H04N 5/23296; H04N 7/147;
(Continued)

(56) References Cited

U.S. PATENT DOCUMENTS 7,161,632 B2 * 1/2007 Sudo ...................... H04N 7/152
348/565
10,764,513 B2 * 9/2020 Ohmura ................. H04N 5/272
(Continued)

FOREIGN PATENT DOCUMENTS

JP 2011-223076 11/2011
JP 2012-178135 9/2012

OTHER PUBLICATIONS

U.S. Appl. No. 16/519,216, filed Jul. 23, 2019, Yohhei Ohmura, et al.

Primary Examiner — James M Hannett
Assistant Examiner — Angel L Garces-Rivera
(74) Attorney, Agent, or Firm — Xsensus LLP

(57) ABSTRACT

An image communication system includes a first communication terminal and a second communication terminal. The first communication terminal acquires an image captured by an image capturing device. The second communication terminal receives the image from the first communication terminal via a network, and displays the image on a screen of a display. The first communication terminal includes first circuitry that, in response to receipt of an operation of switching a view mode related to viewing of the image, transmits the image and first viewable area information to the second communication terminal. The first viewable area information is related to a viewable area of the image to be displayed on the screen. The second communication terminal includes second circuitry that receives the image and the first viewable area information and displays the viewable
(Continued)

area of the image on the screen based on the first viewable area information.

16 Claims, 42 Drawing Sheets

(58) Field of Classification Search
CPC ............. H04N 5/2258; H04N 5/23293; H04N 5/23258; H04N 17/002; H04N 5/23238; H04N 5/23206
See application file for complete search history.

(56) References Cited

U.S. PATENT DOCUMENTS

| | | |
|---|---|---|
| 2018/0097682 A1 | 4/2018 | Yoshida et al. |
| 2018/0098105 A1 | 4/2018 | Morita et al. |
| 2018/0191787 A1 | 7/2018 | Morita et al. |
| 2018/0227457 A1 | 8/2018 | Morita et al. |
| 2019/0082144 A1 | 3/2019 | Hakata et al. |
| 2019/0098211 A1 | 3/2019 | Ohmura et al. |
| 2019/0098253 A1 | 3/2019 | Soneda et al. |
| 2019/0306004 A1 | 10/2019 | Hakata et al. |
| 2019/0306201 A1 | 10/2019 | Ohmura et al. |
| 2019/0306421 A1 | 10/2019 | Takeda et al. |
| 2019/0306458 A1 | 10/2019 | Soneda et al. |
| 2020/0296302 A1* | 9/2020 | Shiro .................. H04N 5/2621 |

* cited by examiner

FIG. 4A
FIG. 4B
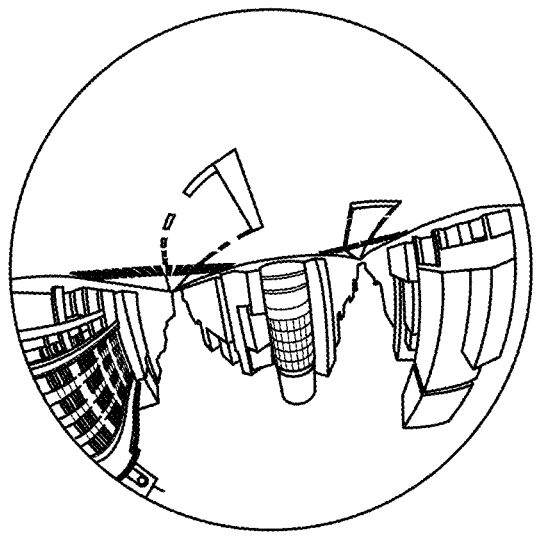
FIG. 4C
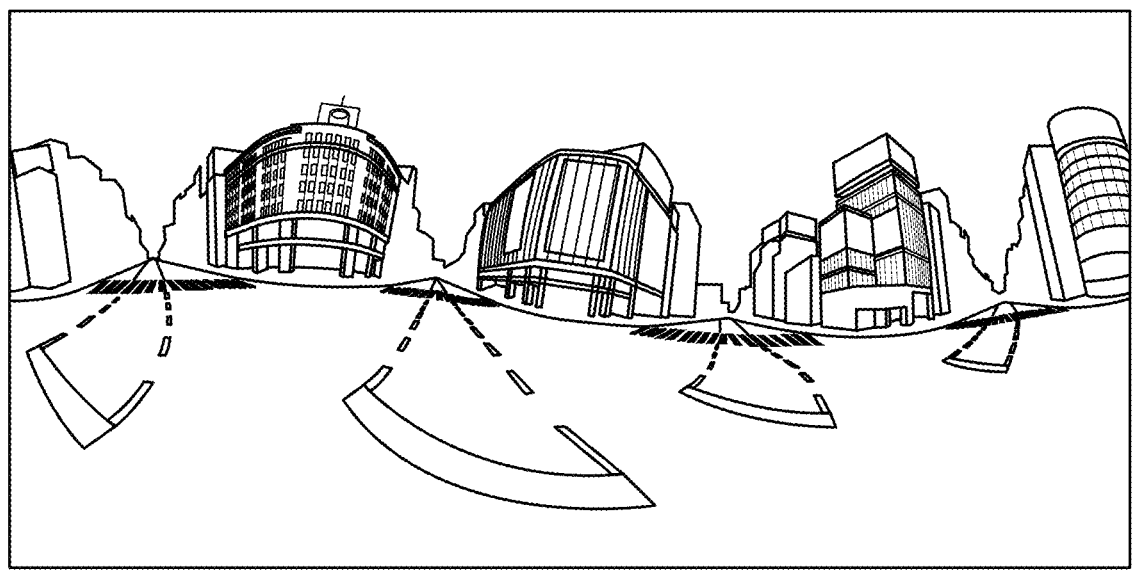

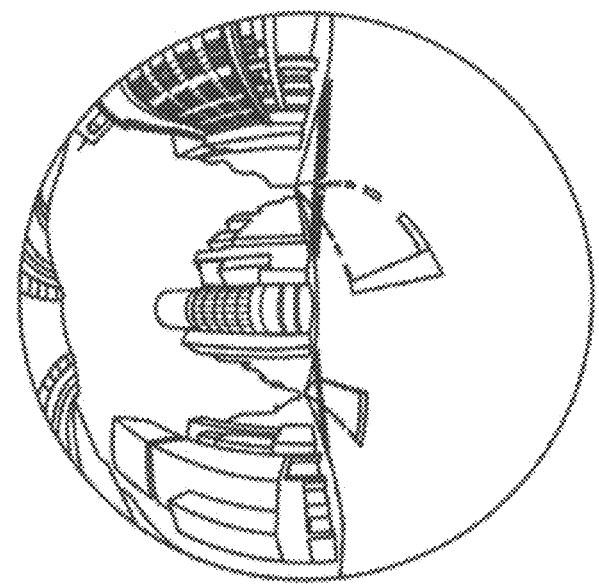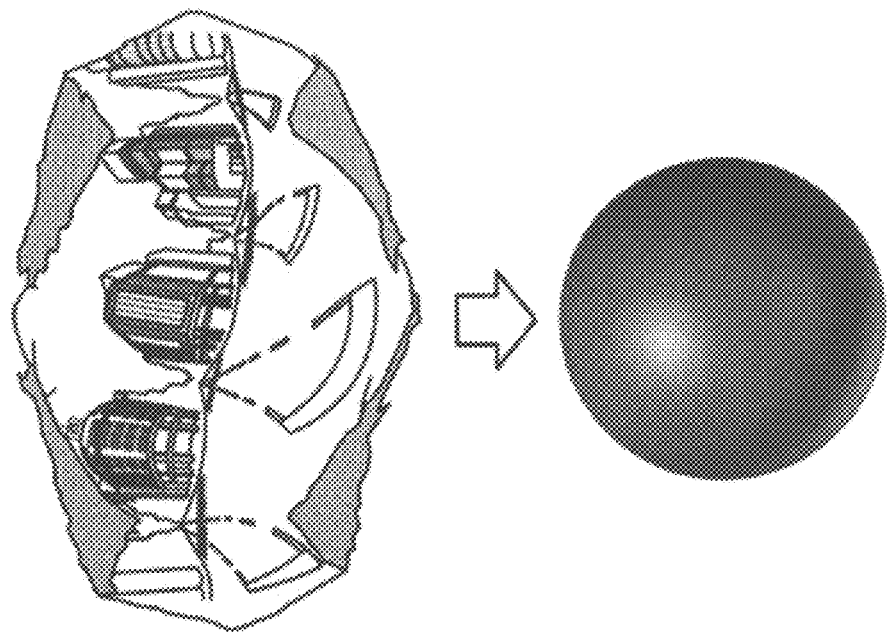

FIG. 15A
FIG. 15 | FIG. 15A |
|---------|---------|
|         | FIG. 15B|
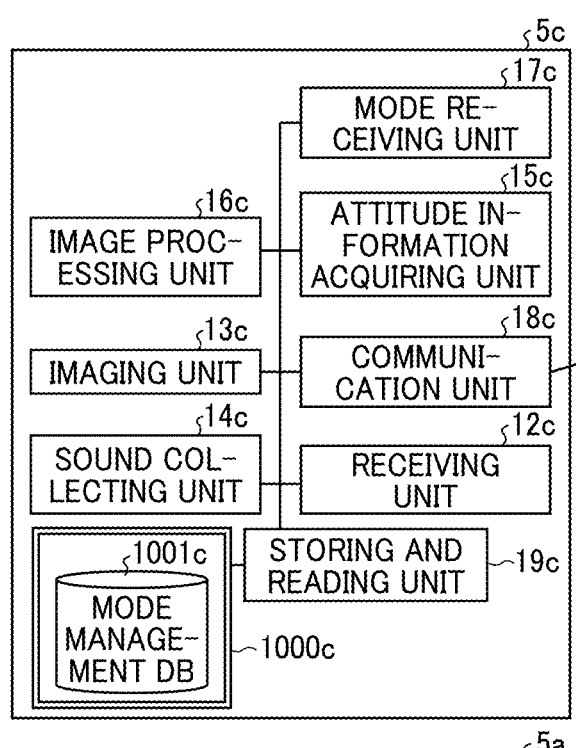
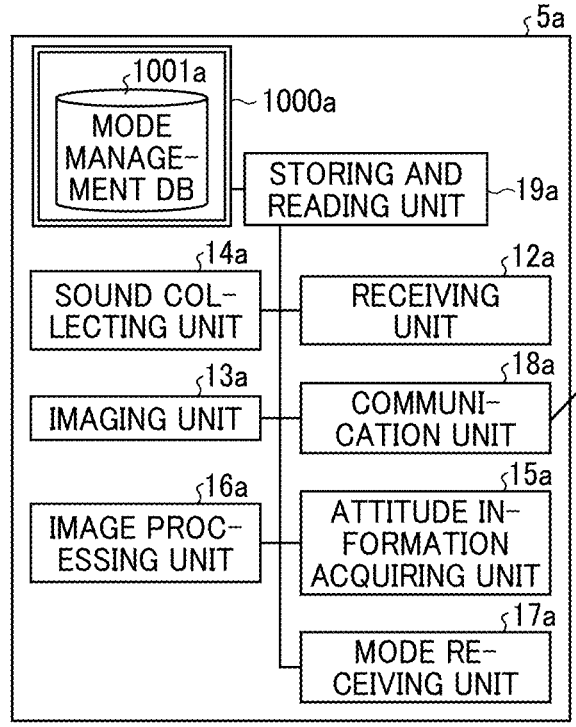

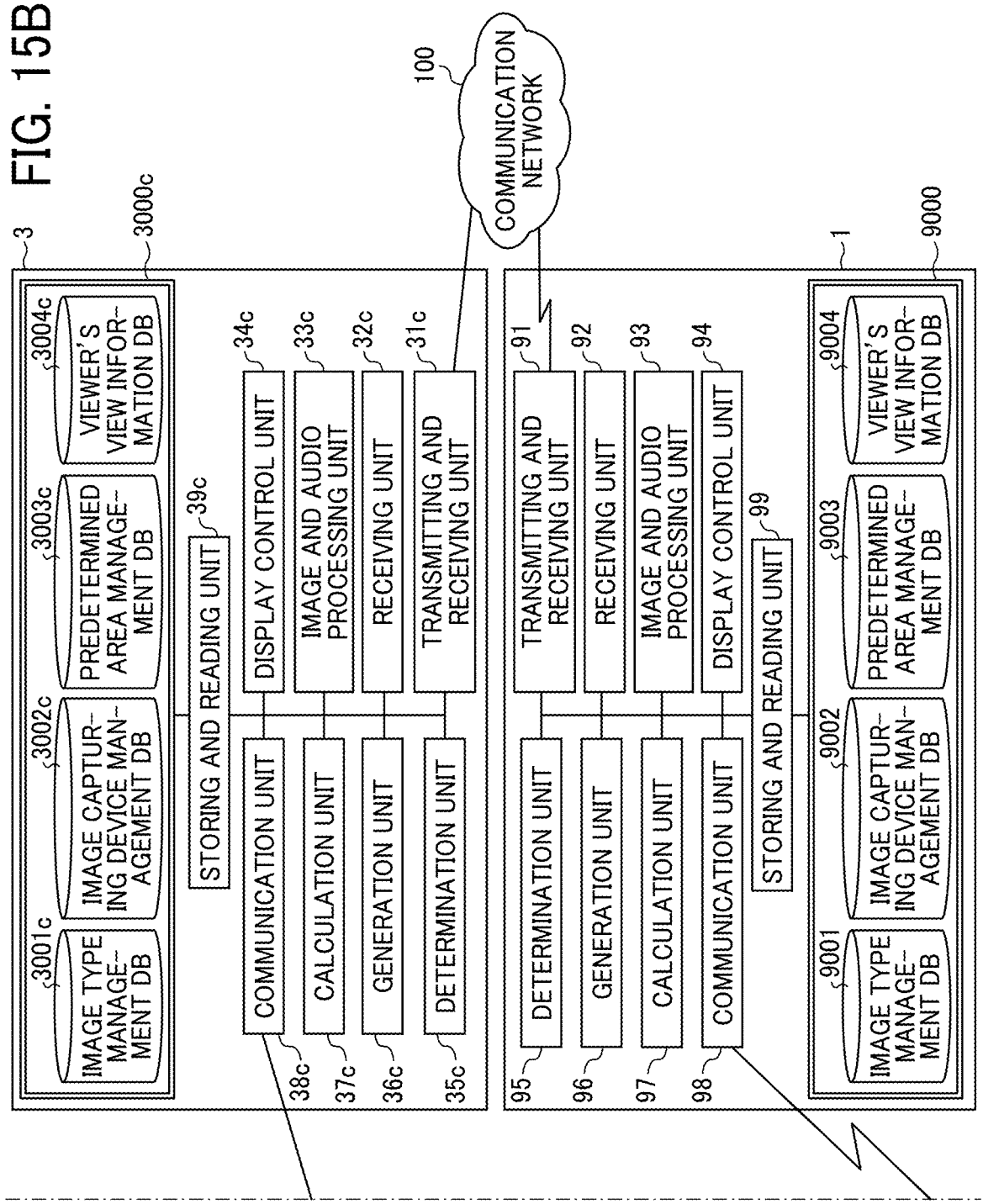

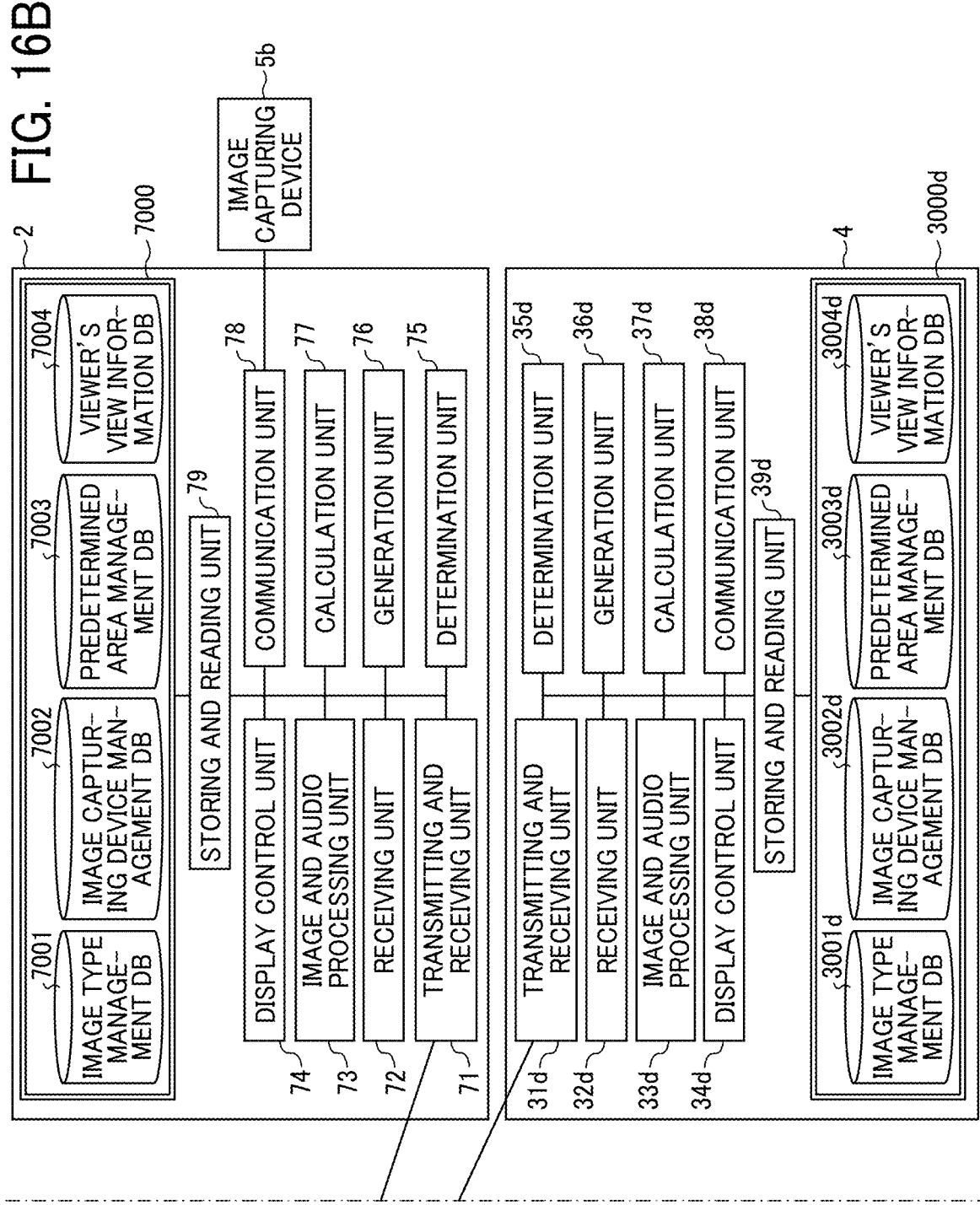

FIG. 17

| VIEW MODE |
|---|
| PHOTOGRAPHER'S VIEW MODE |

FIG. 18

| IMAGE DATA ID | IP ADDRESS OF TRANSMITTER TERMINAL | SOURCE NAME (IMAGE TYPE INFORMATION) |
|---|---|---|
| RS001 | 1.2.1.3 | Video_Wide |
| RS002 | 1.2.2.3 | Video_Wide |
| RS003 | 1.3.1.3 | Video |
| RS004 | 1.3.2.3 | Video |

FIG. 19

| VENDOR ID AND PRODUCT ID INCLUDED IN GUIDS OF IMAGE CAPTURING DEVICE |
|---|
| vid_05ca&pid_2711 |
| vid_05ca&pid_3822 |
| ... |

FIG. 20

| IP ADDRESS OF TERMINAL THAT TRANSMITS IMAGE | IP ADDRESS OF TERMINAL THAT RECEIVES IMAGE (TERMINAL THAT TRANSMITS PREDETERMINED AREA INFORMATION) | PREDETERMINED AREA INFORMATION | | |
|---|---|---|---|---|
| | | RADIUS VECTOR (r) | POLAR ANGLE (θ) | AZIMUTH (φ) |
| 1.2.1.3 | 1.2.2.3 | 10 | 20 | 30 |
| 1.2.1.3 | 1.3.1.3 | 20 | 30 | 40 |
| 1.2.1.3 | 1.3.2.3 | 30 | 40 | 50 |
| 1.2.2.3 | 1.2.1.3 | ⋮ | ⋮ | ⋮ |
| 1.2.2.3 | 1.3.1.3 | ⋮ | ⋮ | ⋮ |
| 1.2.2.3 | 1.3.2.3 | ⋮ | ⋮ | ⋮ |

FIG. 21

| VIEWER'S VIEW INFORMATION | | |
|---|---|---|
| RADIUS VECTOR ($r$) | POLAR ANGLE ($\theta$) | AZIMUTH ($\phi$) |
| 10 | 20 | 30 |

FIG. 22

| SESSION ID | IP ADDRESSES OF PARTICIPANT TERMINALS |
|---|---|
| se101 | 1.2.1.3, 1.2.2.3, 1.3.1.3 |
| se102 | 1.2.1.3, 1.2.2.3, 1.3.1.3 |
| ... | ... |

FIG. 23

| SESSION ID | IMAGE DATA ID | IP ADDRESS OF TRANSMITTER TERMINAL | SOURCE NAME (IMAGE TYPE INFORMATION) |
|---|---|---|---|
| se101 | RS001 | 1.2.1.3 | Video_Wide |
| se101 | RS002 | 1.2.2.3 | Video |
| se101 | RS003 | 1.3.1.3 | Video_Wide |
| se102 | RS004 | 1.2.1.4 | Video |
| se102 | RS005 | 1.3.1.4 | Video_Wide |
| ... | ... | ... | ... |

FIG. 24

| IP ADDRESS OF TERMINAL THAT TRANSMITS IMAGE | IP ADDRESS OF TERMINAL THAT RECEIVES IMAGE | PREDETERMINED AREA INFORMATION | | |
|---|---|---|---|---|
| | | RADIUS VECTOR (r) | POLAR ANGLE (θ) | AZIMUTH (φ) |
| 1.2.1.3 | 1.2.2.3 | 10 | 20 | 30 |
| 1.2.1.3 | 1.3.1.3 | 20 | 30 | 40 |
| 1.2.1.3 | 1.3.2.3 | ⋮ | ⋮ | ⋮ |
| 1.2.2.3 | 1.2.1.3 | ⋮ | ⋮ | ⋮ |
| 1.2.2.3 | 1.3.1.3 | ⋮ | ⋮ | ⋮ |
| ⋮ | ⋮ | | | |

| COORDINATE VALUES AFTER CONVERSION | | COORDINATE VALUES BEFORE CONVERSION | |
|---|---|---|---|
| θ (pix) | φ (pix) | x(pix) | y(pix) |
| 0 | 0 | | |
| 1 | 1 | | |
| ⋮ | ⋮ | ⋮ | ⋮ |
| 3598 | 1798 | | |
| 3599 | 1799 | | |

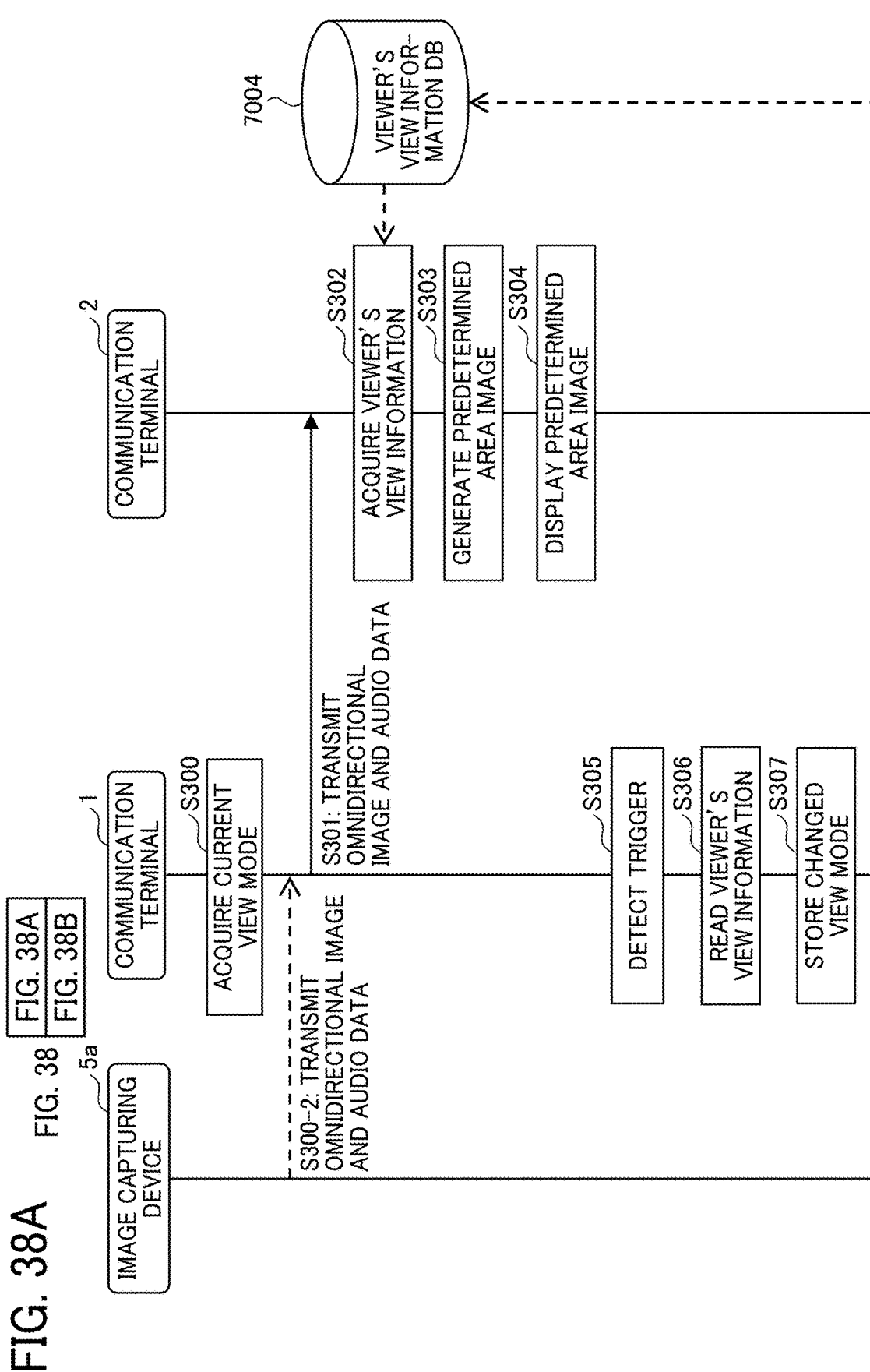

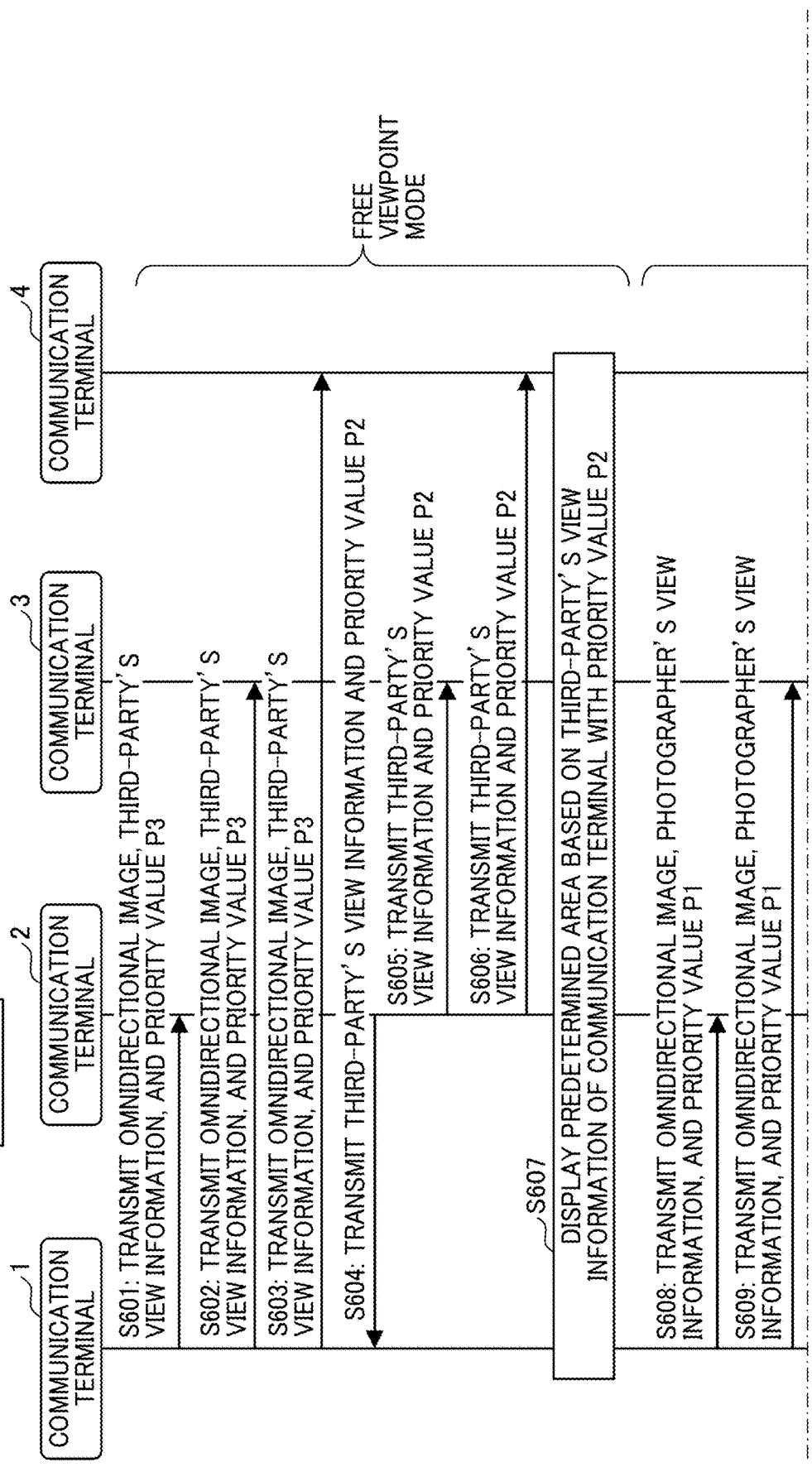

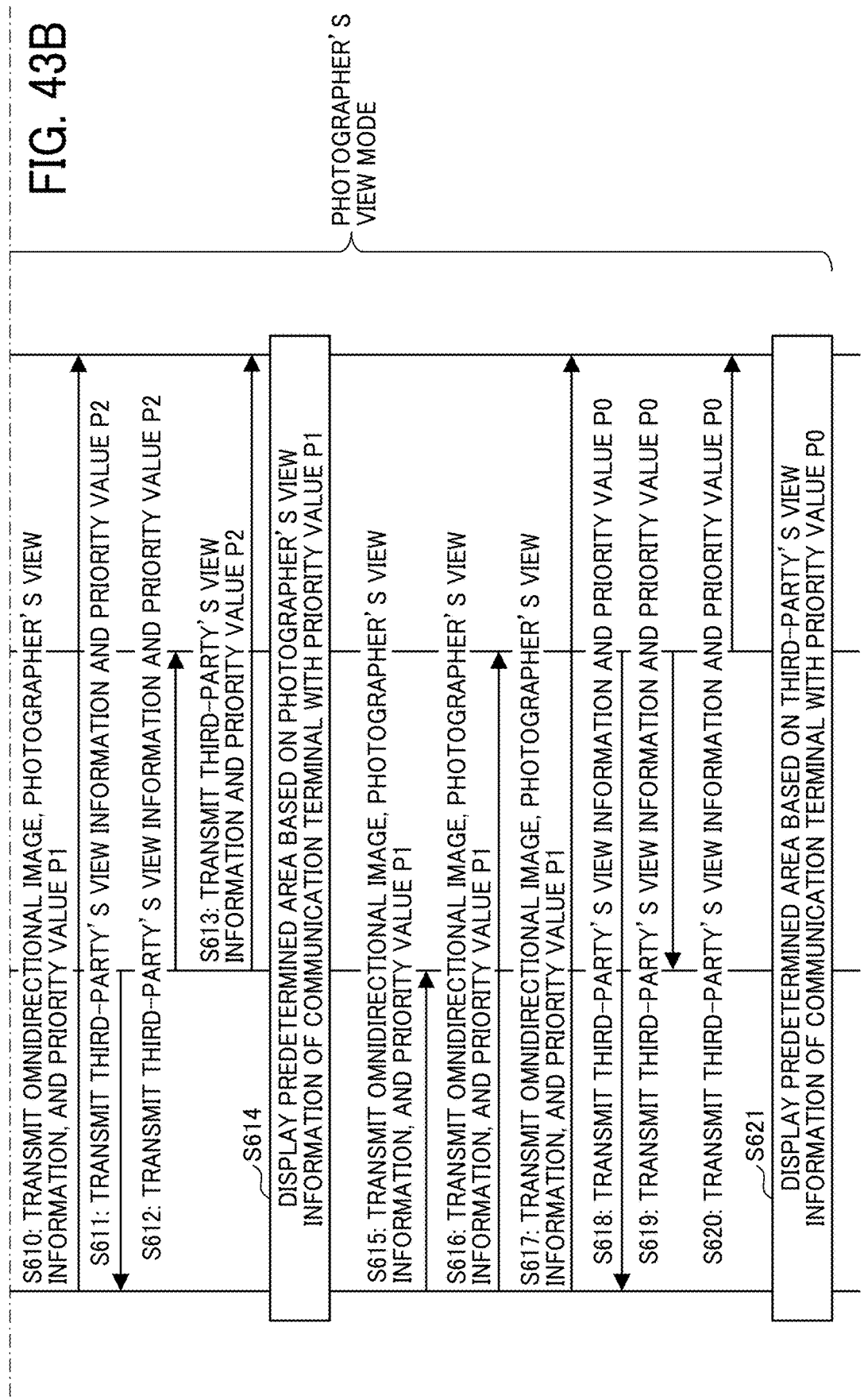

IMAGE COMMUNICATION SYSTEM, IMAGE CAPTURING DEVICE, COMMUNICATION TERMINAL, AND MODE SWITCHING METHOD

CROSS-REFERENCE TO RELATED APPLICATION

This patent application is based on and claims priority pursuant to 35 U.S.C. § 119(a) to Japanese Patent Application No. 2019-044187 filed on Mar. 11, 2019 in the Japan Patent Office, the entire disclosure of which is hereby incorporated by reference herein.

BACKGROUND

Technical Field

The present invention relates to an image communication system, an image capturing device, a communication terminal, and a mode switching method.

Description of the Related Art

An image communication system is widely used which transmits and receives images between remote sites via a communication network such as the Internet. According to the image communication system, in a meeting room with one party concerned, such as participants of a remote meeting, images of the meeting room including images of the participants of the meeting and sounds such as voices of the participants are captured or collected with a communication terminal of a remote conference system, converted into digital data, and transmitted to a communication terminal of the other party of the meeting located at a different site. Thereby, the images and sounds are output from a display and a speaker, respectively, in a meeting room with the other party, enabling a video call and thus a meeting between remote sites in a setting close to that of a meeting in the same space.

Further, there is a technique of connecting a communication terminal at one site to an image capturing device capable of acquiring, in real time, an omnidirectional image (i.e., 360-degree surrounding image), transmitting the omnidirectional image acquired from the image capturing device to other communication terminals at other sites, and displaying on displays at the other sites the image of a predetermined area forming a part of the omnidirectional image (i.e., the predetermined area image). This technique enables users at the other sites to determine a desired predetermined area for display from the whole omnidirectional image.

SUMMARY

In one embodiment of this invention, there is provided an improved image communication system that includes, for example, a first communication terminal and a second communication terminal. The first communication terminal acquires an image captured by an image capturing device. The second communication terminal receives the image from the first communication terminal via a network, and displays the image on a screen of a display. The first communication terminal includes first circuitry. In response to receipt of an operation of switching a view mode related to viewing of the image, the first circuitry transmits the image and first viewable area information to the second communication terminal. The first viewable area information is related to a viewable area of the image to be displayed on the screen by the second communication terminal. The second communication terminal includes second circuitry. The second circuitry receives the image and the first viewable area information, and displays the viewable area of the image on the screen based on the received first viewable area information.

In one embodiment of this invention, there is provided an improved image capturing device communicable with a first communication terminal that is communicable with a second communication terminal. The image capturing device includes, for example, circuitry that captures an image, transmits the image to the first communication terminal, and in response to receipt of an operation of switching a view mode related to viewing of the image, transmits first viewable area information to the second communication terminal in addition to the image. The first viewable area information is related to a viewable area of the image to be displayed on a screen of a display by the second communication terminal.

In one embodiment of this invention, there is provided an improved communication terminal communicable with a counterpart communication terminal. The communication terminal includes, for example, circuitry that acquires an image captured by an image capturing device, and in response to receipt of an operation of switching a view mode related to viewing of the image, transmits first viewable area information to the counterpart communication terminal. The first viewable area information is related to a viewable area of the image to be displayed on a screen of a display by the counterpart communication terminal.

In one embodiment of this invention, there is provided an improved mode switching method executed by a communication terminal communicable with a counterpart communication terminal. The mode switching method includes, for example, acquiring an image captured by an image capturing device, and in response to receipt of an operation of switching a view mode related to viewing of the image, transmitting first viewable area information to the counterpart communication terminal. The first viewable area information is related to a viewable area of the image to be displayed on a screen of a display by the counterpart communication terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4A is a diagram illustrating a front hemispherical image captured by the image capturing device;

FIG. 4B is a diagram illustrating a rear hemispherical image captured by the image capturing device;

FIG. 4C is a diagram illustrating an equidistant cylindrical image generated from the hemispherical images by equidistant cylindrical projection;

FIG. 5A is a conceptual diagram illustrating the equidistant cylindrical image covering a sphere;

FIG. 5B is a diagram illustrating an omnidirectional image obtained from the equidistant cylindrical image;

FIGS. 15A, 15B, 16A, and 16B are functional block diagrams illustrating exemplary functional blocks of the image communication system;

FIG. 17 is a conceptual diagram illustrating a mode management table stored in the image capturing device;

FIG. 18 is a conceptual diagram illustrating an image type management table stored in a communication terminal of the image communication system;

FIG. 19 is a conceptual diagram illustrating an image capturing device management table stored in the communication terminal;

FIG. 20 is a conceptual diagram illustrating a predetermined area management table stored in the communication terminal;

FIG. 21 is a conceptual diagram illustrating a viewer's view information table stored in the communication terminal;

FIG. 22 is a conceptual diagram illustrating a session management table stored in the communication management system;

FIG. 23 is a conceptual diagram illustrating an image type management table stored in the communication management system;

FIG. 24 is a conceptual diagram illustrating a predetermined area management table stored in the communication management system;

FIGS. 38A and 38B are a sequence diagram illustrating an exemplary procedure of a process of transmitting the photographer's view information in response to detection of the mode switch trigger in a communication terminal of the image communication system;

FIGS. 43A and 43B are a sequence diagram illustrating an exemplary procedure of a process by respective communication terminals of the image communication system of generating a predetermined area image based on priority.

Figure 1:
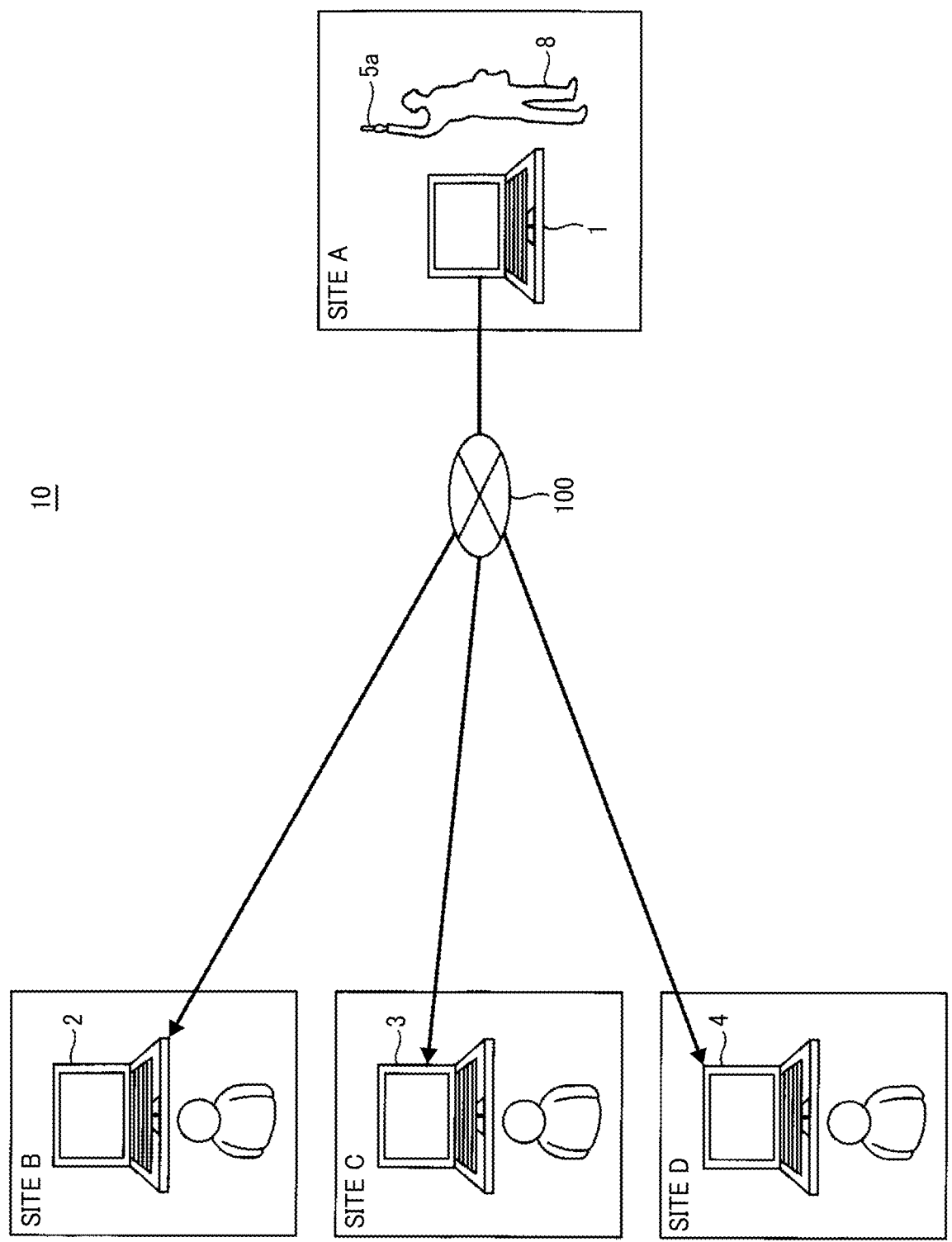
FIG. 1 is a diagram illustrating an overview of an operation of an image communication system of an embodiment of the present invention, in which communication between four sites is taking place.
Figure 2:
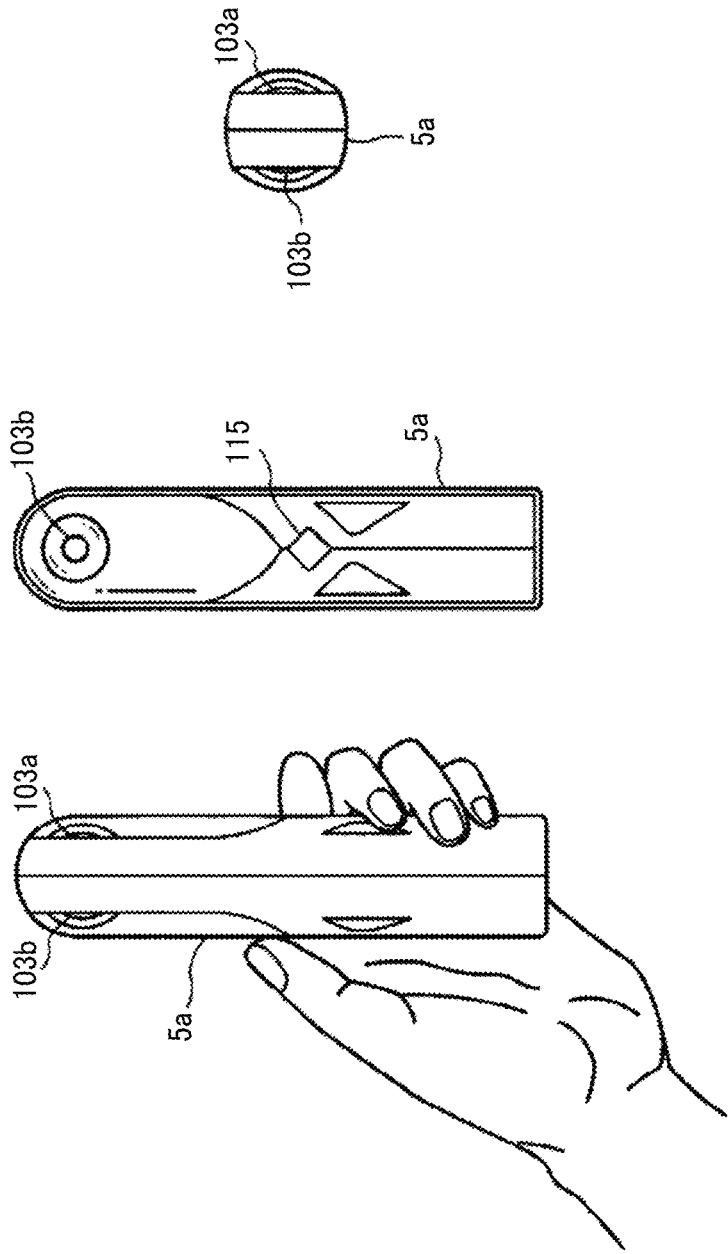
FIG. 2A is a right side view of an image capturing device included in the image communication system.
FIG. 2B is a front view of the image capturing device.
FIG. 2C is a plan view of the image capturing device.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A typical image communication system does not have a function of switching between a mode in which communication terminals at multiple sites share or display the image of a predetermined area as desired and a mode in which the communication terminals at the respective sites display the image of an object to which a photographer wants users at the respective sites to pay attention. For example, the users at the respective sites are able to display the image of a desired predetermined area of an omnidirectional image or share the image of a predetermined area determined by a user with a right to operate the communication terminals. In some cases, however, the photographer may want to change the displayed image by moving an image capturing device to draw the attention of the other users to a specific object. If the communication terminals at the respective sites are displaying predetermined areas determined as desired by the users at the sites, however, the photographer is unable to show the users the image of the object that the photographer wants to show.

In view of the above, embodiments of the present invention described below enable switching between the mode in which the communication terminals at the respective sites display the image of the predetermined area as desired and the mode in which the communication terminals at the respective sites display the image of the object to which the photographer wants the users at the respective sites to pay attention.

An image communication system according to an embodiment of the present invention and a mode switching method executed by the image communication system will be described below with reference to the drawings.

An overview of an operation of an image communication system 10 according to an embodiment of the present invention will first be described with FIG. 1.

FIG. 1 is a diagram illustrating an overview of an operation of the image communication system 10, in which communication is taking place between four sites: a site A, a site B, a site C, and a site D. At the site A, a photographer 8 captures an omnidirectional image in real time with an image capturing device 5a, and transmits the omnidirectional image to the sites B to D via a communication network 100. The transmission of the omnidirectional image or another type of image is also possible from the sites B to D. The omnidirectional image may be transmitted with or without audio data. Further, the omnidirectional image may be a still image, or may be repeatedly transmitted to produce a video image.

The photographer 8 is able to switch a mode of viewing the omnidirectional image captured by the image capturing device 5a (hereinafter referred to as the view mode) between two modes: a free viewpoint mode and a photographer's view mode. In the free viewpoint mode, a user is able to freely change the image of a predetermined area forming a part of the omnidirectional image (hereinafter referred to as the predetermined area image). In the photographer's view mode, the predetermined area image is displayed based on photographer's view information transmitted by the photographer 8.

As illustrated in FIG. 1, when the photographer 8 switches the view mode to the photographer's view mode, a communication terminal 1 (an example of a first communication terminal) transmits the omnidirectional image and the photographer's view information (an example of first predetermined area information) to the sites B to D. In response to receipt of the omnidirectional image and the photographer's view information, each of communication terminals 2 to 4 at the sites B to D (an example of a second communication terminal) generates and displays a predetermined area image based on the photographer's view information irrespective of the predetermined area image displayed thereon until the receipt of the photographer's view information.

Users (i.e., viewers) are unable to change, for at least a certain time, the predetermined area image generated based on the photographer's view information. That is, the predetermined area image generated based on the photographer's view information is forcibly displayed.

The photographer 8 is thus able to switch an image display operation of the communication terminals 2 to 4 at the sites B to D. In the photographer's view mode, the predetermined area image allowed to be displayed by the users is limited to the predetermined area image generated based on the photographer's view information. The photographer 8 is therefore able to draw the attention of the users at the sites B to D to an object that the photographer 8 wants to show. When the communication terminals 2 to 4 do not receive the photographer's view information, the users at the sites B to D are able to freely change the predetermined area of the omnidirectional image in the free viewpoint mode. In some situations such as when the photographer 8 has a specific object to show the users, therefore, the photographer 8 may switch the view mode to the photographer's view mode to draw the attention of the users to the object.

Herein, the view mode of viewing the image concerns the degree of freedom given to a viewer to determine the predetermined area. In the present embodiment, the view mode includes the free viewpoint mode and the photographer's view mode. Further, in the present embodiment, the predetermined area refers to an area of the omnidirectional image viewable to a user. The predetermined area depends on the viewpoint of the user and the angle of view of an image capturing device. The predetermined area may be a previously set area or an area to be selected for display by the user. Since the term "predetermined area" used here refers to the area viewable to a user, the predetermined area may also be described as the viewable area.

A method of generating the omnidirectional image will be described with FIGS. 2A to 8.

The exterior of the image capturing device 5a will first be described with FIGS. 2A to 2C.

The image capturing device 5a is a digital camera for capturing an image to generate a three-dimensional, 360-degree omnidirectional image based on the captured image. FIG. 2A is a right side view of the image capturing device 5a. FIG. 2B is a front view of the image capturing device 5a. FIG. 2C is a plan view of the image capturing device 5a.

As illustrated in FIG. 2A, the image capturing device 5a has a size suitable for being held by a human hand. Further, as illustrated in FIGS. 2A to 2C, an upper portion of the image capturing device 5a is equipped with imaging elements 103a and 103b, which are formed on one surface and the other surface, respectively, of the image capturing device 5a. Each of the imaging elements 103a and 103b is implemented by an image sensor, and is used with an optical member (e.g., a fisheye lens 102a or 102b in FIG. 11) capable of capturing a hemispherical image with an angle of view of at least 180 degrees. Further, as illustrated in FIG. 2B, the surface of the image capturing device 5a with the imaging element 103b is equipped with an operation device 115 including a shutter button SB (see FIGS. 28 and 29). As well as the shutter button SB, other buttons such as a wireless fidelity (Wi-Fi, registered trademark) button and a shooting mode switching button may also be formed on any surface of the image capturing device 5a such as a side surface of the image capturing device 5a.

Figure 3:
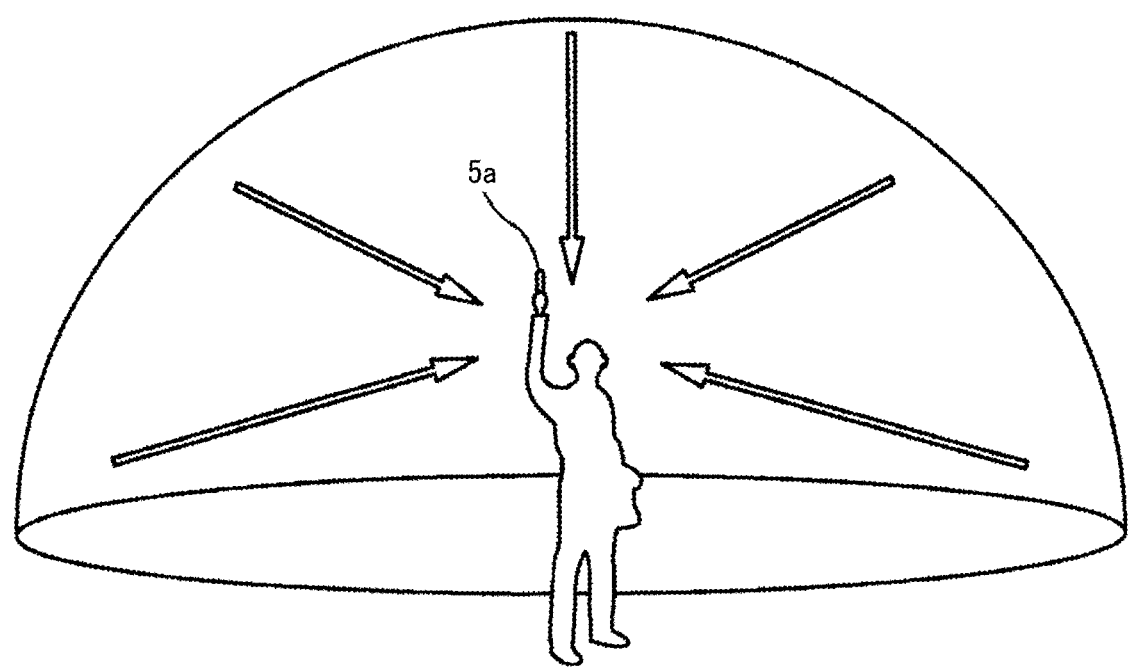
FIG. 3 is a conceptual diagram illustrating use of the image capturing device.

With reference to FIG. 3, a description will be given of a situation in which the image capturing device 5a is used.

FIG. 3 is a conceptual diagram illustrating use of the image capturing device 5a. As illustrated in FIG. 3, the image capturing device 5a is used as held by a hand of a user to capture the image of a subject around the user. In this case, the image of the subject around the user is captured by the imaging elements 103a and 103b illustrated in FIGS. 2A to 2C to obtain two hemispherical images.

With reference to FIG. 4A to FIG. 5B, a description will be given of an overview of a process of generating the omnidirectional image from the images captured by the image capturing device 5a.

FIG. 4A is a diagram illustrating a front hemispherical image captured by the image capturing device 5a. FIG. 4B is a diagram illustrating a rear hemispherical image captured by the image capturing device 5a. FIG. 4C is a diagram illustrating an image generated from the hemispherical images by equidistant cylindrical projection (hereinafter referred to as the equidistant cylindrical image). FIG. 5A is a conceptual diagram illustrating the equidistant cylindrical image covering a sphere. FIG. 5B is a diagram illustrating an omnidirectional image obtained from the equidistant cylindrical image.

As illustrated in FIG. 4A, the front hemispherical image captured by the imaging element 103a is distorted by the fisheye lens 102a. Further, as illustrated in FIG. 4B, the rear hemispherical image captured by the imaging element 103b is distorted by the fisheye lens 102b. The image capturing device 5a combines the front hemispherical image and the rear hemispherical image rotated therefrom by 180 degrees, to thereby generate an equidistant cylindrical image, as illustrated in FIG. 4C.

Then, with an application programming interface (API) such as open graphics library for embedded systems (OpenGL ES, registered trademark), the equidistant cylindrical image is placed to the surface of a sphere to cover the spherical surface, as illustrated in FIG. 5A. Thereby, the omnidirectional image as illustrated in FIG. 5B is generated. The omnidirectional image is thus expressed as the equidistant cylindrical image facing the center of the sphere. OpenGL ES is a graphics library application used to visualize two-dimensional or three-dimensional data. The omnidirectional image may be a still or video image.

As described above, the omnidirectional image is obtained as the image placed on a sphere to cover the spherical surface, and thus is perceived as unnatural to human eyes. Therefore, the predetermined area image of the predetermined area as a part of the omnidirectional image is displayed as a planar image with less distortion to be perceived as less unnatural to human eyes.

Display of the predetermined area image will be described with FIG. 6 to FIG. 7B.

Figure 6:
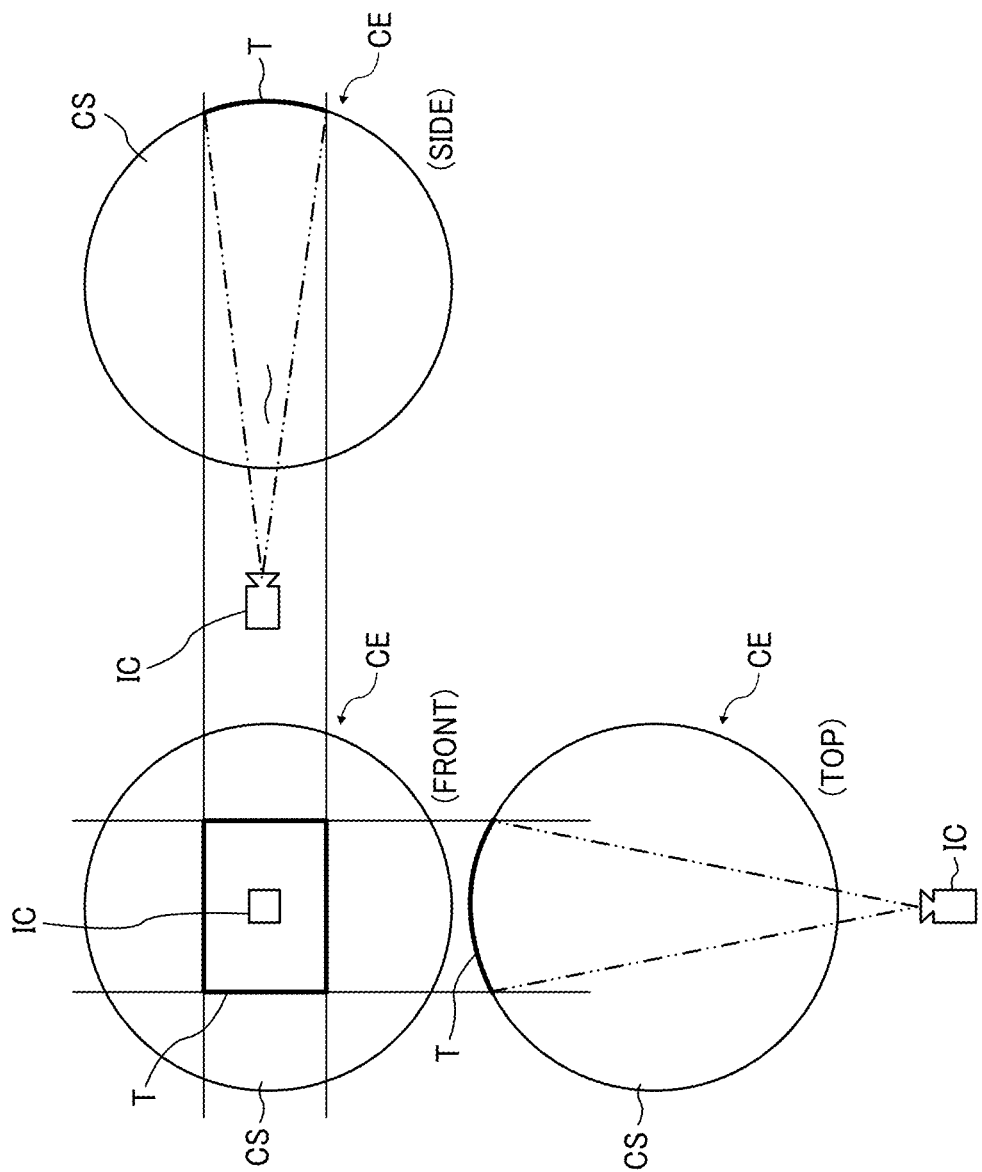
FIG. 6 is a diagram illustrating respective positions of a virtual camera and a predetermined area of the omnidirectional image when the omnidirectional image is expressed as a three-dimensional solid sphere.
Figure 7A:
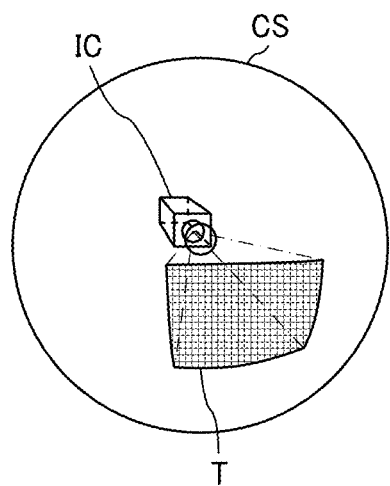
FIG. 7A is a perspective view of the omnidirectional image in FIG. 6 as the solid sphere.

FIG. 6 is a diagram illustrating respective positions of a virtual camera IC and a predetermined area T when an omnidirectional image CE is expressed as a three-dimensional solid sphere CS. The position of the virtual camera IC corresponds to the position of the viewpoint of a user viewing the omnidirectional image CE expressed as the three-dimensional solid sphere CS. FIG. 7A is a perspective view of the omnidirectional image CE in FIG. 6 as the solid sphere CS. FIG. 7B is a diagram illustrating the predetermined area image displayed on a display. In FIG. 7A, the omnidirectional image CE in FIG. 6 is illustrated as the three-dimensional solid sphere CS. When the omnidirectional image CE generated as described above is expressed as the solid sphere CS, the virtual camera IC is located outside the omnidirectional image CE, as illustrated in FIG. 6. The predetermined area T of the omnidirectional image CE corresponds to an imaging area of the virtual camera IC, and is identified by predetermined area information. The predetermined area information represents the imaging direction and the angle of view of the virtual camera IC in a three-dimensional virtual space including the omnidirectional image CE.

Figure 7B:
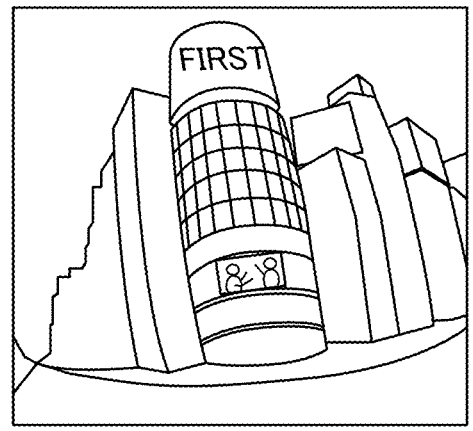
FIG. 7B is a diagram illustrating an image of the predetermined area displayed on a display of a communication terminal included in the image communication system.

As illustrated in FIG. 7B, the predetermined area T in FIG. 7A is displayed on a predetermined display as the image of the imaging area of the virtual camera IC. The image illustrated in FIG. 7B is the predetermined area image expressed by initially set predetermined area information, for example. The predetermined area information may be expressed not as the position coordinates of the virtual camera IC but as coordinates (X, Y, Z) of the imaging area of the virtual camera IC corresponding to the predetermined area T. The following description will be given with an imaging direction (rH, rV) and an angle of view (α) of the virtual camera IC.

The relationship between the predetermined area information and the image of the predetermined area T will be described with FIG. 8.

Figure 8:
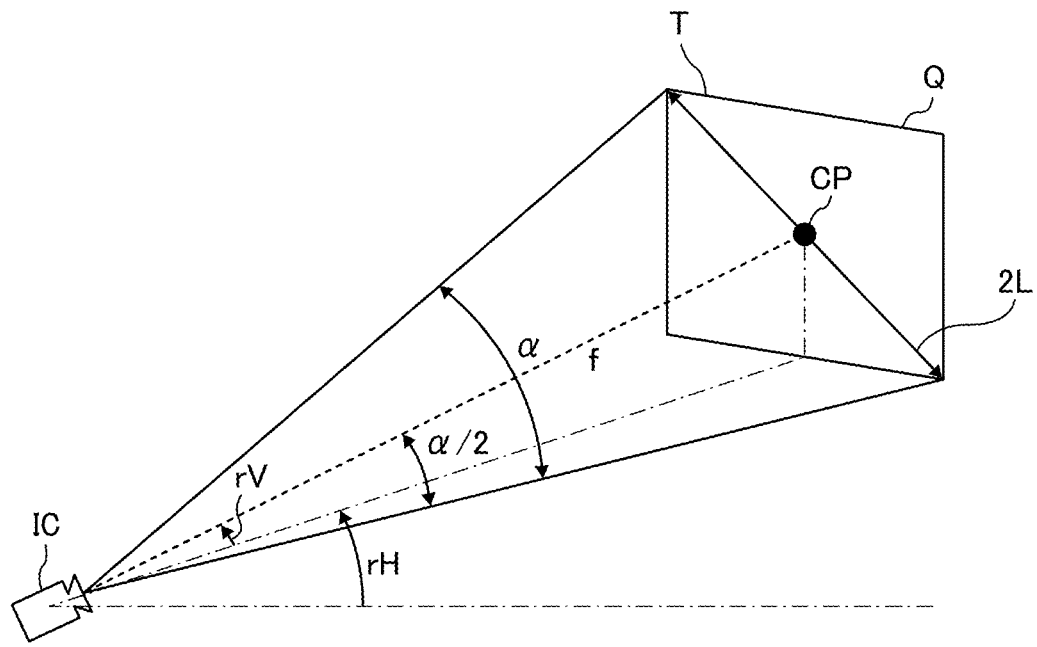
FIG. 8 is a diagram illustrating the relationship between predetermined area information and the image of the predetermined area.

FIG. 8 is a diagram illustrating the relationship between the predetermined area information and the image of the predetermined area T. As illustrated in FIG. 8, rH represents the horizontal radian, and rV represents the vertical radian. Further, α represents the angle of view. That is, the attitude of the virtual camera IC is changed such that the point of interest of the virtual camera IC represented by the imaging direction (rH, rV) corresponds to a center point CP of the predetermined area T as the imaging area of the virtual camera IC. A predetermined area image Q is the image of the predetermined area T of the omnidirectional image CE in FIG. 6. Further, f represents the distance from the virtual camera IC to the center point CP, and L represents the distance between a given vertex of the predetermined area T and the center point CP. Thus, 2L represents the length of a diagonal of the predetermined area T. Further, in FIG. 8, a trigonometric function typically expressed as $L/f=\tan(\alpha/2)$ holds.

Figure 9:
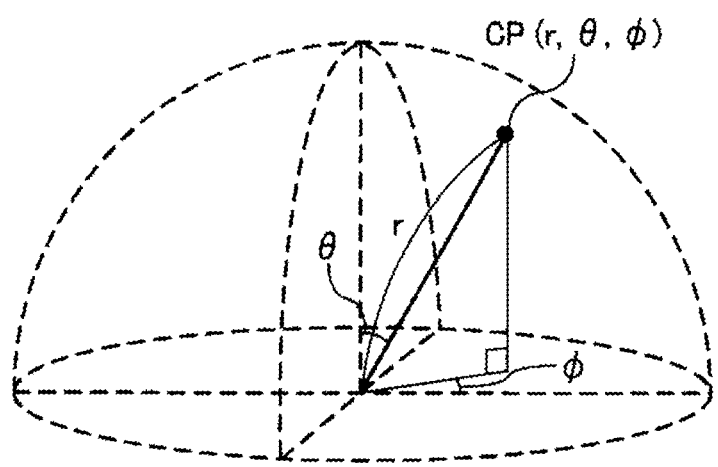
FIG. 9 is a diagram illustrating a point in a three-dimensional Euclidean space represented by spherical coordinates.

FIG. 9 is a diagram illustrating a point in a three-dimensional Euclidean space represented by spherical coordinates. The position coordinates of the center point CP are expressed as (r, θ, φ) in a spherical coordinate system. Herein, r, θ, and φ represent the radius vector, the polar angle, and the azimuth, respectively. The radius vector r corresponds to the distance from the center point CP to the origin of a three-dimensional virtual space including the omnidirectional image, and thus is equal to the distance f FIG. 9 illustrates the relationships between these elements. In the following description, the center point CP will be described with the position coordinates (r, θ, φ) thereof.

A schematic configuration of the image communication system 10 of the embodiment will be described with FIG. 10.

Figure 10:
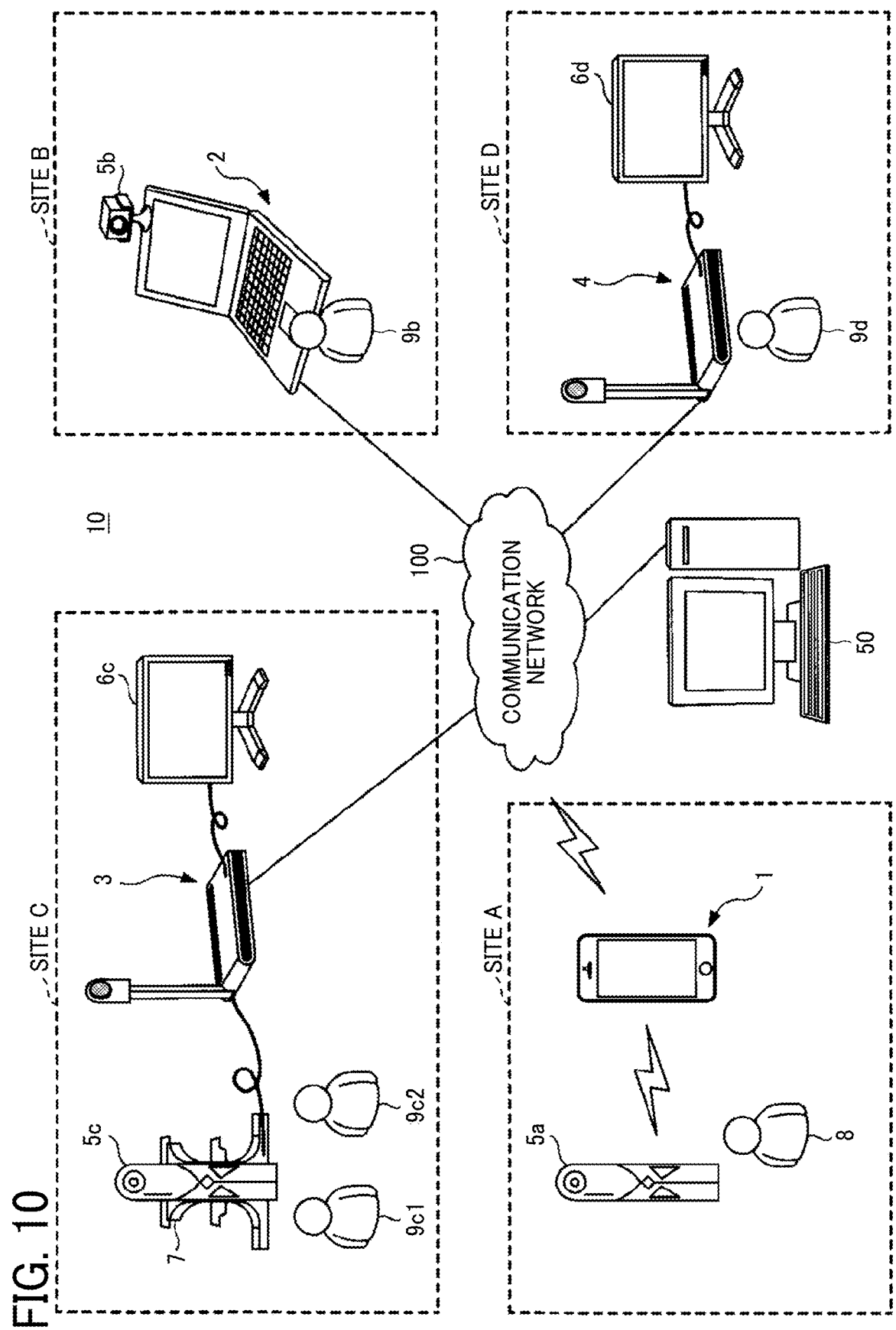
FIG. 10 is a schematic diagram illustrating a configuration of the image communication system of the embodiment.

FIG. 10 is a schematic diagram illustrating a configuration of the image communication system 10 of the embodiment. As illustrated in FIG. 10, in the image communication system 10 of the embodiment, the communication terminals 1 to 4 placed at the sites A to D communicate with each other via the communication network 100 such as the Internet to share images therebetween. The image capturing device 5a and the communication terminal 1 are placed at the site A, and the communication terminal 2 and an image capturing device 5b are placed at the site B. Further, an image capturing device 5c, the communication terminal 3, and a display 6c are placed at the site C, and the communication terminal 4 and a display 6d are placed at the site D.

Each of the image capturing devices 5a and 5c is a special digital camera for capturing the image of a subject (e.g., an object or surroundings) and obtaining two hemispherical images to generate an omnidirectional image based on the hemispherical images. The image capturing device 5b, on the other hand, is a commonly used digital camera for capturing the image of a subject (e.g., an object or surroundings) and obtaining a typical planar image.

The communication terminals 3 and 4 are video conference terminals dedicated to video conference. The communication terminals 3 and 4 display the image of a video call on the displays 6c and 6d, respectively, via a wired cable such as a universal serial bus (USB) cable. Each of the communication terminals 3 and 4 normally captures the image of a user, for example, with a camera 312 (see FIG. 12). For example, however, if the communication terminal 3 is connected, via a wired cable, to a cradle 7 to which the image capturing device 5c is attached, the image capturing device 5c is given priority over the camera 312 to obtain the omnidirectional image. When used with the wired cable, the cradle 7 not only enables communication between the image capturing device 5c and the communication terminal 3 but also supports the image capturing device 5c and supplies power thereto.

Each of the communication terminals 1 and 2 is a general-purpose information processing apparatus that communicates with another communication terminal at another site by operating application software for video conference. The communication terminal 1 may be, but is not limited to, a laptop personal computer (PC), a mobile phone, a smartphone, a tablet terminal, a car navigation system, a game console, a personal digital assistant (PDA), a wearable PC, or a desktop PC, for example.

The communication terminal 1 displays the image of a video call on a display 917 (see FIG. 14) of the communication terminal 1. The communication terminal 1 normally captures the image with a complementary metal oxide semiconductor (CMOS) sensor 905 (see FIG. 14) of the communication terminal 1. With a wireless communication technology conforming to a standard such as the Wi-Fi or Bluetooth (registered trademark) standard, the communication terminal 1 is also capable of acquiring the omnidirectional image obtained by the image capturing device 5a.

The communication terminal 2 displays the image of a video call on the display 917 of the communication terminal 2. The communication terminal 2 captures the image of a user, for example, with image capturing device 5b externally attached to the communication terminal 2.

Each of the communication terminals 1 to 4 is installed with OpenGL ES to generate the predetermined area information representing the predetermined area T forming a part of the omnidirectional image or generate the predetermined area image from the omnidirectional image transmitted from another communication terminal. The communication terminals 1 to 4 are therefore capable of displaying the predetermined area image cut out from the omnidirectional image.

At the site A, there is at least one photographer 8 holding in a hand the image capturing device 5a or a stick member attached to the image capturing device 5a. The photographer 8 is able to move with the image capturing device 5a. The communication terminal 1 displays on the display 917 thereof the images captured by the image capturing devices 5a to 5c and the camera 312 of the communication terminal 4.

At the site B, there is one user 9b. The communication terminal 2 displays on the display 917 thereof the images captured by the image capturing devices 5a to 5c and the camera 312 of the communication terminal 4. The user 9b at the site B is included in users who pay attention to the point of interest specified by the photographer 8. The number of users at the site B, which is one in this example, is illustrative.

At the site C, there are two users 9c1 and 9c2. The communication terminal 3 displays on the display 6c the images captured by the image capturing devices 5a to 5c and the camera 312 of the communication terminal 4. The users 9c1 and 9c2 at the site C are included in the users who pay attention to the point of interest specified by the photographer 8. The number of users at the site C, which is two in this example, is illustrative.

At the site D, there is one user 9d. The communication terminal 4 displays on the display 6d the images captured by the image capturing devices 5a to 5c and the camera 312 of the communication terminal 4. The user 9d at the site D is included in the users who pay attention to the point of interest specified by the photographer 8. The number of users at the site D, which is one in this example, is illustrative.

A communication management system 50 manages and controls the communication between the communication terminals 1 to 4, and thus also functions as a communication control system. The communication management system 50 is installed in, for example, a service provider company that provides a video communication service. The communication management system 50 may be implemented by a single computer, or may be implemented by a plurality of computers to which units (e.g., functions, devices, and memories) of the communication management system 50 are divided and allocated.

The number of sites, the type of the communication terminals 1 to 4 placed at the respective sites, the type of the image capturing devices 5a to 5c, and the number of users illustrated in FIG. 10 are illustrative. In the present embodiment, the minimum number of sites is two: the site A and another site. At the site B, the image capturing device 5b may be omitted; it suffices if the communication terminal 2 is capable of displaying the omnidirectional image transmitted from the site A.

Further, the image capturing device 5a and the communication terminal 1 at the site A may be integrated together. That is, if the image capturing device 5a has a function to connect to the communication network 100, the communication terminal 1 may be omitted. In this case, the image capturing device 5a functions as the communication terminal 1. This is because, in the present embodiment, the photographer 8 is able to specify the point of interest with the image capturing device 5a. If the communication terminal 1 is provided at the site A, however, the photographer 8 is also able to specify the point of interest by operating the communication terminal 1. Further, the communication terminal 1 may receive the omnidirectional image and the coordinates of the point of interest via a storage medium, without communicating with the image capturing device 5a at the site A.

In the following description, a given one of the image capturing devices 5a to 5c will be simply described as the image capturing device 5. Similarly, a given one of the displays 6c and 6d will be simply described as the display 6.

With reference to FIG. 11 to FIG. 14, a detailed description will be given of respective hardware configurations of the image capturing devices 5a and 5c, the communication terminals 1 to 4, and the communication management system 50 of the embodiment. The image capturing device 5b is a commonly used camera, and thus description thereof will be omitted.

A hardware configuration of each of the image capturing devices 5a and 5c will be described with FIG. 11.

Figure 11:
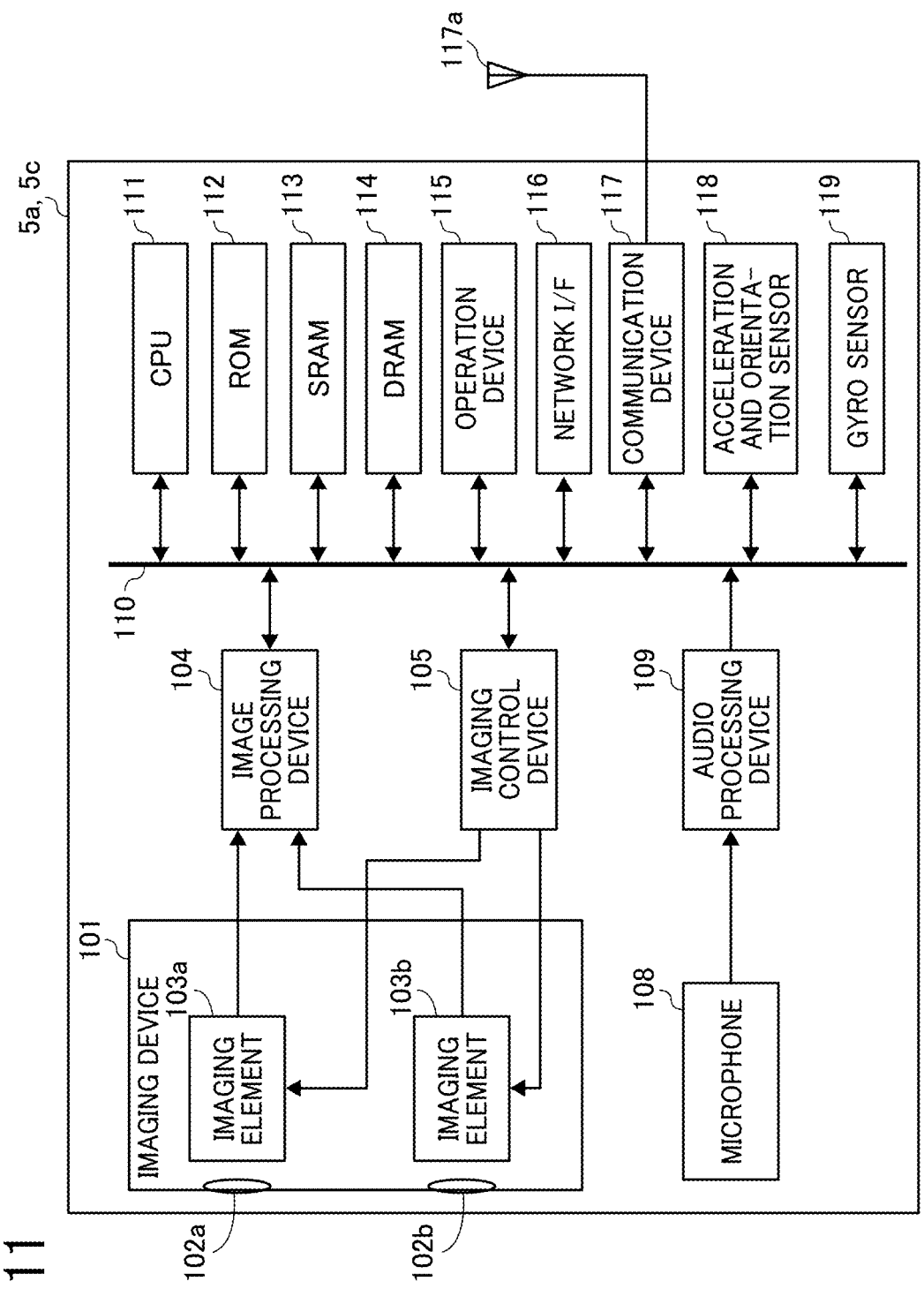
FIG. 11 is a diagram illustrating an exemplary hardware configuration of the image capturing device.

FIG. 11 is a diagram illustrating a hardware configuration of each of the image capturing devices 5a and 5c. The following description will be given on the assumption that each of the image capturing devices 5a and 5c is an omnidirectional (i.e., all-directional) image capturing device with two imaging elements. However, the number of imaging elements may be three or more. Further, each of the image capturing devices 5a and 5c is not necessarily required to be a device dedicated to the purpose of capturing the all-directional image. Therefore, an all-directional image capturing device may be additionally attached to a typical digital camera or smartphone, for example, to provide substantially the same functions as those of the image capturing device 5a or 5c.

As illustrated in FIG. 11, each of the image capturing devices 5a and 5c includes an imaging device 101, an image processing device 104, an imaging control device 105, a microphone 108, an audio processing device 109, a central processing unit (CPU) 111, a read only memory (ROM) 112, a static random access memory (SRAM) 113, a dynamic RAM (DRAM) 114, an operation device 115, a network interface (I/F) 116, a communication device 117, an antenna 117a, an acceleration and orientation sensor 118, and a gyro sensor 119.

The imaging device 101 includes two fisheye lenses 102a and 102b and two imaging elements 103a and 103b corresponding thereto. The fisheye lenses 102a and 102b are wide-angle lenses each having an angle of view of at least 180 degrees for forming a hemispherical image. Each of the imaging elements 103a and 103b includes an image sensor, a timing generating circuit, and a group of registers, for example. For example, the image sensor may be a CMOS or charge coupled device (CCD) sensor that converts an optical image formed by the fisheye lens 102a or 102b into image data of electrical signals and outputs the image data. The timing generating circuit generates a horizontal or vertical synchronization signal or a pixel clock signal for the image sensor. Various commands and parameters for the operation of the imaging element 103a or 103b are set in the group of registers.

Each of the imaging elements 103a and 103b of the imaging device 101 is connected to the image processing device 104 via a parallel I/F bus, and is connected to the imaging control device 105 via a serial I/F bus (e.g., an inter-integrated circuit (I$^2$C) bus). The image processing device 104 and the imaging control device 105 are connected to the CPU 111 via a bus 110. The bus 110 is further connected to the ROM 112, the SRAM 113, the DRAM 114, the operation device 115, the network I/F 116, the communication device 117, the acceleration and orientation sensor 118, and the gyro sensor 119, for example.

The image processing device 104 receives image data items from the imaging elements 103a and 103b via the parallel I/F bus, performs a predetermined process on the image data items, and combines the processed image data items to generate the data of the equidistant cylindrical image as illustrated in FIG. 4C.

The imaging control device 105 sets commands in the groups of registers of the imaging elements 103a and 103b via the serial I/F bus such as the I$^2$C bus, with the imaging control device 105 and imaging elements 103a and 103b acting as a master device and slave devices, respectively. The imaging control device 105 receives the commands from the CPU 111. The imaging control device 105 further receives data such as status data from the groups of registers of the imaging elements 103a and 103b via the serial I/F bus such as the I$^2$C bus, and transmits the received data to the CPU 111.

The imaging control device 105 further instructs the imaging elements 103a and 103b to output the image data when the shutter button SB of the operation device 115 is pressed down. The image capturing device 5a or 5c may have a preview display function or a video display function using a display (e.g., the display 917 of the communication terminal 1 or the display 6c connected to the communication terminal 3). In this case, the imaging elements 103a and 103b continuously output the image data at a predetermined frame rate. The frame rate is defined as the number of frames per minute.

The imaging control device 105 also functions as a synchronization controller that cooperates with the CPU 111 to synchronize the image data output time between the imaging elements 103a and 103b. In the present embodiment, the image capturing devices 5a and 5c are not equipped with a display, but may be equipped with a display.

The microphone 108 converts sound into audio (signal) data. The audio processing device 109 receives the audio data from the microphone 108 via an I/F bus, and performs a predetermined process on the audio data.

The CPU 111 controls an overall operation of the image capturing device 5a or 5c, and executes various processes. The ROM 112 stores various programs for the CPU 111. The SRAM 113 and the DRAM 114 are used as work memories, and store programs executed by the CPU 111 and data being processed. The DRAM 114 particularly stores image data being processed by the image processing device 104 and processed data of the equidistant cylindrical image.

The operation device 115 collectively refers to components such as various operation buttons including the shutter button SB, a power switch, and a touch panel that has a display function and an operation function. The user operates the operation buttons to input various imaging modes and imaging conditions, for example.

The network I/F 116 collectively refers to interface circuits (e.g., a USB I/F circuit) to connect to external devices or apparatuses such as an external medium (e.g., a secure digital (SD) card) and a PC. The network I/F 116 may be a wireless or wired interface. Via the network I/F 116, the data of the equidistant cylindrical image stored in the DRAM 114 may be recorded on an external medium, or may be transmitted as necessary to an external apparatus such as the communication terminal 3.

The communication device 117 communicates with an external apparatus such as the communication terminal 1 or 3 via the antenna 117a of the image capturing device 5a or 5c in accordance with a near field wireless communication technology conforming to the Wi-Fi or near field communication (NFC) standard, for example. The data of the equidistant cylindrical image may also be transmitted to an external apparatus such as the communication terminal 1 or 3 via the communication device 117.

The acceleration and orientation sensor 118 outputs orientation and tilt information by calculating the orientation and tilt (i.e., the roll angle, the yaw angle, and the pitch angle) of the image capturing device 5a or 5c from the geomagnetism. The orientation and tilt information is an example of related information (i.e., meta data) conforming to the exchangeable image file format (Exif) standard. The orientation and tilt information is used in image processing such as image correction of the captured image. The related information includes data such as the date and time of capturing the image and the data capacity of the image data.

The gyro sensor 119 is a triaxial or hexaxial sensor that detects the respective rates of rotation around the X-axis, the Y-axis, and the Z-axis. The rates of rotation are accumulated (i.e., integrated) to obtain respective rotation angles, which represents attitude information.

A hardware configuration of each of the communication terminals 3 and 4 (i.e., the video conference terminal) will be described with FIG. 12.

Figure 12:
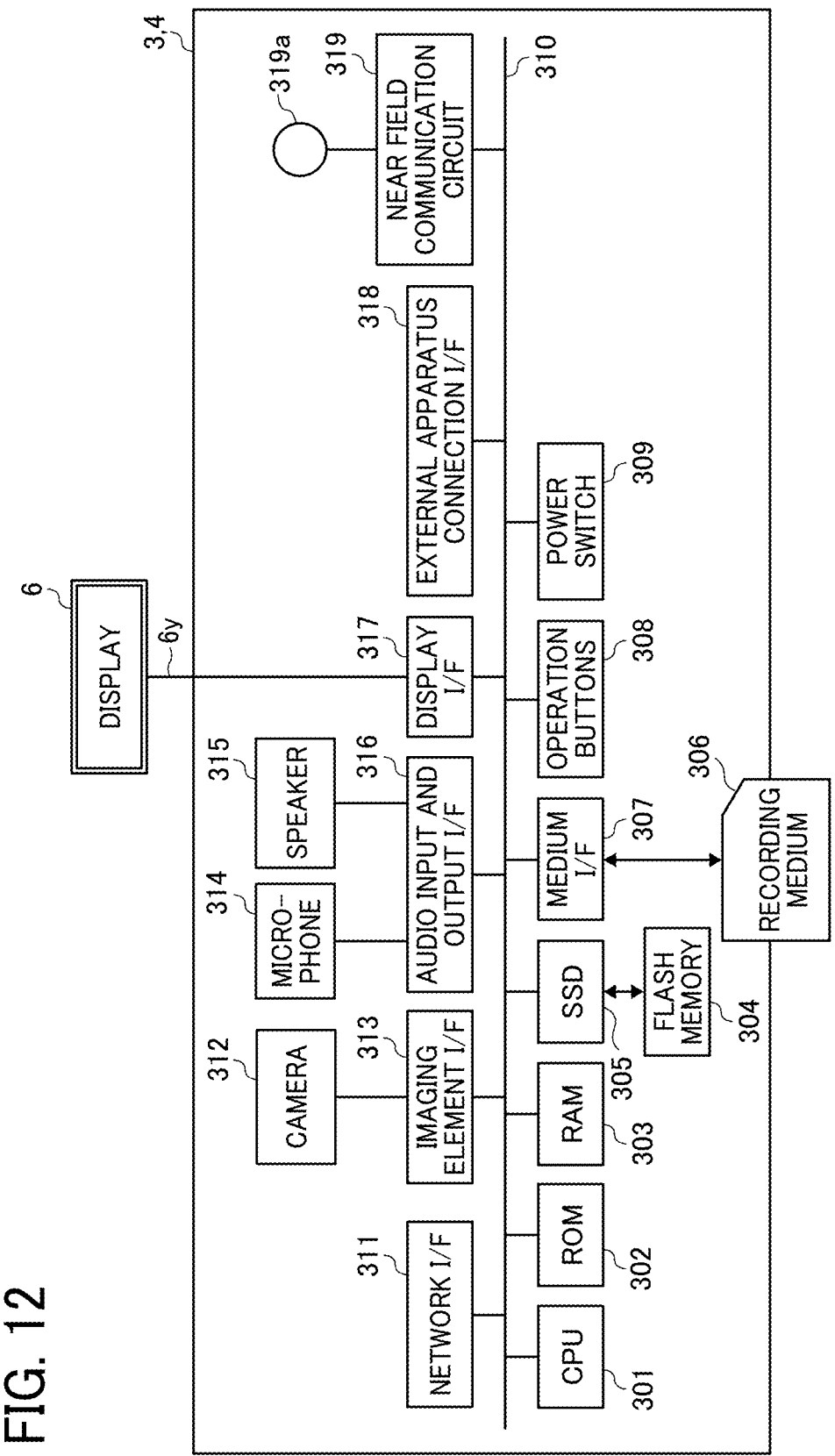
FIG. 12 is a diagram illustrating an exemplary hardware configuration of communication terminals included in the image communication system.

FIG. 12 is a diagram illustrating a hardware configuration of each of the communication terminals 3 and 4. As illustrated in FIG. 12, each of the communication terminals 3 and 4 includes a CPU 301, a ROM 302, a RAM 303, a flash memory 304, a solid state drive (SSD) 305, a medium I/F 307, operation buttons 308, a power switch 309, a bus line 310, a network I/F 311, a camera 312, an imaging element I/F 313, a microphone 314, a speaker 315, an audio input and output I/F 316, a display I/F 317, an external apparatus connection I/F 318, a near field communication circuit 319, and an antenna 319a for the near field communication circuit 319.

The CPU 301 controls an overall operation of the communication terminal 3 or 4. The ROM 302 stores a program used to drive the CPU 301 such as an initial program loader (IPL). The RAM 303 is used as a work area for the CPU 301. The flash memory 304 stores a communication program, image data, audio data, and other various data. The SSD 305 controls writing and reading of various data to and from the flash memory 304 under the control of the CPU 301. The SSD 305 may be replaced by a hard disk drive (HDD). The medium I/F 307 controls writing (i.e., storage) and reading of data to and from a recording medium 306 such as a flash memory. The operation buttons 308 are operated in the selection of an address by the communication terminal 3 or 4, for example. The power switch 309 is used to switch between ON and OFF of power supply to the communication terminal 3 or 4.

The network I/F 311 is an interface for data communication via the communication network 100 such as the Internet. The camera 312 is a built-in image capturing device that captures the image of a subject under the control of the CPU 301 to obtain image data. The imaging element I/F 313 is a circuit that controls driving of the camera 312. The microphone 314 is a built-in sound collecting device for inputting sounds. The audio input and output I/F 316 is a circuit that processes input of audio signals from the microphone 314 and output of audio signals to the speaker 315 under the control of the CPU 301. The display I/F 317 is a circuit that transmits the image data to the external display 6 under the control of the CPU 301. The external apparatus connection I/F 318 is an interface for connecting the communication terminal 3 or 4 to various external apparatuses. The near field communication circuit 319 is a communication circuit conforming to the NFC or Bluetooth standard, for example.

The bus line 310 includes an address bus and a data bus for electrically connecting the components of the communication terminal 3 or 4 illustrated in FIG. 12 including the CPU 301.

The display 6 is implemented as a liquid crystal or organic electro luminescence (EL) display, for example, that displays the image of the subject and icons for performing various operations. The display 6 is connected to the display I/F 317 by a cable 6y. The cable 6y may be a cable for analog red, green, blue (RGB) video graphics array (VGA) signals, a cable for component video, or a cable for high-definition multimedia interface (HDMI, registered trademark) or digital video interactive (DVI) signals.

The camera 312 includes lenses and a solid-state image sensing device that converts light into electric charge to digitize the still or video image of the subject. The solid-state image sensing device is a CMOS or CCD sensor, for example. The external apparatus connection I/F 318 is connectable to an external apparatus such as an external camera, an external microphone, or an external speaker via a USB cable, for example. If an external camera is connected to the external apparatus connection I/F 318, the external camera is driven in preference to the built-in camera 312 under the control of the CPU 301. Similarly, if an external microphone or speaker is connected to the external apparatus connection I/F 318, the external microphone or speaker is driven in preference to the built-in microphone 314 or speaker 315 under the control of the CPU 301.

The recording medium 306 is removable from the communication terminal 3 or 4. The recording medium 306 may be a nonvolatile memory capable of reading and writing data under the control of the CPU 301. In this case, the flash memory 304 may be replaced by an electrically erasable and programmable ROM (EEPROM), for example.

A hardware configuration of the communication management system 50 will be described with FIG. 13.

Figure 13:
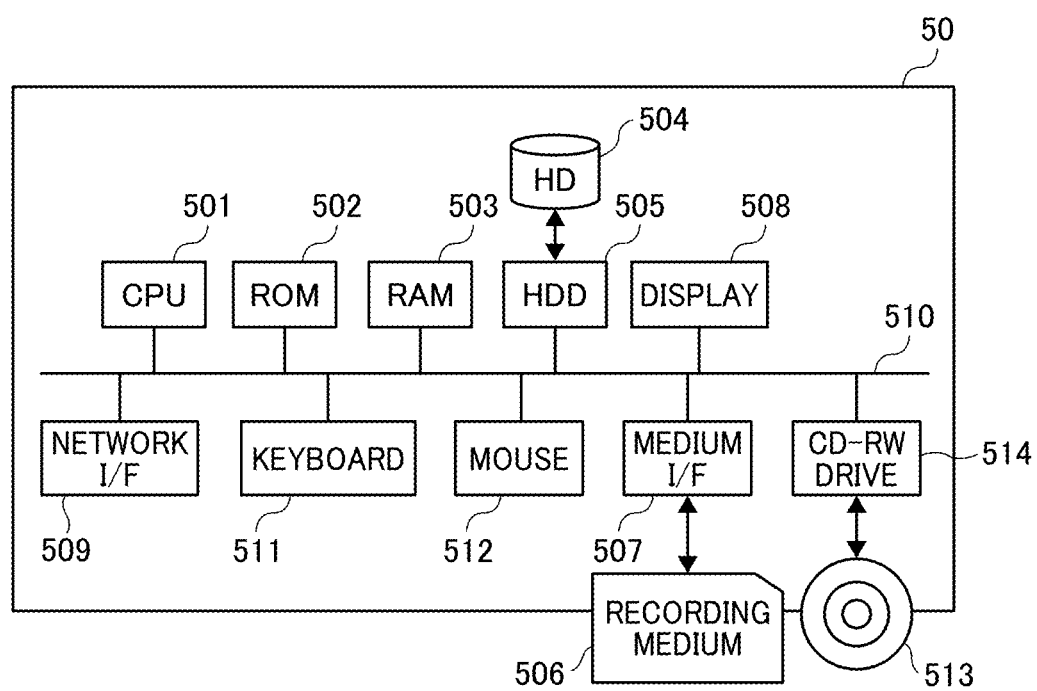
FIG. 13 is a diagram illustrating an exemplary hardware configuration of a communication management system included in the image communication system.

FIG. 13 is a diagram illustrating a hardware configuration of the communication management system 50. The communication management system 50 includes a CPU 501, a ROM 502, a RAM 503, a hard disk (HD) 504, an HDD 505, a medium I/F 507, a display 508, a network I/F 509, a keyboard 511, a mouse 512, a compact disc-rewritable (CD-RW) drive 514, and a bus line 510.

The CPU 501 controls an overall operation of the communication management system 50. The ROM 502 stores a program used to drive the CPU 501 such as an IPL. The RAM 503 is used as a work area for the CPU 501. The HD 504 stores various data of a program for the communication management system 50, for example. The HDD 505 controls writing and reading of various data to and from the HD 504 under the control of the CPU 501. The medium I/F 507 controls writing (i.e., storage) and reading of data to and from a recording medium 506 such as a flash memory. The display 508 displays various information such as a cursor, menus, windows, text, and images. The network I/F 509 is an interface for data communication via the communication network 100. The keyboard 511 includes a plurality of keys for inputting text, numerical values, and various instructions, for example. The mouse 512 is used to select and execute various instructions, select a processing target, and move the cursor, for example. The CD-RW drive 514 controls reading of various data from a CD-RW 513 as an example of a removable recording medium. The bus line 510 includes an address bus and a data bus for electrically connecting the above-described components of the communication management system 50, as illustrated in FIG. 13.

A hardware configuration of each of the communication terminals 1 and 2 will be described with FIG. 14.

Figure 14:
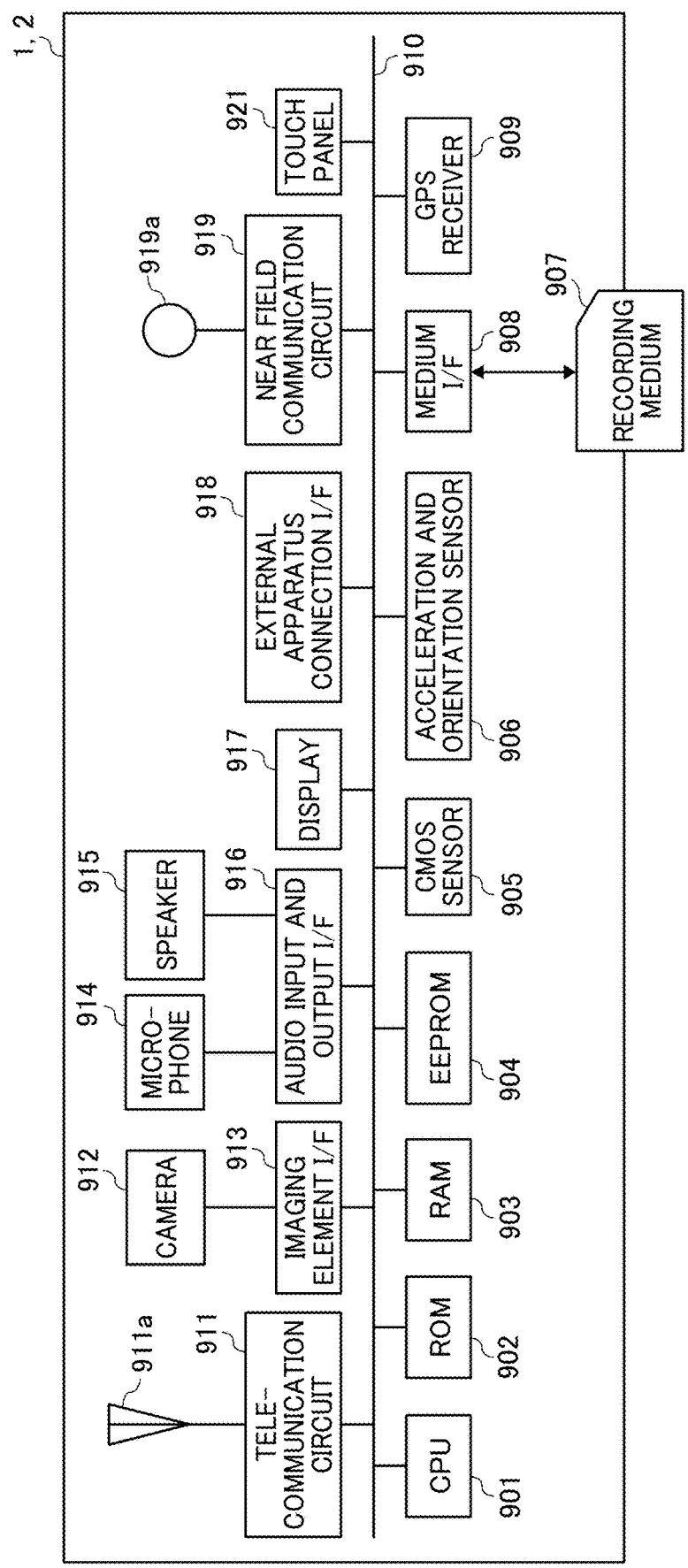
FIG. 14 is a diagram illustrating an exemplary hardware configuration of other communication terminals included in the image communication system.

FIG. 14 is a diagram illustrating a hardware configuration of each of the communication terminals 1 and 2. As illustrated in FIG. 14, each of the communication terminals 1 and 2 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls an overall operation of the communication terminal 1 or 2. The ROM 902 stores a program used to drive the CPU 901 such as an IPL. The RAM 903 is used as a work area for the CPU 901. The EEPROM 904 performs reading and writing of various data of a program for the communication terminal 1 or 2, for example, under the control of the CPU 901. The CMOS sensor 905 captures the image of a subject (normally the image of a user) under the control of the CPU 901 to obtain image data. The acceleration and orientation sensor 906 includes various sensors such as an electromagnetic compass that detects geomagnetism, a gyrocompass, and an acceleration sensor. The medium I/F 908 controls writing (i.e., storage) and reading of data to and from a recording medium 907 such as a flash memory. The GPS receiver 909 receives a GPS signal from a GPS satellite.

Each of the communication terminals 1 and 2 further includes a telecommunication circuit 911, an antenna 911*a* for the telecommunication circuit 911, a camera 912, an imaging element I/F 913, a microphone 914, a speaker 915, an audio input and output I/F 916, a display 917, an external apparatus connection I/F 918, a near field communication circuit 919, an antenna 919*a* for the near field communication circuit 919, a touch panel 921, and a bus line 910.

The telecommunication circuit 911 is a circuit that communicates with another apparatus via the communication network 100. The camera 912 is a built-in image capturing device that captures the image of a subject under the control of the CPU 901 to obtain image data. The imaging element I/F 913 is a circuit that controls driving of the camera 912. The microphone 914 is a built-in sound collecting device for inputting sounds. The audio input and output I/F 916 is a circuit that that processes input of audio signals from the microphone 914 and output of audio signals to the speaker 915 under the control of the CPU 901. The display 917 is implemented as a liquid crystal or organic EL display, for example, that displays the image of the subject and various icons. The external apparatus connection I/F 918 is an interface for connecting the communication terminal 1 or 2 to various external apparatuses. The near field communication circuit 919 is a communication circuit conforming to the NFC or Bluetooth standard, for example. The touch panel 921 is an input device for the user to operate the communication terminal 1 or 2 by pressing the display 917. The bus line 910 includes an address bus and a data bus for electrically connecting the above-described components of the communication terminal 1 or 2 including the CPU 901.

A recording medium (e.g., a CD-ROM) or an HD storing the above-described programs may be shipped to the market as a program product.

A functional configuration of the image communication system 10 of the present embodiment will be described with FIGS. 15A to 24.

FIGS. 15A to 16B are functional block diagrams illustrating functional blocks of the image communication system 10. As illustrated in FIG. 15A, the image capturing device 5*a* includes a receiving unit 12*a*, an imaging unit 13*a*, a sound collecting unit 14*a*, an attitude information acquiring unit 15*a*, an image processing unit 16*a*, a mode receiving unit 17*a*, a communication unit 18*a* (which includes a transmitting unit and a receiving unit), and a storing and reading unit 19*a*. Except for the image processing unit 16*a*, each of these units is a function or device implemented when at least one of the components illustrated in FIG. 11 operates in response to a command from the CPU 111 in accordance with a program for the image capturing device 5*a* deployed on the DRAM 114 from the SRAM 113. The image processing unit 16*a* is implemented by a circuit module such as an application specific integrated circuit (ASIC), a digital signal processor (DSP), or a field programmable gate array (FPGA). Alternatively, the image processing unit 16*a* may be implemented by software.

The image capturing device 5*a* further includes a storage unit 1000*a* implemented by the ROM 112, the SRAM 113, and the DRAM 114 illustrated in FIG. 11. The storage unit 1000*a* stores globally unique identifiers (GUIDs) of the image capturing device 5*a* and a mode management database (DB) 1001*a*. The mode management DB 1001*a* is configured as a mode management table illustrated in FIG. 17.

FIG. 17 is a conceptual diagram illustrating the mode management table. The mode management table stores information of whether the current view mode is the photographer's view mode or the free viewpoint mode. When the current view mode is the photographer's view mode, the photographer's view information is transmitted to the sites A to D.

In the image capturing device 5*a*, the receiving unit 12*a* is mainly implemented by the operation device 115 and the processing of the CPU 111 illustrated in FIG. 11. The receiving unit 12*a* receives an operation input from the photographer 8.

The imaging unit 13*a* is mainly implemented by the imaging device 101, the image processing device 104, the imaging control device 105, and the processing of the CPU 111 illustrated in FIG. 11. The imaging unit 13*a* captures the image of surroundings of the image capturing device 5*a*, for example, to obtain captured image data (i.e., the omnidirectional image).

The sound collecting unit 14*a* is implemented by the microphone 108, the audio processing device 109, and the processing of the CPU 111 illustrated in FIG. 11. The sound collecting unit 14a collects sounds of the surroundings of the image capturing device 5a.

The attitude information acquiring unit 15a acquires the attitude information of the attitude of the image capturing device 5a (i.e., the tilt of the image capturing device 5a in a three-dimensional space, which may be represented by components of roll, pitch, and yaw). The image processing unit 16a executes a process of combining two hemispherical images to generate one equidistant cylindrical image. This process includes zenith correction based on the attitude information. Thereby, the coordinates of the point of interest pointed by the upper side in the longitudinal direction of the image capturing device 5a are converted into spherical coordinates (i.e., coordinates of the equidistant cylindrical image) indicating the direction pointed by the photographer 8.

The mode receiving unit 17a receives switching of the view mode between the free viewpoint mode and the photographer's view mode. If the view mode is not the photographer's view mode, the view mode is the free viewpoint mode. Therefore, the mode receiving unit 17a may simply receive information of whether the photographer's view mode is selected. The mode receiving unit 17a receives the switching of the view mode based on detection by the gyro sensor 119 or image information, which will be described in detail later with TABLE 1.

The communication unit 18a is mainly implemented by the processing of the CPU 111 illustrated in FIG. 11. The communication unit 18a communicates with a later-described communication unit 98 of the communication terminal 1 in accordance with a near field wireless communication technology conforming to the NFC, Bluetooth, or Wi-Fi standard, for example.

The storing and reading unit 19a is mainly implemented by the processing of the CPU 111 illustrated in FIG. 11. The storing and reading unit 19a stores various data and information in the storage unit 1000a, and reads therefrom various data and information.

The image capturing device 5c includes a receiving unit 12c, an imaging unit 13c, a sound collecting unit 14c, an attitude information acquiring unit 15c, an image processing unit 16c, a mode receiving unit 17c, a communication unit 18c, a storing and reading unit 19c, and a storage unit 1000c. These units implement similar functions to those of the receiving unit 12a, the imaging unit 13a, the sound collecting unit 14a, the attitude information acquiring unit 15a, the image processing unit 16a, the mode receiving unit 17a, the communication unit 18a, the storing and reading unit 19a, and the storage unit 1000a of the image capturing device 5a, and thus description thereof will be omitted. The storage unit 1000c stores a mode management DB 1001c. The mode management DB 1001c is similar to the mode management DB 1001a of the image capturing device 5a, and thus description thereof will be omitted.

A functional configuration of the communication terminal 1 will be described.

As illustrated in FIG. 15B, the communication terminal 1 includes a transmitting and receiving unit 91 (which includes a transmitting unit and a receiving unit), a receiving unit 92, an image and audio processing unit 93, a display control unit 94, a determination unit 95, a generation unit 96, a calculation unit 97, a communication unit 98, and a storing and reading unit 99. Each of these units is a function or device implemented when at least one of the components illustrated in FIG. 14 operates in response to a command from the CPU 901 in accordance with the program for the communication terminal 1 deployed on the RAM 903 from the EEPROM 904.

The communication terminal 1 further includes a storage unit 9000 implemented by the ROM 902, the RAM 903, and the EEPROM 904 illustrated in FIG. 14. The storage unit 9000 stores an image type management DB 9001, an image capturing device management DB 9002, a predetermined area management DB 9003, and a viewer's view information DB 9004.

The image type management DB 9001 is configured as an image type management table illustrated in FIG. 18. The image capturing device management DB 9002 is configured as an image capturing device management table illustrated in FIG. 19. The predetermined area management DB 9003 is configured as a predetermined area management table illustrated in FIG. 20. The viewer's view information DB 9004 is configured as a viewer's view information table illustrated in FIG. 21.

FIG. 18 is a conceptual diagram illustrating the image type management table. In the image type management table, an image data ID, an internet protocol (IP) address, and a source name are stored and managed in association with each other. The image data ID is an example of image data identification information for identifying the image data in video communication. Image data items transmitted from the same transmitter terminal are assigned with the same image data ID, enabling a destination terminal (i.e., receiver terminal) to identify the transmitter terminal having transmitted the image data received by the receiver terminal. The IP address is an example of the address of the transmitter terminal. The IP address of the transmitter terminal represents the IP address of the communication terminal that transmits the image data represented by the image data ID associated with the IP address. The source name is a name for identifying the image capturing device that outputs the image data represented by the image data ID associated with the source name. The source name is an example of image type information. The source name is generated by the communication terminal 3, for example, in accordance with a predetermined naming rule.

For example, the image type management table of FIG. 18 indicates that four communication terminals with respective IP addresses "1.2.1.3," "1.2.2.3," "1.3.1.3," and "1.3.2.3" have transmitted image data items represented by image data IDs "RS001," "RS002," "RS003," and "RS004." The image type management table further indicates that image types represented by respective source names of the communication terminals are "Video_Wide," "Video_Wide," "Video," and "Video," which represent "special image," "special image," "general image," and "general image," respectively. Herein, the special image is the omnidirectional image.

Data other than the image data may also be managed in association with the image data ID. For example, the data other than the image data includes audio data and material data used in sharing the image displayed on the screen.

FIG. 19 is a conceptual diagram illustrating the image capturing device management table. In the image capturing device management table, a vendor ID (VID) and a product ID (PID) are stored and managed. The VID and the PID are included in the GUIDs of an image capturing device capable of capturing two hemispherical images, based on which the omnidirectional image is generated. For example, the VID and the PID used by a USB device may be used as the GUIDs. The VID and the PID are stored in the communication terminals 3 and 4, for example, in factory shipment thereof, but may be additionally stored therein after the factory shipment.

FIG. 20 is a conceptual diagram illustrating the predetermined area management table. In the predetermined area management table, the IP address of the transmitter terminal, the IP address of the destination terminal, and the predetermined area information are stored and managed in association with each other. The IP address of the transmitter terminal is the IP address of the communication terminal that transmits the captured image data. The IP address of the destination terminal is the IP address of the communication terminal to which the captured image data is transmitted. The predetermined area information represents the predetermined area image being displayed by the destination terminal, i.e., the communication terminal to which the captured image data is transmitted. The destination terminal to which the captured image data is transmitted is also the transmitter terminal that transmits the predetermined area information. The predetermined area information is configured as a conversion table for converting the captured image into the predetermined area image, i.e., the image of the predetermined area T of the captured image, as illustrated in FIGS. 6 to 7B. The IP address is an example of address information. The address information includes a media access control (MAC) address and a terminal identification (ID) for identifying the communication terminal. The IP address illustrated in FIG. 20 is a simplified version of the internet protocol version (IPv)4 address. Alternatively, the IPv6 address may be used as the IP address.

For example, when the IP address of the communication terminal 3 is "1.2.1.3," the information managed in the first to third rows of the predetermined area management table in FIG. 20 indicates that the captured image data transmitted from the communication terminal 3 has been transmitted, via the communication management system 50, to the communication terminal 4 corresponding to the IP address "1.2.2.3," the communication terminal 2 corresponding to the IP address "1.3.1.3," and the communication terminal 1 corresponding to the IP address "1.3.2.3." The information further indicates that the communication terminal 4 is a transmitter terminal having transmitted predetermined area information (r=10, θ=20, φ=30), that the communication terminal 2 is a transmitter terminal having transmitted predetermined area information (r=20, θ=30, φ=40), and that the communication terminal 1 is a transmitter terminal having transmitted predetermined area information (r=30, θ=40, φ=50). That is, the predetermined area management table manages the predetermined area information used by the communication terminals 1, 2, and 4 to display the omnidirectional image.

If the transmitting and receiving unit 91 receives new predetermined area information corresponding to the IP address of the transmitter terminal of already-managed captured image data and the IP address of the destination terminal of the already-managed captured image data, the storing and reading unit 99 overwrites the corresponding already-managed predetermined area information with the newly received predetermined area information.

FIG. 21 is a conceptual diagram illustrating the viewer's view information table. The viewer's view information table stores the current viewer's view information of the communication terminal 1. The viewer's view information refers to the information of the radius vector, the polar angle, and the azimuth for identifying the center point CP selected for display by a viewer (i.e., user) from the whole image. Herein, the whole image refers to the entirety of the displayed captured image. With the viewer's view information, the predetermined area T is determined. FIG. 21 illustrates one viewer's view information item. If a plurality of omnidirectional images are transmitted from other sites, however, a plurality of viewer's view information items corresponding to the plurality of omnidirectional images are registered in association with respective image data IDs.

The transmitting and receiving unit 91 of the communication terminal 1 is mainly implemented by the telecommunication circuit 911 and the processing of the CPU 901 illustrated in FIG. 14. The transmitting and receiving unit 91 transmits and receives various data and information to and from the communication management system 50 via the communication network 100.

The receiving unit 92 is mainly implemented by the touch panel 921 and the processing of the CPU 901. The receiving unit 92 receives various selections and inputs from the user. As well as the touch panel 921, the receiving unit 92 may also be implemented by another input device such as an audio input device. In the present embodiment, the receiving unit 92 receives the switching of the view mode between the free viewpoint mode and the photographer's view mode. In the photographer's view mode, the receiving unit 92 receives the photographer's view information. When the view mode is not the photographer's view mode, the view mode is the free viewpoint mode, as described above. Therefore, the receiving unit 92 may simply receive the information of whether the photographer's view mode is selected.

TABLE 1 given below illustrates examples of a trigger for the image capturing device 5a and the communication terminal 1 to receive the start and end of the photographer's view mode (hereinafter referred to as the mode switch trigger).

TABLE 1

|  | start of photographer's view mode | end of photographer's view mode | detector |
| --- | --- | --- | --- |
| physical button | press | press | image capturing device |
| physical button | press and hold | release | image capturing device |
| gyro sensor | detect movement of camera | detect stop of movement of camera | image capturing device |
| image information | detect movement of camera | detect stop of movement of camera | image capturing device, communication terminal |
| software button | press | press | communication terminal |
| software button | press and hold | release | communication terminal |

As illustrated in TABLE 1, examples of the mode switch trigger include pressing of a physical button. By pressing the physical button, the photographer 8 is able to switch the view mode between the free viewpoint mode and the photographer's view mode at a desired time. Further, the mode switch trigger may be detection of movement by the gyro sensor 119 or a change in the image. It is thereby possible to switch the view mode to the photographer's view mode with the movement of the photographer 8. Pressing of the physical button is detected by a point-of-interest specification determining unit 198 (see FIG. 32) of the image capturing device 5a, which will be described later. The detection of movement based on information from the gyro sensor 119 or the image information is performed by the mode receiving unit 17a of the image capturing device 5a.

Pressing of a software button is detected by the receiving unit 92 of the communication terminal 1. The receiving unit 92 also receives a change in the image information as the mode switch trigger. In the example of FIGS. 15A and 15B, the mode management DB 1001a is included in the image capturing device 5a. The information about which of the free viewpoint mode and the photographer's view mode is selected may be stored in the mode management DB 1001a from the receiving unit 92, i.e., transmitted from the communication terminal 1 to the image capturing device 5a. Alternatively, a mode management DB managed by the communication terminal 1 may be stored in the storage unit 9000.

Referring back to FIG. 15B, the image and audio processing unit 93 is implemented by a command from the CPU 901 illustrated in FIG. 14. The image and audio processing unit 93 performs image processing on the image data of the image of the subject captured by the camera 912. The image and audio processing unit 93 further performs audio processing on audio data of audio signals converted from the voice of the user by the microphone 914.

Based on the image type information such as the source name, the image and audio processing unit 93 performs image processing on the image data received from another communication terminal such that the display control unit 94 displays a resultant image on the display 917. The image and audio processing unit 93 further outputs, to the speaker 915, audio signals of audio data received from another communication terminal via the communication management system 50, to thereby output sound from the speaker 915.

The display control unit 94 is mainly implemented by the display 917 and the processing of the CPU 901. The display control unit 94 executes control for displaying various images and text on the display 917.

The determination unit 95 is mainly implemented by the processing of the CPU 901. The determination unit 95 determines the image type of the image data received from the image capturing device 5a, for example.

The generation unit 96 is mainly implemented by the processing of the CPU 901. Based on the determination by the determination unit 95 of whether the image type of the image data is the general image or the special image (i.e., the omnidirectional image in the present example), the generation unit 96 generates the source name (an example of the image type information) in accordance with the foregoing naming rule. For example, if the determination unit 95 determines that the image type is the general image, the generation unit 96 generates a source name "Video" indicating that the image type is the general image. Further, if the determination unit 95 determines that the image type is the special image, the generation unit 96 generates a source name "Video_Wide" indicating that the image type is the special image.

The calculation unit 97 is mainly implemented by the processing of the CPU 901. Based on the predetermined area information representing the predetermined area T and the predetermined area information received from another communication terminal by the transmitting and receiving unit 91, the calculation unit 97 calculates the position (i.e., position information) of the predetermined area T in the captured image.

The communication unit 98 is mainly implemented by the near field communication circuit 919, the antenna 919a, and the processing of the CPU 901. The communication unit 98 communicates with the communication unit 18a of the image capturing device 5a in accordance with a near field wireless communication technology conforming to the NFC, Bluetooth, or Wi-Fi standard, for example. In the present example, the communication unit 98 and the transmitting and receiving unit 91 are configured as separate communication units, but may be integrated together.

The storing and reading unit 99 is mainly implemented by the processing of the CPU 901. The storing and reading unit 99 stores various data and information in the storage unit 9000, and reads therefrom various data and information.

A functional configuration of the communication terminal 2 will be described with FIG. 16B.

The communication terminal 2 has basically the same functions as those of the communication terminal 1. That is, as illustrated in FIG. 16B, the communication terminal 2 includes a transmitting and receiving unit 71 (which includes a transmitting unit and a receiving unit), a receiving unit 72, an image and audio processing unit 73, a display control unit 74, a determination unit 75, a generation unit 76, a calculation unit 77, a communication unit 78, and a storing and reading unit 79. These units implement similar functions to those of the transmitting and receiving unit 91, the receiving unit 92, the image and audio processing unit 93, the display control unit 94, the determination unit 95, the generation unit 96, the calculation unit 97, the communication unit 98, and the storing and reading unit 99 of the communication terminal 1, and thus description thereof will be omitted.

The communication terminal 2 further includes a storage unit 7000 implemented by the ROM 902, the RAM 903, and the EEPROM 904 illustrated in FIG. 14. The storage unit 7000 stores an image type management DB 7001, an image capturing device management DB 7002, a predetermined area management DB 7003, and a viewer's view information DB 7004. These databases are the same in data structure as the image type management DB 9001, the image capturing device management DB 9002, the predetermined area management DB 9003, and the viewer's view information DB 9004 of the communication terminal 1, and thus description thereof will be omitted.

A functional configuration of the communication terminal 3 will be described with FIG. 15B.

The communication terminal 3 has basically the same functions as those of the communication terminal 1. That is, as illustrated in FIG. 15B, the communication terminal 3 includes a transmitting and receiving unit 31c, a receiving unit 32c, an image and audio processing unit 33c, a display control unit 34c, a determination unit 35c, a generation unit 36c, a calculation unit 37c, a communication unit 38c, and a storing and reading unit 39c. These units implement similar functions to those of the transmitting and receiving unit 91, the receiving unit 92, the image and audio processing unit 93, the display control unit 94, the determination unit 95, the generation unit 96, the calculation unit 97, the communication unit 98, and the storing and reading unit 99 of the communication terminal 1, and thus description thereof will be omitted.

The communication terminal 3 further includes a storage unit 3000c implemented by the ROM 302, the RAM 303, and the SSD 305 illustrated in FIG. 12. The storage unit 3000c stores an image type management DB 3001c, an image capturing device management DB 3002c, a predetermined area management DB 3003c, and a viewer's view information DB 3004c. These databases implement similar functions to those of the image type management DB 9001, the image capturing device management DB 9002, the predetermined area management DB 9003, and the viewer's view information DB 9004 of the communication terminal 1, and thus description thereof will be omitted.

A functional configuration of the communication terminal 4 will be described with FIG. 16B.

The communication terminal 4 has basically the same functions as those of the communication terminal 1. That is, as illustrated in FIG. 16B, the communication terminal 4 includes a transmitting and receiving unit 31*d*, a receiving unit 32*d*, an image and audio processing unit 33*d*, a display control unit 34*d*, a determination unit 35*d*, a generation unit 36*d*, a calculation unit 37*d*, a communication unit 38*d*, and a storing and reading unit 39*d*. These units implement similar functions to those of the transmitting and receiving unit 91, the receiving unit 92, the image and audio processing unit 93, the display control unit 94, the determination unit 95, the generation unit 96, the calculation unit 97, the communication unit 98, and the storing and reading unit 99 of the communication terminal 1, and thus description thereof will be omitted.

The communication terminal 4 further includes a storage unit 3000*d* implemented by the ROM 302, the RAM 303, and the SSD 305 illustrated in FIG. 12. The storage unit 3000*d* stores an image type management DB 3001*d*, an image capturing device management DB 3002*d*, a predetermined area management DB 3003*d*, and a viewer's view information DB 3004*d*. These databases implement similar functions to those of the image type management DB 9001, the image capturing device management DB 9002, the predetermined area management DB 9003, and the viewer's view information DB 9004 of the communication terminal 1, and thus description thereof will be omitted.

Figure 16A:
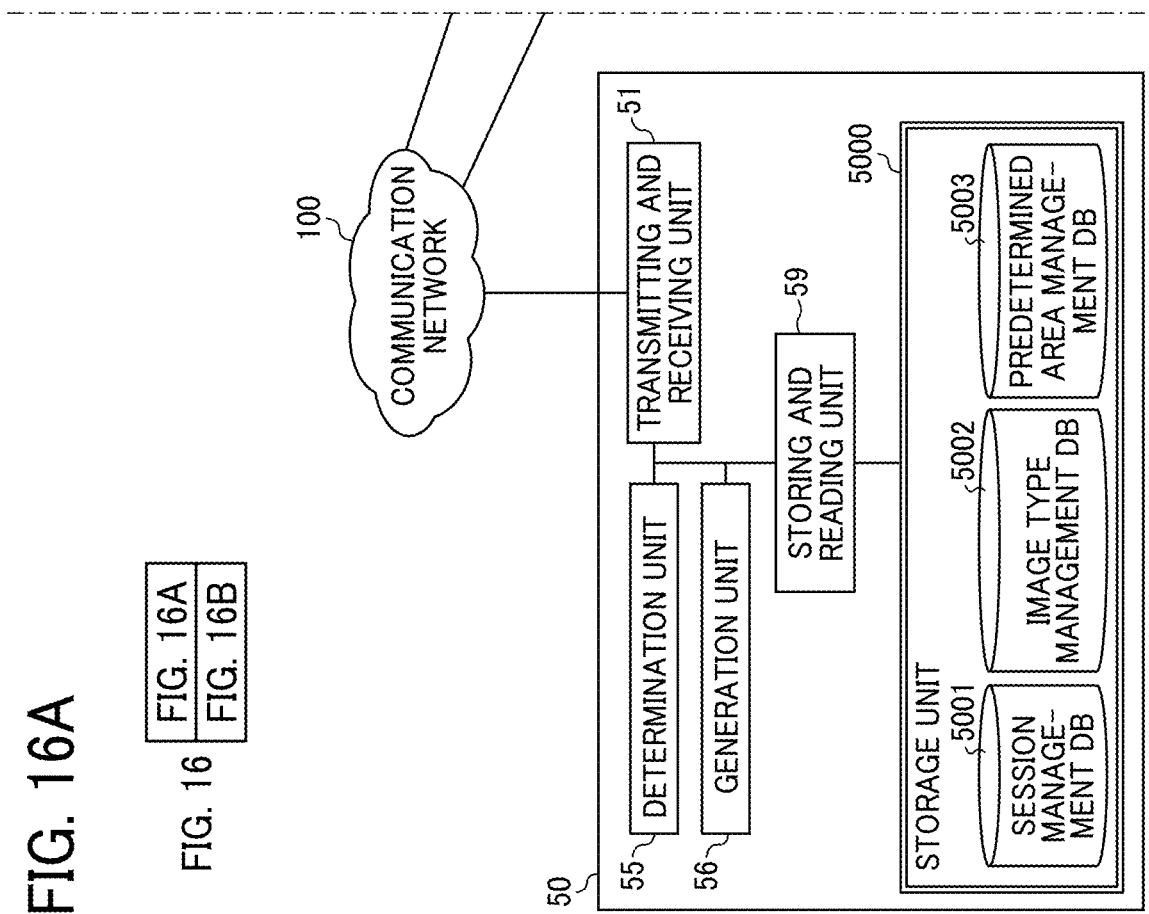

A functional configuration of the communication management system 50 will be described in detail with FIG. 16A.

The communication management system 50 includes a transmitting and receiving unit 51, a determination unit 55, a generation unit 56, and a storing and reading unit 59. Each of these units is a function or device implemented when at least one of the components illustrated in FIG. 13 operates in response to a command from the CPU 501 in accordance with the program for the communication management system 50 deployed on the RAM 503 from the HD 504.

The communication management system 50 further includes a storage unit 5000 implemented by the RAM 503 and the HD 504 illustrated in FIG. 13. The storage unit 5000 stores a session management DB 5001, an image type management DB 5002, and a predetermined area management DB 5003. The session management DB 5001 is configured as a session management table illustrated in FIG. 22. The image type management DB 5002 is configured as an image type management table illustrated in FIG. 23. The predetermined area management DB 5003 is configured as a predetermined area management table illustrated in FIG. 24.

FIG. 22 is a conceptual diagram illustrating the session management table. In the session management table, a session ID and the IP addresses of participant communication terminals are stored and managed in association with each other. The session ID is an example of session identification information for identifying a communication session that implements a video call. The session ID is generated for each virtual meeting room. The session ID is also managed in each of the communication terminals 1 to 4, and is used thereby in the selection of a communication session. The IP addresses of the participant communication terminals represent the IP addresses of the communication terminals participating in the communication session in the virtual meeting room represented by the session ID associated with the IP addresses.

FIG. 23 is a conceptual diagram illustrating the image type management table. In the image type management table of FIG. 23, in addition to the information items managed in the image type management table of FIG. 18, the session ID managed in the session management table is stored and managed in association with the information items. The image type management table of FIG. 23 indicates that three communication terminals with respective IP addresses "1.2.1.3," "1.2.2.3," and "1.3.1.3" are participating in the communication session in the virtual meeting room represented by the same session ID "se101." The communication management system 50 manages the image data IDs, the IP addresses of the transmitter terminals, and the source names (i.e., the image type information) the same as those managed in communication terminals such as the communication terminals 1 to 4 (i.e., video conference terminals). This is because, when a new communication terminal enters the virtual meeting room, for example, the communication management system 50 transmits the image type information and other information to both the communication terminals already participating in the video call and the newly participating communication terminal. It is thereby unnecessary for the communication terminals already participating in the video call and the newly participating communication terminal to transmit and receive therebetween the image type information and other information.

FIG. 24 is a conceptual diagram illustrating the predetermined area management table. The predetermined area management table of FIG. 24 is basically similar in data structure to the predetermined area management table of FIG. 20. The transmitting and receiving unit 51 transmits the latest predetermined area information to each of the communication terminals 1 to 4 at certain time intervals (e.g., at every 30 seconds), as described later. During the transmission of the predetermined area information in each of the certain time intervals, therefore, all predetermined area information received by the transmitting and receiving unit 51 is saved without being deleted. In the predetermined area management table of FIG. 24, the predetermined area information is managed such that a newer predetermined area information item is placed at a higher position.

Referring back to FIG. 16A, the transmitting and receiving unit 51 of the communication management system 50 is mainly implemented by the network I/F 509 and the processing of the CPU 501 illustrated in FIG. 13. The transmitting and receiving unit 51 transmits and receives various data and information to and from the communication terminals 1 to 4 via the communication network 100.

The determination unit 55 is mainly implemented by the processing of the CPU 501, and makes various determinations.

The generation unit 56 is mainly implemented by the processing of the CPU 501, and generates the image data ID.

The storing and reading unit 59 is mainly implemented by the HDD 505 and the processing of the CPU 501 illustrated in FIG. 13. The storing and reading unit 59 stores various data and information in the storage unit 5000, and reads therefrom various data and information.

A process of having a communication terminal participate in a specific communication session will be described with FIGS. 25 and 26.

Figure 25:
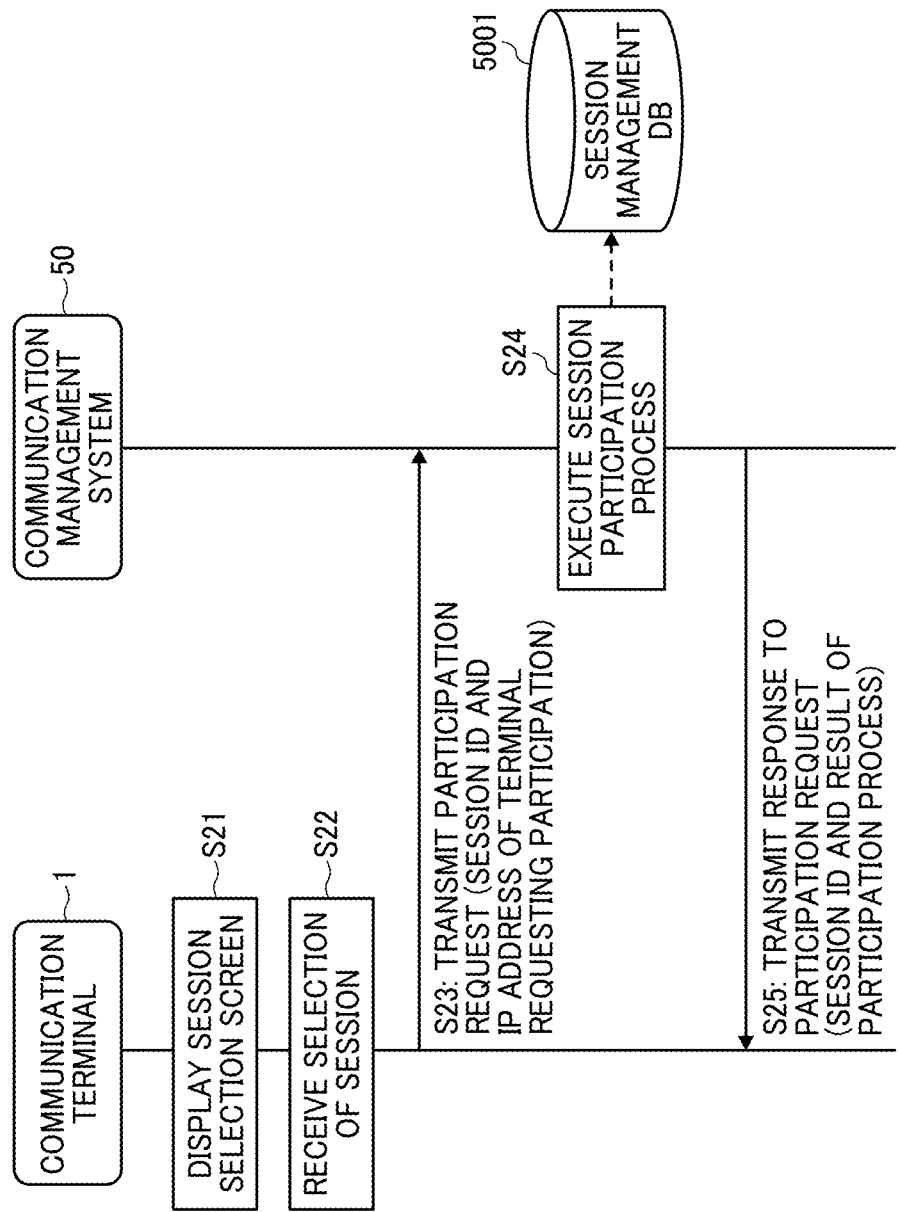
FIG. 25 is a sequence diagram illustrating an example of a process of having a communication terminal of the image communication system participate in a specific communication session.
Figure 26:
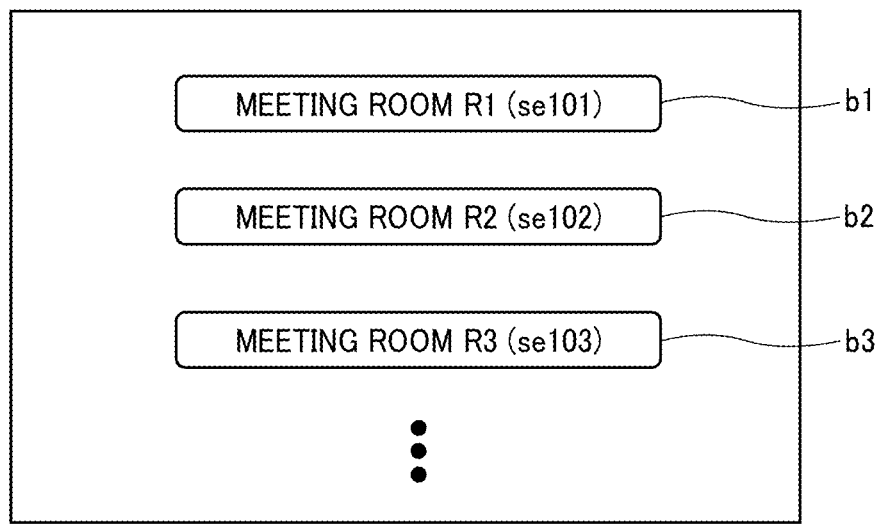
FIG. 26 is a diagram illustrating an example of a selection screen displayed on a communication terminal of the image communication system to select a communication session in a virtual meeting room.

FIG. 25 is a sequence diagram illustrating a process of having a communication terminal participate in a specific communication session. FIG. 26 is a diagram illustrating a selection screen for selecting a communication session in a virtual meeting room.

The photographer 8 at the site A first operates the communication terminal 1 to display the selection screen for selecting a communication session in a virtual meeting room. Then, in the communication terminal 1, the receiving unit 92 receives the operation for displaying the selection screen, and the display control unit 94 displays the selection screen as illustrated in FIG. 26 on the display 917 of the communication terminal 1 (step S21). The selection screen displays selection buttons b1, b2, and b3, which represent virtual meeting rooms R1, R2, and R3, respectively, as options. The selection buttons b1, b2, and b3 are associated with respective session IDs se101, se102, and se103.

The photographer 8 then selects one of the selection buttons b1, b2, and b3 corresponding to a desired virtual meeting room. It is assumed here that the photographer 8 selects the selection button b1. Then, the receiving unit 92 receives the selection of the communication session (step S22). The virtual meeting room selected here is one previously designated for a certain purpose.

Then, the transmitting and receiving unit 91 transmits a participation request to the communication management system 50 to participate in the communication session in the virtual meeting room (step S23). The participation request includes the session ID representing the communication session, the selection of which has been received at step S22, and the IP address of the communication terminal 1 transmitting the participation request. Then, the transmitting and receiving unit 51 of the communication management system 50 receives the participation request.

The storing and reading unit 59 of the communication management system 50 then adds the IP address received at step S23 to the session management DB 5001, specifically to the field of a participant terminal IP address in a record corresponding to the session ID received at step S23. Thereby, a communication session participation process is performed (step S24).

The transmitting and receiving unit 51 then transmits a response to the participation request to the communication terminal 1 (step S25). The response to the participation request includes the session ID received at step S23 and a result of the participation process. Then, the transmitting and receiving unit 91 of the communication terminal 1 receives the response to the participation request.

A procedure of a process following a successful participation process will be described.

The communication terminals 2 to 4 at the sites B to D similarly transmit the participation request to the communication management system 50, and select the virtual meeting room selected by the communication terminal 1. Thereby, the communication terminals 1 to 4 participate in the same communication session to have a video call with each other. The communication session participation method described above with FIGS. 25 and 26 is illustrative. For example, the photographer 8 may establish a communication session by specifying identification information of a destination communication terminal or user. In this case, the communication session is established when the destination communication terminal or user specified as the destination (i.e., address) responds to a call from the photographer 8.

With reference to FIGS. 27 to 35, a method of receiving the photographer's view information will be described. In the present embodiment, there are two types of methods of receiving the photographer's view information.

A first method of receiving the photographer's view information will be described.

Figure 27:
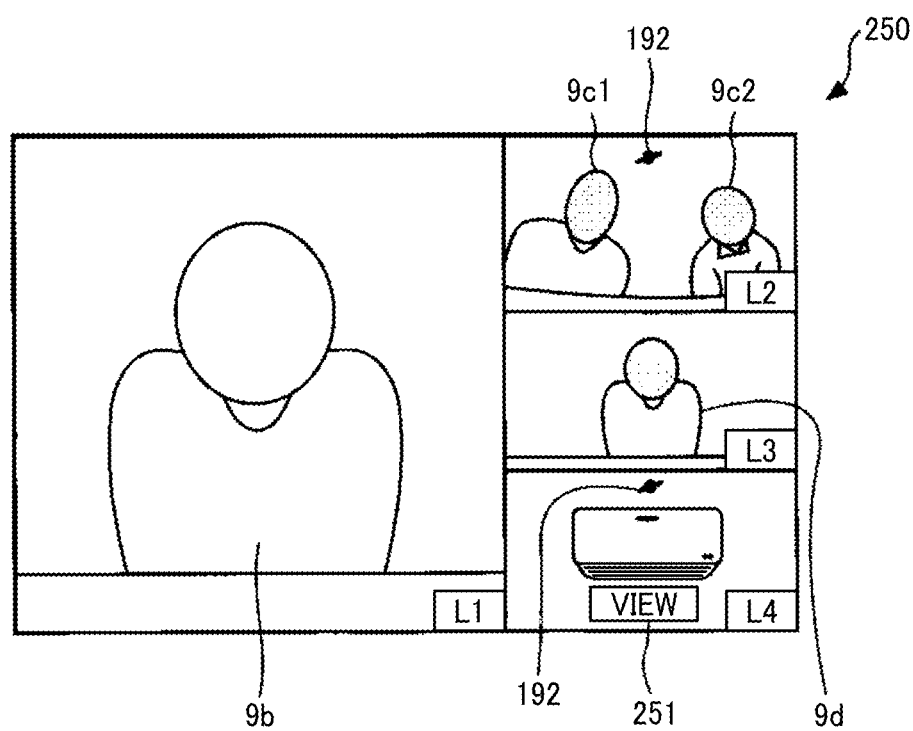
FIG. 27 is a diagram illustrating an example of an image display screen displayed on a display of a communication terminal at one site of the image communication system.

FIG. 27 illustrates an example of an image display screen 250 displayed on the display 917 of the communication terminal 1 at the site A. A left display area L1 of the image display screen 250 displays the omnidirectional image of the site B. An upper-right display area L2 of the image display screen 250 displays the omnidirectional image of the site C. A middle-right display area L3 of the image display screen 250 displays the image of the site D. A lower-right display area L4 of the image display screen 250 displays the image of the site A, at which the communication terminal 1 is located. The display area L1 is a main display area, and the display areas L2 to L4 are sub-display areas. Each of the communication terminals 1 to 4 is capable of switching the image of the main display area to one of the images of the sub-display areas. At each of the sites A to D, the main display area normally displays the image of the site at which a keyperson of the video call is located.

The display areas L2 and L4 display an omnidirectional image icon 192. The omnidirectional image icon 192 indicates that the image displayed in the corresponding display area is the omnidirectional image. In the free viewpoint mode, the user is able to change the predetermined area T. The receiving unit 92 of the communication terminal 1 receives the selection of the predetermined area T.

The display area L4 displays the image of an air-conditioner. Herein, the air-conditioner is an example of the object to which the photographer 8 wants the other users to pay attention. The display area L4 further displays a view button 251. The view button 251 is used to switch the view mode between the free viewpoint mode and the photographer's view mode. When it is determined that the omnidirectional image has been received, the communication terminal 1 displays the omnidirectional image in the layout according to the operation of the view button 251. For example, if the photographer 8 presses the view button 251 once, the view mode switches to the photographer's view mode. Then, if the photographer 8 presses the view button 251 again, the view mode returns to the free viewpoint mode. Either in the free viewpoint mode or the photographer's view mode, the calculation unit 97 of the communication terminal 1 generates the predetermined area information corresponding to the predetermined area image displayed in the display area L4. In the photographer's view mode, this predetermined area information is transmitted to the other sites B to D as the photographer's view information.

Although FIG. 27 illustrates the display areas L1 to L4 displaying the respective images of the sites A to D for easier understanding, the photographer 8 is able to display the display area L4 in an enlarged size on the entire image display screen 250, for example. Thereby, user operability in determining the predetermined area T is improved.

TABLE 2 given below is a conceptual table illustrating the photographer's view information. The photographer's view information refers to the information of the radius vector, the polar angle, and the azimuth for identifying the center point CP selected for display by the photographer 8 from the whole image.

TABLE 2

| photographer's view information | | |
|---|---|---|
| radius vector (r) | polar angle (θ) | azimuth (φ) |
| 10 | 20 | 30 |

A second method of receiving the photographer's view information will be described.

The second method of receiving the photographer's view information uses the image capturing device 5a. According to the second method, the photographer 8 is able to generate the photographer's view information simply by pressing a predetermined button of the image capturing device 5a and pointing the image capturing device 5a at a target object. In the second method, the coordinates of the point of interest are previously defined in the image capturing device 5a. The photographer 8 points the image capturing device 5a at the target object such that the coordinates of the point of interest are aligned with the target object. In this process, the image capturing device 5a detects the attitude information and converts the coordinates of the point of interest in accordance with the detected attitude information. The thus-converted coordinates of the point of interest correspond to the photographer's view information.

The attitude information of the image capturing device 5a will be described with FIGS. 28 to 30C.

Figure 28:
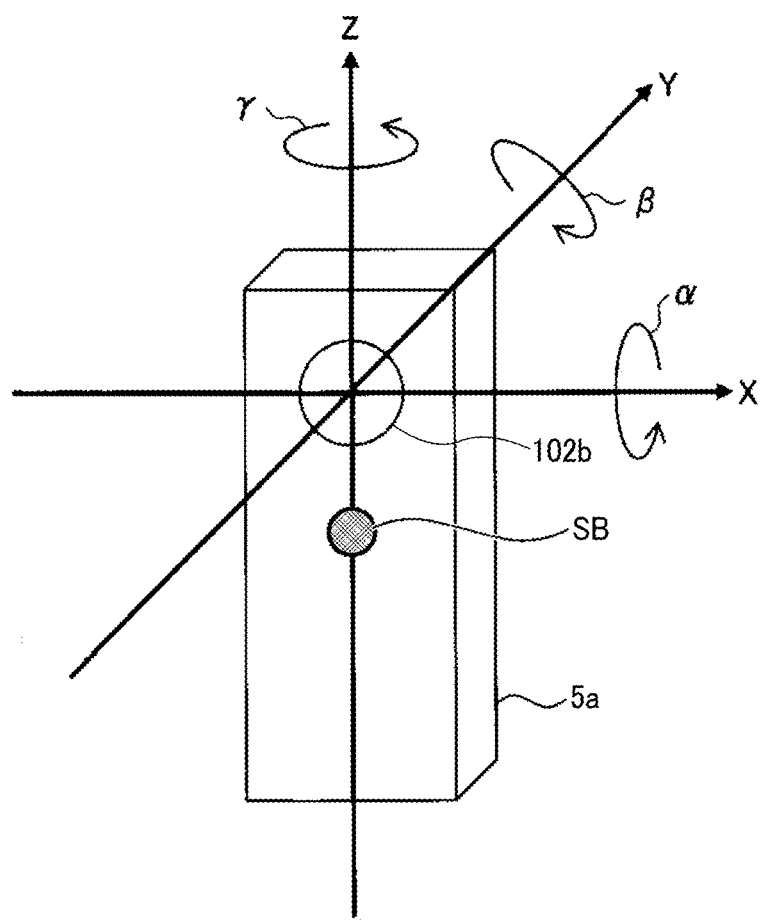
FIG. 28 is a diagram illustrating an example of coordinate axes of the image capturing device.
Figure 29:
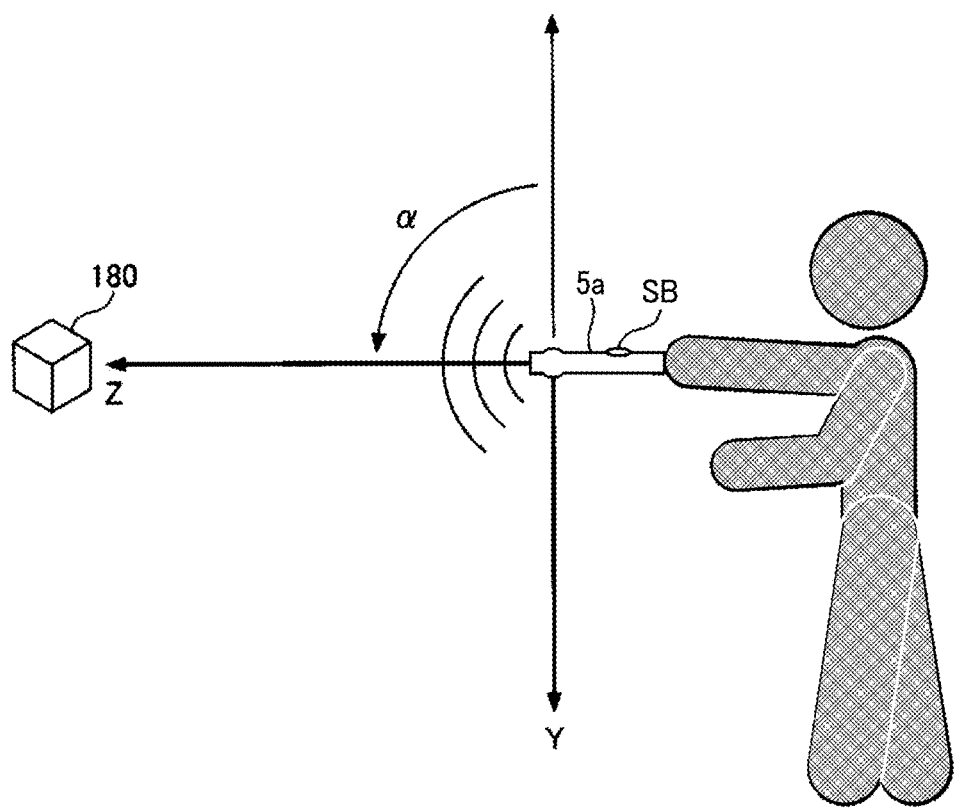
FIG. 29 is a diagram illustrating an example of a reference attitude of the image capturing device.

FIG. 28 is a diagram illustrating an example of coordinate axes of the image capturing device 5a. FIG. 29 is a diagram illustrating an example of a reference attitude of the image capturing device 5a. The reference attitude of the image capturing device 5a refers to the attitude of the image capturing device 5a in an initial state.

As illustrated in FIG. 28, the longitudinal direction of the image capturing device 5a corresponds to the Z-axis, and the direction of passing through the two fisheye lens 102a and 102b from the surface of the image capturing device 5a with the shutter button SB to the other surface of the image capturing device 5a corresponds to the Y-axis. Further, the width direction of the image capturing device 5a corresponds to the X-axis. The X-axis, the Y-axis, and the Z-axis move with the movement of the image capturing device 5a. The image capturing device 5a is rotatable around each of the X-axis, the Y-axis, and the Z-axis. The rotation angle around the X-axis, the rotation angle around the Y-axis, and the rotation angle around the Z-axis are represented as $\alpha$, $\beta$, and $\gamma$, respectively.

As illustrated in FIG. 29, when the photographer 8 points the image capturing device 5a at an object 180, the photographer 8 points the upper side in the longitudinal direction of the image capturing device 5a to the object 180. When the erected state of the image capturing device 5a is defined as the initial state, the rotation angles $\alpha$, $\beta$, and $\gamma$ in the state of FIG. 29 are −90 degrees, 0 degrees, and 0 degrees, respectively.

Figure 30A:
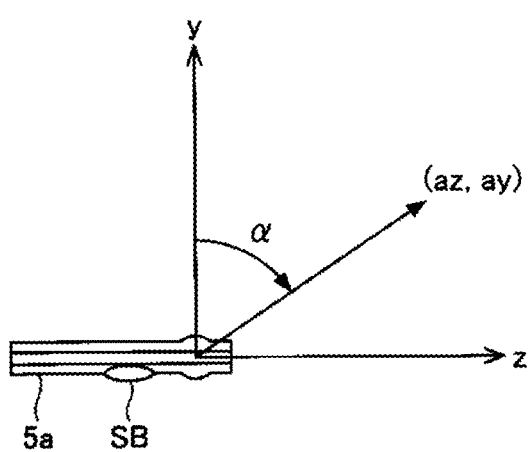
FIGS. 30A to 30C are diagrams illustrating an example of values detected by an acceleration and orientation sensor of the image capturing device.
Figure 30B:
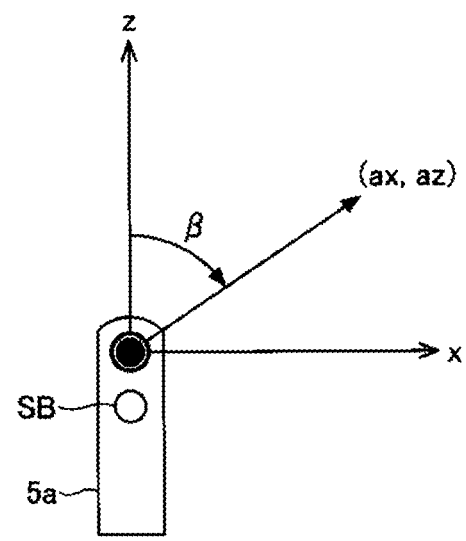
Figure 30C:
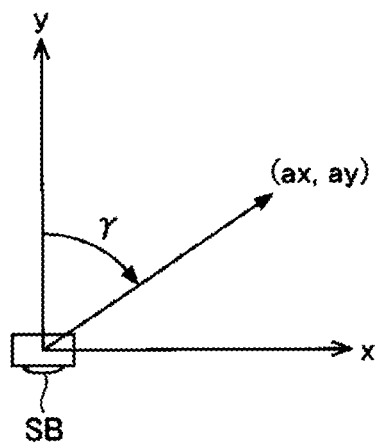

FIGS. 30A to 30C are diagrams illustrating values detected by the acceleration and orientation sensor 118 of the image capturing device 5a. As illustrated in FIG. 30A, the image capturing device 5a rotates around the X-axis by the rotation angle $\alpha$. When the values detected by the acceleration and orientation sensor 118 are represented as (ax, ay, az), the rotation angle $\alpha$ is expressed as:

$$\alpha = \operatorname{atan}^2(ay, -az) \quad ay^\wedge 2 + az^\wedge 2 \geq threshR^\wedge 2$$
$$= 0 \quad ay^\wedge 2 + az^\wedge 2 < threshR^\wedge 2$$

Herein, the range of values of the rotation angle $\alpha$ is expressed as $-\pi < \alpha \leq \pi$, and threshR represents a threshold value set as desired.

The rotation around the Y-axis and the rotation around the Z-axis are illustrated as in FIG. 30B and FIG. 30C, respectively. To improve responsiveness, the gyro sensor 119 may be used. Values (g$\alpha$, g$\beta$, g$\gamma$) output from the gyro sensor 119 correspond to an angular velocity (radians per second (rad/sec)). With the values (g$\alpha$, g$\beta$, g$\gamma$) of the gyro sensor 119, the rotation angles $\alpha$, $\beta$, and $\gamma$ (i.e., the attitude information) of the image capturing device 5a may be calculated as:

$$\alpha(n+1)=\alpha(n)+k*g\alpha*dt$$

$$\beta(n+1)=\beta(n)+k*g\beta*dt$$

$$\gamma(n+1)=\gamma(n)+k*g\gamma*dt$$

Herein, the direction of the image capturing device 5a in the initial state is expressed as ($\alpha(0)$, $\beta(0)$, $\gamma(0)$)=($\alpha$0, 0, 0). Further, k represents a coefficient related to the sensitivity of the gyro sensor 119, and the initial value of the coefficient k is set to 1.0. To reduce the influence of movements of a hand holding the image capturing device 5a, for example, the initial value of the coefficient k may be adjusted to 0.5, for example, to obtain the effect of a low-pass filter. The thus-obtained values ($\alpha$, $\beta$, $\gamma$) represent the attitude information. The rotation angle $\gamma$ around the Z-axis does not affect the pointing direction of the image capturing device 5a, and thus may not be calculated.

The correct value of the rotation angle $\alpha$ around the X-axis is obtainable from the signal of the acceleration and orientation sensor 118 even if the initial value of the rotation angle $\alpha$ is not zero. Further, the rotation angle $\gamma$ around the Z-axis does not affect the pointing direction of the image capturing device 5a, as described above. As for the rotation angle $\beta$ around the Y-axis, on the other hand, the initial value thereof is simply set to zero. Therefore, if the image capturing device 5a is tilted in the initial state at the time of power-on, for example, the correct value of the rotation angle $\beta$ may not be obtained. When the photographer 8 points the image capturing device 5a at an object, therefore, it is desirable that the photographer 8 first initializes the values of the rotation angles $\alpha$, $\beta$, and $\gamma$ by pressing and holding a predetermined button of the image capturing device 5a in the erected state of the image capturing device 5a, for example.

Alternatively, the initial value of the rotation angle $\beta$ around the Y-axis may also be calculated based on the output from the acceleration and orientation sensor 118 similarly to the value of the rotation angle $\alpha$ around the X-axis.

Figure 31A:
FIG. 31A is a conceptual diagram illustrating a state in which a photographer points the image capturing device at an object.
Figure 31C:
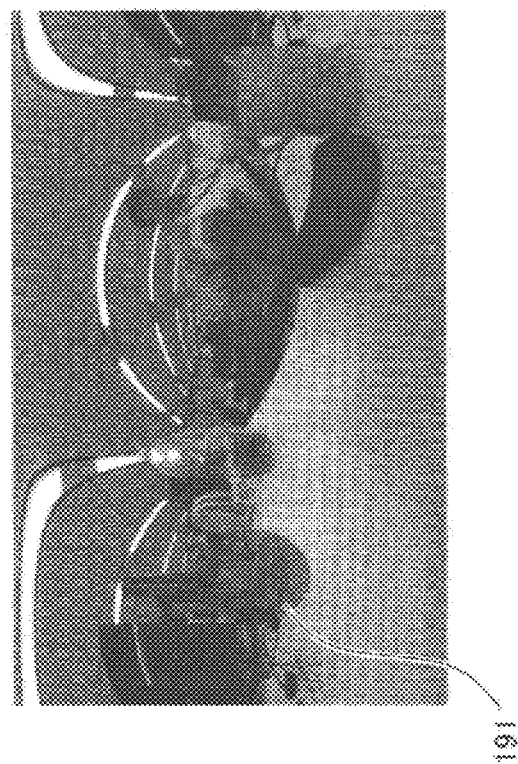
FIG. 31C is a diagram illustrating an example of an equidistant cylindrical image as an omnidirectional image expressed by equidistant cylindrical projection with zenith correction.
Figure 31B:
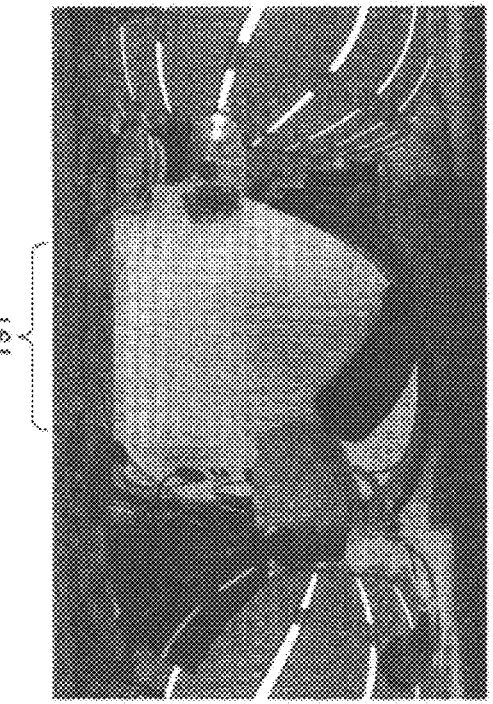
FIG. 31B is a diagram illustrating an example of an equidistant cylindrical image as an omnidirectional image expressed by equidistant cylindrical projection without zenith correction.

With reference to FIGS. 31A to 31C, a description will be given of how the coordinates of the point of interest used by the photographer 8 to point at the object are processed in the zenith correction.

FIG. 31A illustrates a state in which the photographer 8 points the image capturing device 5a at an object, specifically a doll 190. For example, when the coordinates of the point of interest represent pixels or an area corresponding to the image of the subject located on the upper side in the longitudinal direction of the image capturing device 5a, the image captured in the state of FIG. 31A is rendered as in FIG. 31B. FIG. 31B illustrates an equidistant cylindrical image as an omnidirectional image expressed by equidistant cylindrical projection. This equidistant cylindrical image is not subjected to the zenith correction. In the formation of the equidistant cylindrical image, the subject located on the upper side in the longitudinal direction of the image capturing device 5a is extended in the lateral direction in an upper end part of the equidistant cylindrical image. That is, without the zenith correction, the subject located on the upper side in the longitudinal direction of the image capturing device 5a is placed in the upper end part of the equidistant cylindrical image. Further, in the equidistant cylindrical image, the subject in the upper end part thereof is extended in the lateral direction. Without the zenith correction, the coordinates of the point of interest remain at the same position in the equidistant cylindrical image.

Irrespective of the attitude of the image capturing device 5a, an object located in an upper part of an actual space is placed in an upper part of the image by the image capturing device 5a. Similarly, an object located in a lower part of the actual space is placed in a lower part of the image by the image capturing device 5a. Therefore, the zenith correction is performed on the image based on the attitude information. FIG. 31C illustrates an equidistant cylindrical image subjected to the zenith correction. The direction and amount of the zenith correction are determined by the attitude information. Therefore, the coordinates of the point of interest in the equidistant cylindrical image are obtained by rotating the coordinates of the original defined point of interest with coordinate conversion information for rotating the image for the zenith correction. In FIG. 31C, the coordinates of the point of interest are encircled by a circle 191. The circle 191 includes the image of the doll 190 illustrated in FIG. 31A. That is, the object pointed by the photographer 8 is identified with the coordinates of the point of interest.

Functions of the image processing unit 16a of the image capturing device 5a will be described with FIG. 32.

Figure 32:
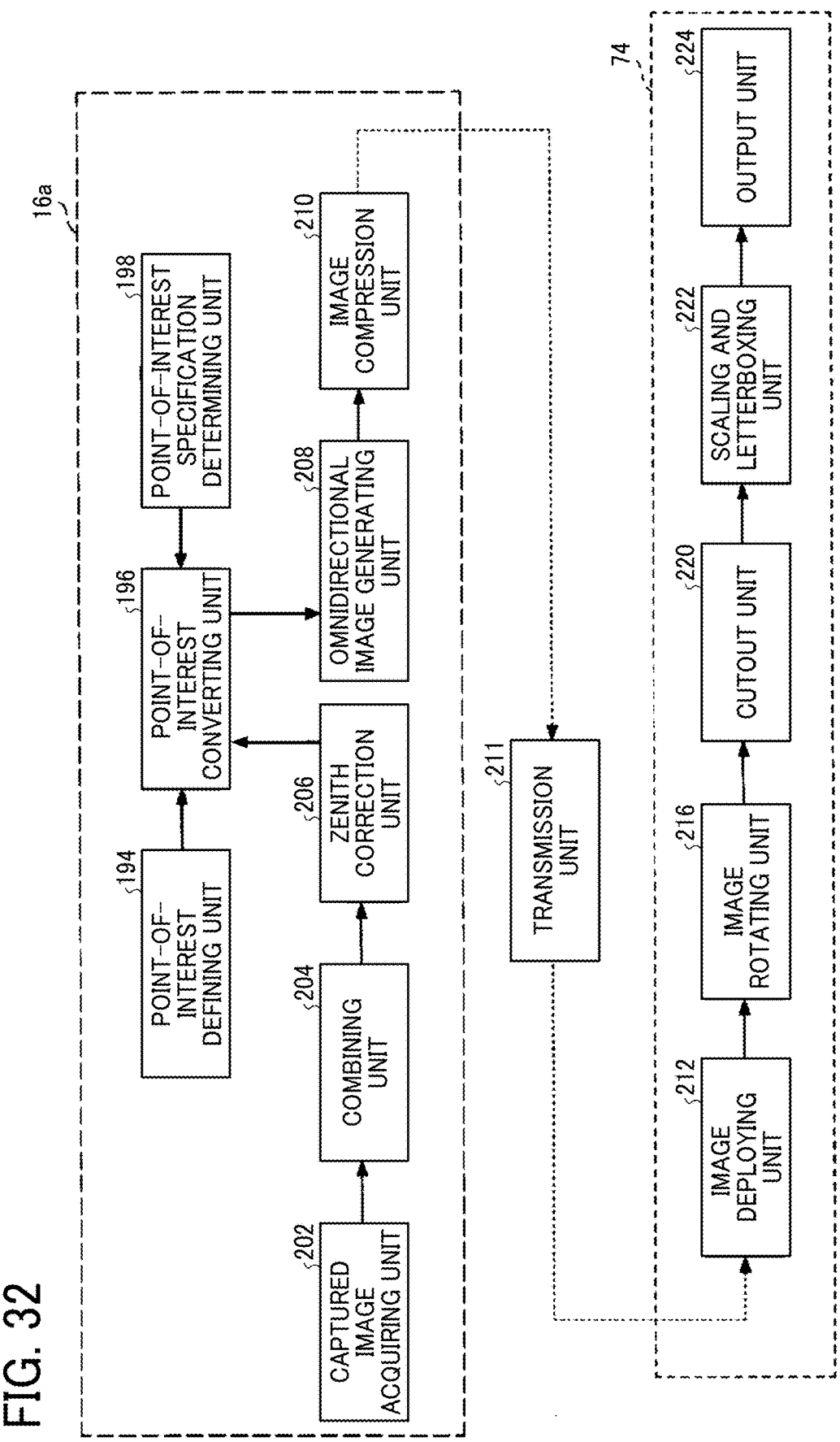
FIG. 32 is a functional block diagram illustrating exemplary functional blocks of an image processing unit of the image capturing device.

FIG. 32 illustrates major functional blocks of the image processing unit 16a of the image capturing device 5a. The image processing unit 16a includes a captured image acquiring unit 202, a combining unit 204, a zenith correction unit 206, an omnidirectional image generating unit 208, an image compression unit 210, a point-of-interest defining unit 194, a point-of-interest converting unit 196, and a point-of-interest specification determining unit 198.

The captured image acquiring unit 202 controls the two imaging elements 103a and 103b to acquire therefrom the respective captured images. When the image capturing device 5a captures still images, two captured images are acquired for one frame when the shutter button SB is pressed. When the image capturing device 5a captures video images, images are sequentially captured in successive frames, and two captured images are acquired for each of the frames. The image captured by each of the imaging elements 103a and 103b is a fisheye image with a substantially hemispherical field of view, and is a partial image of the omnidirectional image. In the following description, the image captured by each of the imaging elements 103a and 103b will be occasionally referred to as the partial image.

The combining unit 204 executes a combining position detection process of detecting a combining position for combining the two acquired partial images, to thereby combine the two partial images at the combining position. In the combining position detection process, the combining unit 204 detects, for each frame, respective positional deviation amounts of a plurality of corresponding points in an overlapping area of the partial images.

The point-of-interest defining unit 194 defines and holds the coordinates (x, y) of the point of interest in a planar image. The coordinates of the point of interest are not set by a user (e.g., the photographer 8), but are previously defined (i.e., fixed) in a manufacturing, designing, or shipment process, for example. Plural sets of coordinates may be defined for the point of interest. In this case, the photographer 8 operates the image capturing device 5a or the communication terminal 1 to select a desired set of coordinates for the point of interest.

The point-of-interest specification determining unit 198 determines whether the photographer 8 is specifying the point of interest. For example, if a predetermined button of the image capturing device 5a is kept pressed down, the point-of-interest specification determining unit 198 determines that the photographer 8 is specifying the point of interest. If the predetermined button is not kept pressed down, the point-of-interest specification determining unit 198 determines that the photographer 8 is not specifying the point of interest. When the point-of-interest specification determining unit 198 determines that the photographer 8 is specifying the point of interest, the point-of-interest specification determining unit 198 stores the information indicating that the current view mode is the photographer's view mode in the mode management DB 1001a via the storing and reading unit 19a.

Based on the attitude information acquired by the attitude information acquiring unit 15a, the zenith correction unit 206 executes a correction process for adjusting the zenith direction of the omnidirectional image to match a predetermined reference direction. Specifically, the zenith correction unit 206 corrects a later-described conversion table in FIG. 33A. Herein, the predetermined reference direction is typically along the vertical direction in which the acceleration of gravity acts. With the zenith direction of the omnidirectional image corrected to match the vertical direction (i.e., upward direction), the user is prevented from having discomfort such as sickness from watching three-dimensional image, particularly three-dimensional video image, when the field of view is changed during viewing of the image.

Based on the processing results of the point-of-interest defining unit 194 and the point-of-interest specification determining unit 198 and the corrected conversion table, the point-of-interest converting unit 196 converts the coordinates (x, y) of the point of interest in a plane coordinate system (hereinafter referred to as the plane coordinates (x, y)) into the coordinates (θ, φ) of the point of interest in a spherical coordinate system (hereinafter referred to as the spherical coordinates (θ, φ)). That is, the point-of-interest converting unit 196 determines the coordinates of the point of interest subjected to the zenith correction based on the attitude information. The point-of-interest converting unit 196 attaches the information of the thus-converted point of interest to the omnidirectional image as the photographer's view information.

In the second method of receiving the photographer's view information, the photographer 8 is unable to specify the radius vector r. This is because the radius vector r is not determined by the direction of the image capturing device 5a alone. The point-of-interest converting unit 196 therefore sets the radius vector r to a predetermined value (e.g., r=10).

The omnidirectional image generating unit 208 executes a process of generating the omnidirectional image from the two captured partial images with the processing result of the point-of-interest converting unit 196. In the present embodiment, the conversion table is also used to generate the omnidirectional image from the two partial images. The omnidirectional image generating unit 208 generates the omnidirectional image from the two partial images with the corrected conversion table. With this process, a processing load for obtaining the final omnidirectional image is reduced.

The method of generating the omnidirectional image, however, is not limited to the above-described method. For example, the two partial images may be combined to generate an omnidirectional image, and the zenith correction process may be performed on the thus-generated omnidirectional image to generate an omnidirectional image subjected to the zenith correction.

The image compression unit 210 includes a still image compression unit. When the image capturing device 5a captures still images, the image compression unit 210 compresses the captured image into image data in a predetermined still image format such as the joint photographic experts group (JPEG) format. When the image capturing device 5a captures video images, the image compression unit 210 compresses successive frames of the captured image into image data in a predetermined video image format. Video compression formats usable in this case include, but are not limited to, H.264/moving picture experts group (MPEG)-4 advanced video coding (AVC), H.265/high efficiency video coding (HEVC), motion JPEG, and motion JPEG 2000, for example. The generated image data is transmitted to the sites B to D by a transmission unit 211. The transmission unit 211 corresponds to the communication unit 18a of the image capturing device 5a and the transmitting and receiving unit 91 of the communication terminal 1.

FIG. 32 further illustrates the display control unit 74 of the communication terminal 2. Function of the display control unit 74 will be described later.

The conversion table will be described in more detail with FIGS. 33A and 33B.

Figures 33A, 33B:
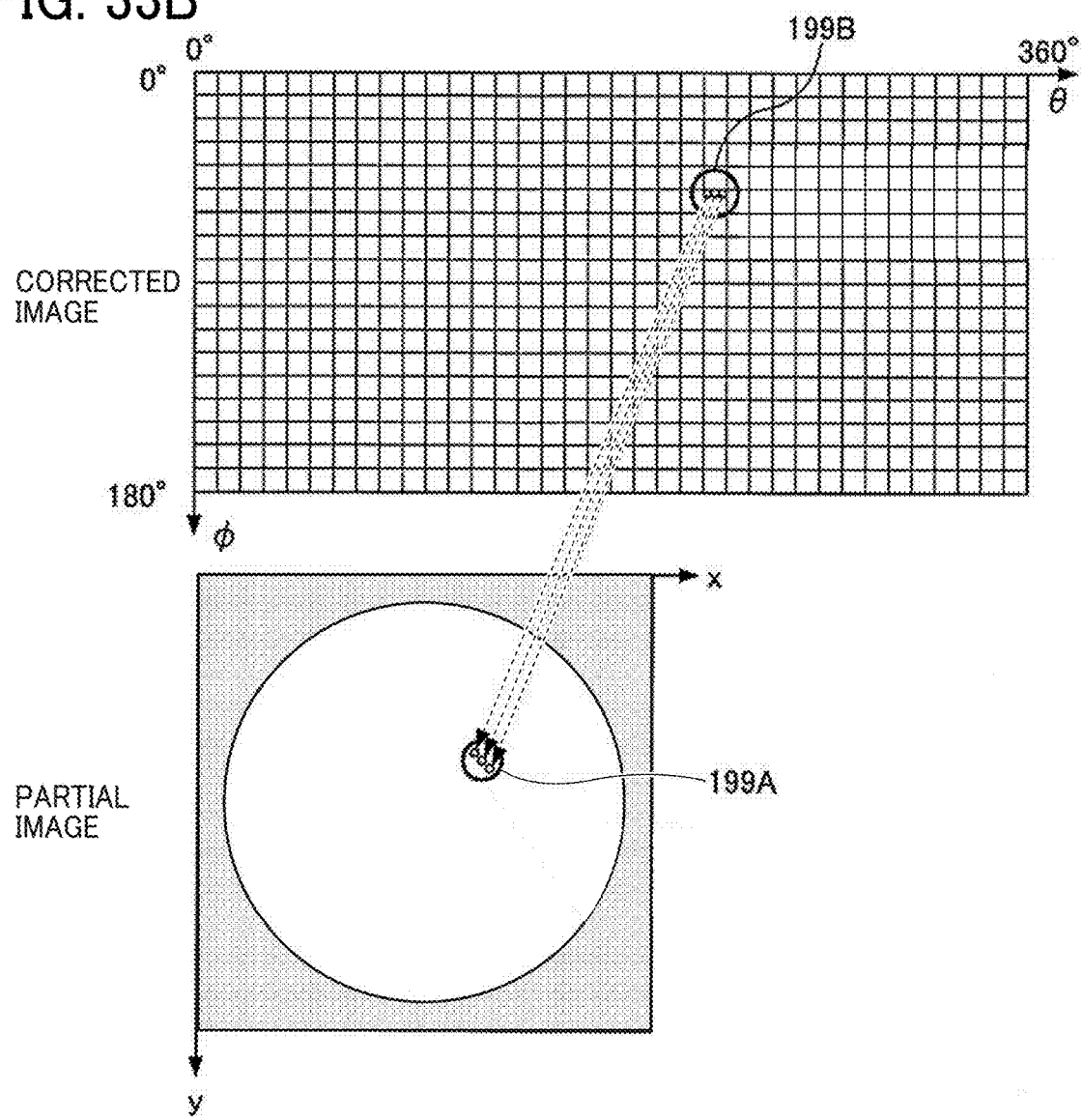
FIG. 33A is a diagram illustrating an example of a conversion table used by the image capturing device.
FIG. 33B is a diagram illustrating an example of conversion from a plane coordinate system into a spherical coordinate system.

FIG. 33A is a diagram illustrating an example of the conversion table. FIG. 33B is a diagram illustrating conversion from a plane coordinate system into a spherical coordinate system. FIG. 33A illustrates a conversion table used by the image capturing device 5a of the embodiment. The conversion table specifies projection of the partial image captured by the imaging element 103a or 103b, which is expressed by the plane coordinates (x, y), to the equidistant cylindrical image expressed by the spherical coordinates ($\theta$, $\varphi$) (hereinafter referred to as the corrected image). For each of the fisheye lenses 102a and 102b, the conversion table holds association information for all values of the spherical coordinates ($\theta$, $\varphi$). The association information associates the values of the spherical coordinates ($\theta$, $\varphi$) of the corrected image with the values of the plane coordinates (x, y) of the pre-correction partial image, which are mapped into the values of the spherical coordinates ($\theta$, $\varphi$). In the example illustrated in FIGS. 33A and 33B, the angle of each pixel is 0.1 degrees in both the $\theta$ direction and the $\varphi$ direction, and the conversion table stores information of 3600×1800 corresponding relationships for each of the fisheye lenses 102a and 102b. The original conversion table may be tabulated with values calculated with distortion from an ideal lens model previously corrected by a manufacturer of the image capturing device 5a, for example.

As illustrated in FIG. 33B, coordinates 199A of the point of interest expressed as the plane coordinates (x, y) are projected to the spherical coordinates ($\theta$, $\varphi$) based on the conversion table. As viewed from the image capturing device 5a, the direction of the coordinates 199A of the point of interest expressed as the plane coordinates (x, y) is constant. If the conversion table is fixed, therefore, coordinates 199B of the point of interest expressed as the spherical coordinates ($\theta$, $\varphi$) are also constant.

However, the attitude of the image capturing device 5a changes depending on how the photographer 8 holds the image capturing device 5a. Therefore, the vertical direction of the actual space and the vertical direction of the corrected image do not match unless the conversion table is corrected in accordance with the attitude information. In the zenith correction, therefore, the conversion table is corrected in accordance with the attitude information.

Figure 34:
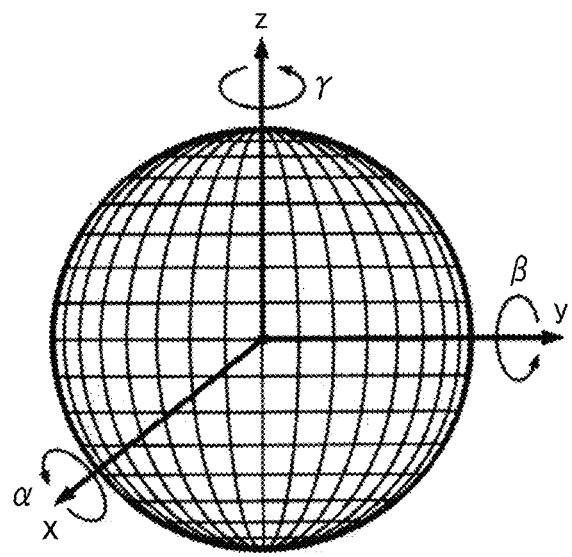
FIG. 34 is a diagram illustrating an example of correction of the conversion table based on attitude information of the image capturing device.

FIG. 34 is a diagram illustrating correction of the conversion table based on the attitude information. Herein, three-dimensional orthogonal coordinates before the coordinate conversion are expressed as (x1, y1, z1), and spherical coordinates of the three-dimensional orthogonal coordinates (x1, y1, z1) are expressed as ($\theta$1, $\varphi$1). Further, three-dimensional orthogonal coordinates after the coordinate conversion are expressed as (x2, y2, z2), and spherical coordinates of the three-dimensional orthogonal coordinates (x2, y2, z2) are expressed as ($\theta$2, $\varphi$2).

In the process of correcting the conversion table, the spherical coordinates ($\theta$1, $\varphi$1) are converted into the spherical coordinates ($\theta$2, $\varphi$2) with equations (1) to (6) given below.

[Math. 1]

$$x1 = \sin(\phi 1)\cos(\theta 1) \tag{1}$$

$$y1 = \sin(\phi 1)\sin(\theta 1) \tag{2}$$

$$z1 = \cos(\phi 1) \tag{3}$$

$$\begin{pmatrix} x2 \\ y2 \\ z2 \end{pmatrix} = \begin{pmatrix} 1 & 0 & 0 \\ 0 & \cos\alpha & \sin\alpha \\ 0 & -\sin\alpha & \cos\alpha \end{pmatrix} \begin{pmatrix} \cos\beta & 0 & -\sin\beta \\ 0 & 1 & 0 \\ \sin\beta & 0 & \cos\beta \end{pmatrix} \begin{pmatrix} \cos\gamma & \sin\gamma & 0 \\ -\sin\gamma & \cos\gamma & 0 \\ 0 & 0 & 1 \end{pmatrix} \begin{pmatrix} x1 \\ y1 \\ z1 \end{pmatrix} \tag{4}$$

$$\phi 2 = \text{Arccos}(z2) \tag{5}$$

$$\theta 2 = \text{Arctan}\left(\frac{y2}{x2}\right) \tag{6}$$

To perform rotational transformation with three-dimensional orthogonal coordinates, a process of converting the spherical coordinates ($\theta$1, $\varphi$1) into the three-dimensional orthogonal coordinates (x1, y1, z1) is first executed with equations (1) to (3).

Then, based on equation (4), the three-dimensional orthogonal coordinates (x1, y1, z1) are converted into the three-dimensional orthogonal coordinates (x2, y2, z2) with the rotation angles $\alpha$, $\beta$, and $\gamma$ (i.e., the attitude information) of the image capturing device 5a that points at the object. Equation (4) indicates that the original coordinates are rotated around the X-axis by the rotation angle $\alpha$, rotated around the Y-axis by the rotation angle $\beta$, and rotated around the Z-axis by the rotation angle $\gamma$ to obtain the post-conversion coordinates.

Finally, the post-conversion three-dimensional orthogonal coordinates (x2, y2, z2) are converted back to the spherical coordinates ($\theta$2, $\varphi$2) with equations (5) and (6). The coordinates ($\theta$1, $\varphi$1) represent the pre-correction spherical coordinates of the conversion table, and the spherical coordinates ($\theta$1, $\varphi$1) of the conversion table are corrected to ($\theta$2, $\varphi$2) in accordance with the attitude information of the image capturing device 5a.

With the corrected conversion table, the point-of-interest converting unit 196 converts the plane coordinates of the point of interest into the spherical coordinates of the point of interest. Thereby, the spherical coordinates of the point of interest subjected to the zenith correction are obtained.

Functions of the display control units 94, 74, 34c, and 34d of the communication terminals 1 to 4 will be described.

In response to receipt of an omnidirectional image from another site, the communication terminals 1 to 4 display the omnidirectional image. The functions of the display control units 94, 74, 34c, and 34d of the communication terminals 1 to 4 are the same in both the first and second methods of receiving the photographer's view information.

The functions of the display control unit 74 of the communication terminal 2 will be described below with FIG. 32, but the description similarly applies to the display control unit 34c of the communication terminal 3, the display control unit 34d of the communication terminal 4, and the display control unit 94 of the communication terminal 1.

Referring back to FIG. 32, the display control unit 74 of the communication terminal 2 includes an image deploying unit 212, an image rotating unit 216, a cutout unit 220, a scaling and letterboxing unit 222, and an output unit 224.

The image deploying unit 212 reads and acquires the omnidirectional image transmitted from the image capturing device 5a, and deploys the acquired omnidirectional image on a memory of the communication terminal 2.

The image rotating unit 216 rotates the omnidirectional image in accordance with the point of interest determined by the point-of-interest converting unit 196. Thereby, the coordinates of the point of interest are moved to the center of the equidistant cylindrical image. A detailed description of the rotation process will be described later with FIG. 35.

The cutout unit 220 cuts out a part (e.g., a central part) of the rotated omnidirectional image to generate a cut-out image. Cutting out a part of an image refers to taking out a certain part of the image, and may also be described as trimming. The cutout unit 220 preferably cuts out a central part of the converted omnidirectional image, to thereby cut out an image corresponding to a part of the omnidirectional image having a certain size and centering around the point of interest.

In the present embodiment, the cutout unit 220 has a function of generating a cut-out image by cutting out a part of an image. As well as this function, the cutout unit 220 may also have a function of reducing the resolution of the image.

The scaling and letterboxing unit 222 executes an enlargement process on the image cut out by the cutout unit 220 in accordance with the resolution and aspect ratio of an image output device (e.g., a display or projector) to which the image is output. The scaling and letterboxing unit 222 further executes a process of adding black bars to the upper and lower sides of the cut-out image to generate an image for display. The output unit 224 outputs (e.g., displays), via an image output interface of the communication terminal 2, the image for display generated through the processing of the scaling and letterboxing unit 222. The processing of the scaling and letterboxing unit 222 may be omitted if the resolution and aspect ratio of the cut-out image match those of the image output device.

In the case of the still image, the image output process by the above-described functional units (i.e., the image rotating unit 216, the cutout unit 220, the scaling and letterboxing unit 222, and the output unit 224) is repeated on the same omnidirectional image at least every time the point of interest changes, or typically at each predetermined time interval, to update the image for display in accordance with the point of interest at the time of the change in the point of interest or at the each predetermined time interval. In the case of the video image, the image output process by the above-described functional units is typically repeated on the omnidirectional image in each of frames to update the image for display.

According to the embodiment, when the photographer 8 tilts or rotates the image capturing device 5a in a certain direction relative to the direction of the image capturing device 5a in the erected state, the point of interest is changed to enable the user to view the omnidirectional image displayed in accordance with the changed point of interest.

The image rotation process of the image rotating unit 216 will be described with FIG. 35.

Figure 35:
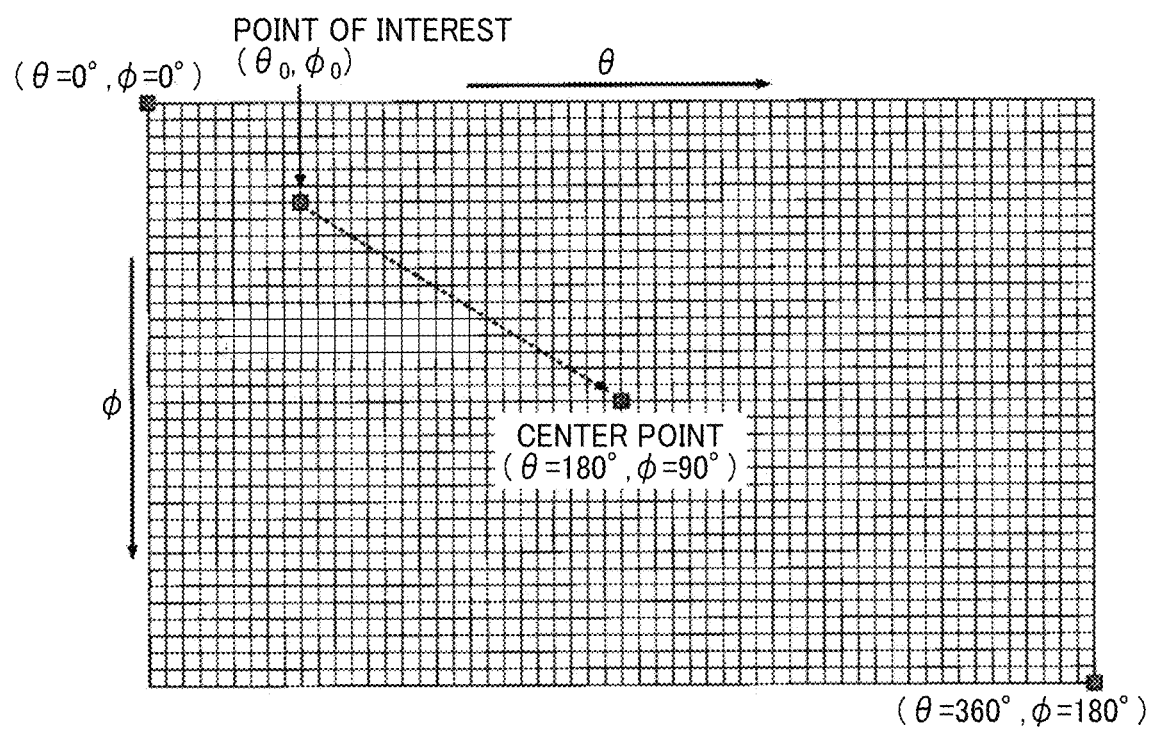
FIG. 35 is a diagram schematically illustrating an example of an image rotation process executed by an image rotating unit of the image capturing device.

FIG. 35 is a diagram schematically illustrating the image rotation process of the image rotating unit 216. Image rotation refers to a process of moving the spherical coordinates of the point of interest to the center of the image. Herein, new coordinates obtained through the image rotation are expressed as $(\theta_N, \varphi_N)$, and the coordinates of the point of interest are expressed as $(\theta_0, \varphi_0)$. Further, given coordinates to be rotated are expressed as $(\theta, \varphi)$. With equations (7) and (8) given below, the coordinates of the point of interest are moved to the center of the image.

[Math. 2]

$$\theta_N = \theta - \theta_0 + 180° \ (\theta - \theta_0 \leq 180°) \quad (7)$$
$$= \theta - \theta_0 - 180° \ (\theta - \theta_0 > 180°)$$

$$\varphi_N = \varphi - \varphi_0 + 90° \ (\varphi - \varphi_0 \leq 90°) \quad (8)$$
$$= \varphi - \varphi_0 - 90° \ (\varphi - \varphi_0 > 90°)$$

With equations (7) and (8), a given pixel is rotated (i.e., moved) by the difference between the coordinates of a center point and the coordinates of the point of interest in the $\theta$ direction and the $\varphi$ direction, as indicated by a broken arrow in FIG. 35.

Figure 36:
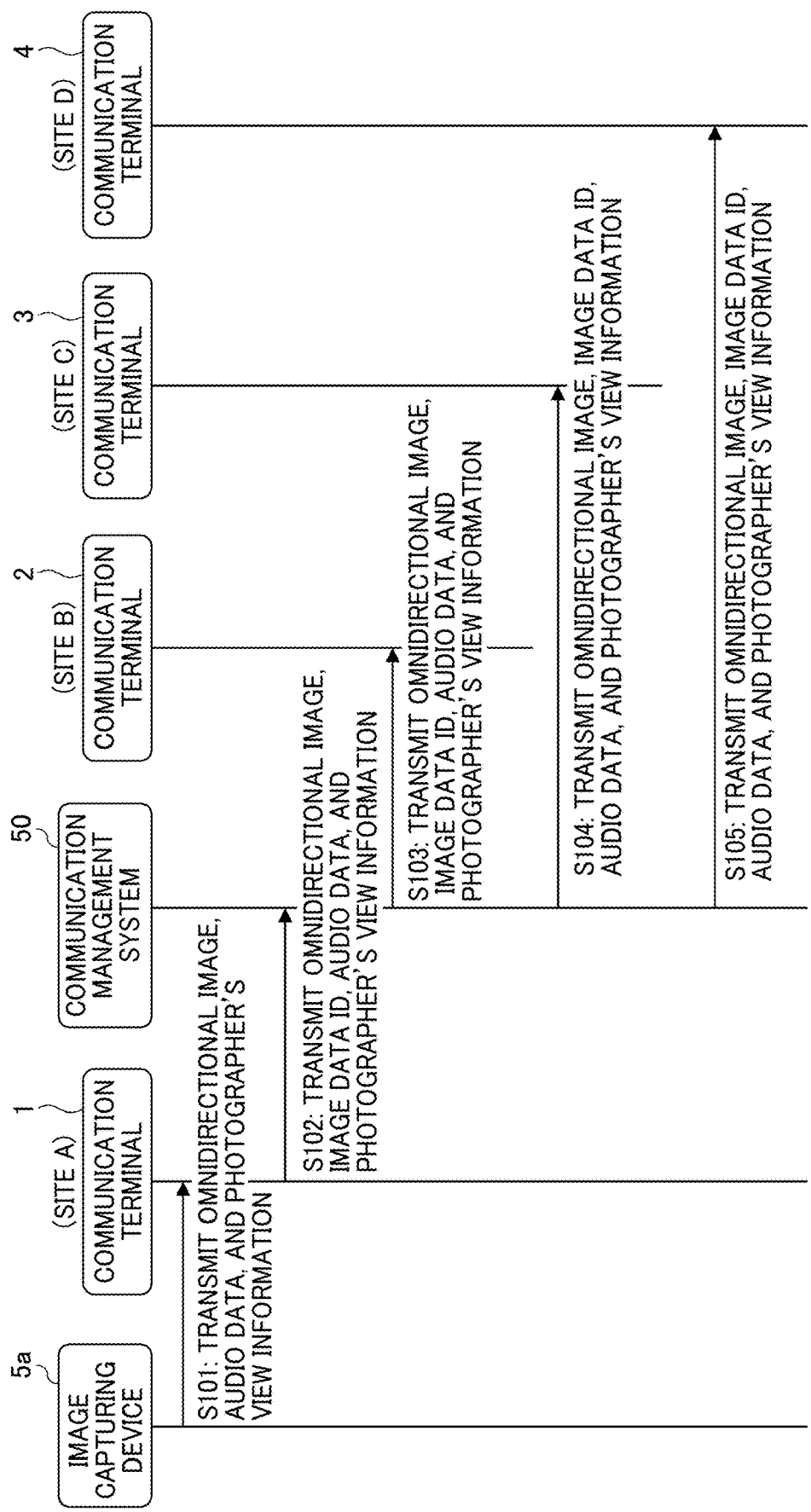
FIG. 36 is a sequence diagram illustrating an exemplary procedure of a process of communicating an omnidirectional image and audio data in a video call in the image communication system.

With reference to FIG. 36, a description will be given of a procedure of a process of transmitting the omnidirectional image and the audio data obtained at the site A to the communication terminals 2 to 4 via the communication management system 50.

FIG. 36 is a sequence diagram illustrating an exemplary procedure of a process of communicating the omnidirectional image and the audio data in a video call. The communication unit 18a of the image capturing device 5a first transmits the omnidirectional image and the audio data to the communication unit 98 of the communication terminal 1 (step S101). The omnidirectional image is obtained from the captured image of a subject (e.g., an object or surroundings). The audio data is obtained from collected sounds. Then, the communication unit 98 of the communication terminal 1 receives the omnidirectional image and the audio data. In the case of the second method of receiving the photographer's view information, the point-of-interest specification determining unit 198 stores the information about which of the photographer's view mode and the free viewpoint mode is selected in the mode management DB 1001a via the storing and reading unit 19a. Further, in the photographer's view mode, the point-of-interest converting unit 196 generates the photographer's view information, which is also transmitted to the communication terminal 1.

Then, the transmitting and receiving unit 91 of the communication terminal 1 transmits to the communication management system 50 the omnidirectional image, the audio data, and if in the photographer's view mode, the photographer's view information received from the image capturing device 5a (step S102). The image data ID for identifying the captured image data of the omnidirectional image to be transmitted is also transmitted in this step. Then, the transmitting and receiving unit 51 of the communication management system 50 receives the omnidirectional image with the image data ID, the audio data, and if in the photographer's view mode, the photographer's view information.

In the case of the first method of receiving the photographer's view information, in response to pressing of the view button 251, the receiving unit 92 stores the information about which of the photographer's view mode and the free viewpoint mode is selected in the storage unit 9000 via the storing and reading unit 99. The calculation unit 97 stores in the viewer's view information DB 9004 the predetermined area information representing the predetermined area T displayed when the omnidirectional image transmitted from the image capturing device 5a is displayed in the display area L4 of the image display screen 250. The thus-stored predetermined area information serves as the photographer's view information.

Then, the transmitting and receiving unit 51 of the communication management system 50 transmits, to the communication terminals 2 to 4 participating in the video call participated in by the communication terminal 1, the omnidirectional image with the image data ID, the audio data, and if in the photographer's view mode, the photographer's view information (steps S103, S104, and S105). The image data ID transmitted here is for identifying the omnidirectional image to be transmitted. Then, the transmitting and receiving unit 71 of the communication terminal 2, the transmitting and receiving unit 31c of the communication terminal 3, and the transmitting and receiving unit 31d of the communication terminal 4 receive the omnidirectional image with the image data ID, the audio data, and if in the photographer's view mode, the photographer's view information. Normally, the communication terminal 1 also receives the omnidirectional image of the site A from the communication management system 50 and displays the omnidirectional image, although illustration thereof is omitted in FIG. 36.

A description will be given of a process of transmitting the photographer's view information in response to detection of the mode switch trigger.

Figure 37A:
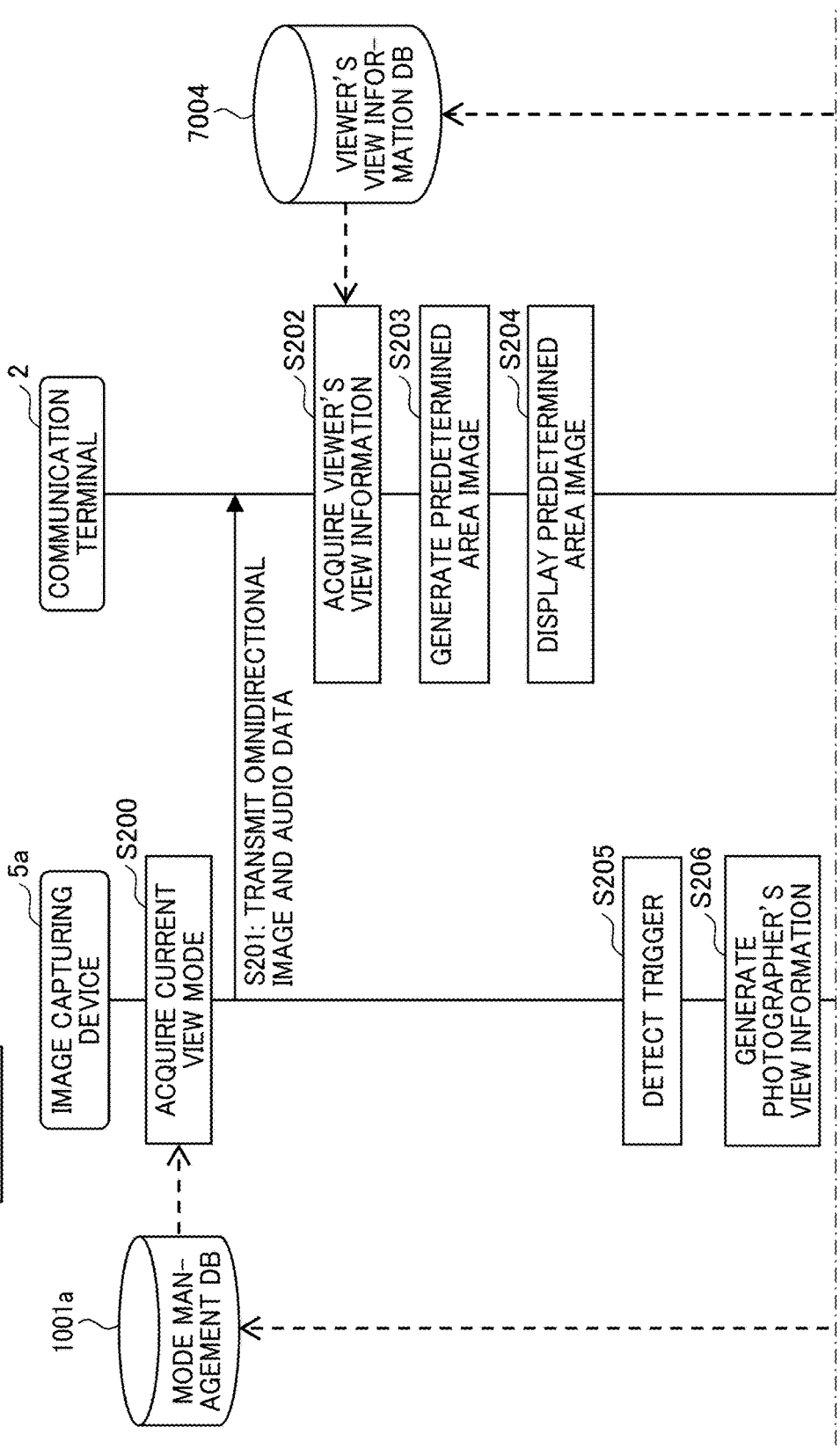
FIGS. 37A and 37B are a sequence diagram illustrating an exemplary procedure of a process of transmitting photographer's view information in response to detection of a mode switch trigger in the image capturing device.
Figure 37B:
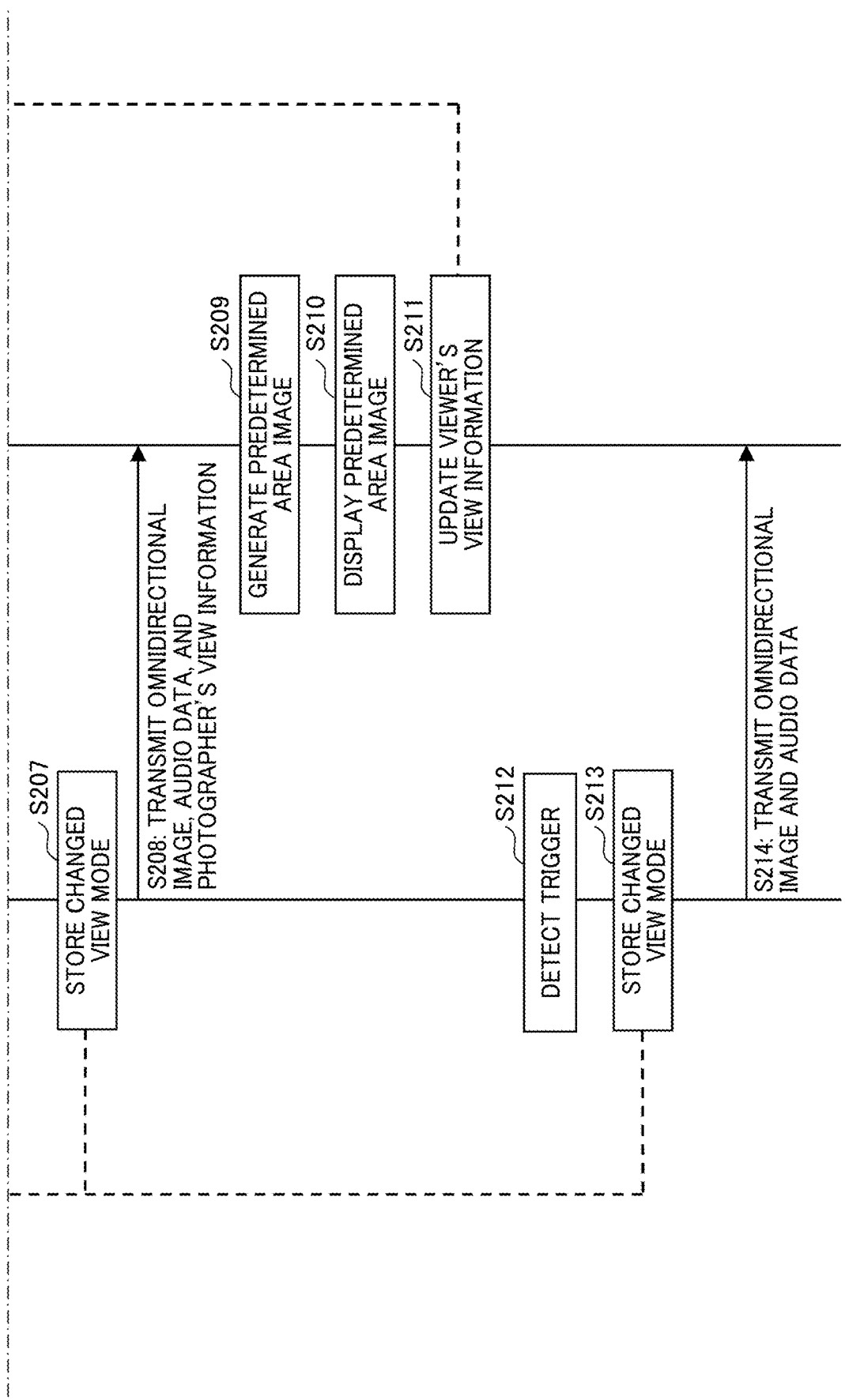

FIGS. 37A and 37B are a sequence diagram illustrating an exemplary procedure of the process of transmitting the photographer's view information in response to detection of the mode switch trigger. FIGS. 37A and 37B illustrate an example in which the view mode switches from the free viewpoint mode to the photographer's view mode in response to the mode switch trigger, and then returns to the free viewpoint mode in response to the mode switch trigger.

With FIGS. 37A and 37B, a description will be given of a case in which the image capturing device 5a detects the mode switch trigger. For convenience of illustration, FIGS. 37A and 37B omit the communication terminal 1, and illustrate the communication terminal 2 to which the photographer's view information is transmitted.

At step S200, the point-of-interest converting unit 196 acquires the current view mode from the mode management DB 1001a. The view mode is currently the free viewpoint mode.

At step S201, since the current view mode is the free viewpoint mode, the point-of-interest converting unit 196 does not generate the photographer's view information, and the communication unit 18a transmits the omnidirectional image and the audio data to the communication terminal 2 via the communication terminal 1.

At step S202, the transmitting and receiving unit 71 of the communication terminal 2 receives the omnidirectional image and the audio data. Since the photographer's view information is not attached to the omnidirectional image, the display control unit 74 of the communication terminal 2 acquires the viewer's view information from the viewer's view information DB 7004.

At step S203, the display control unit 74 generates the predetermined area image based on the viewer's view information.

At step S204, the display control unit 74 displays the predetermined area image on the display 917 of the communication terminal 2.

At step S205, the image capturing device 5a detects the occurrence of the mode switch trigger. As described above with TABLE 1, the trigger for mode switching occurring in the image capturing device 5a is related to the physical button, the gyro sensor 119, or the image information.

At step S206, in response to switching of the view mode to the photographer's view mode due to the occurrence of the mode switch trigger, the point-of-interest converting unit 196 generates the photographer's view information.

At step S207, the point-of-interest specification determining unit 198 or the mode receiving unit 17a stores in the mode management DB 1001a the information indicating that the view mode has switched to the photographer's view mode.

At step S208, since the current view mode is the photographer's view mode, the communication unit 18a transmits the omnidirectional image, the audio data, and the photographer's view information to the communication terminal 2 via the communication terminal 1.

At step S209, the transmitting and receiving unit 71 of the communication terminal 2 receives the omnidirectional image, the audio data, and the photographer's view information. Since the omnidirectional image is attached with the photographer's view information, the display control unit 74 generates the predetermined area image based on the photographer's view information. The display control unit 74 may generate the predetermined area image by employing the method described above with FIG. 35, for example.

At step S210, the display control unit 74 displays the predetermined area image on the display 917.

At step S211, the storing and reading unit 79 stores the photographer's view information in the viewer's view information DB 7004. When the photographer's view mode ends, therefore, it is possible to continue to display the predetermined area image displayed at the end of the photographer's view mode.

At step S212, the image capturing device 5a again detects the occurrence of the mode switch trigger, and the photographer's view mode ends.

At step S213, since the view mode has switched to the free viewpoint mode, the point-of-interest specification determining unit 198 or the mode receiving unit 17a stores in the mode management DB 1001a the information indicating that the current view mode is the free viewpoint mode.

At step S214, since the current view mode is the free viewpoint mode, the point-of-interest converting unit 196 does not generate the photographer's view information, and the communication unit 18a transmits the omnidirectional image and the audio data to the communication terminal 2 via the communication terminal 1.

With the view mode thus switched between the free viewpoint mode and the photographer's view mode in response to the mode switch trigger, the photographer 8 is able to show the other users the object that the photographer 8 wants to show.

In the case of the video image, the image capturing device 5a transmits the omnidirectional image but not the photographer's view information at step S214. The communication terminal 2 is therefore able to detect that the view mode has returned to the free viewpoint mode. In the case of the still image, however, the image capturing device 5*a* does not transmit the omnidirectional image at step S214, making it difficult for the communication terminal 2 to detect that the view mode has returned to the free viewpoint mode. In the case of the still image, therefore, the image capturing device 5*a* may transmit, at step S214, information indicating that the current view mode is the free viewpoint mode. Alternatively, the view mode may be automatically returned to the free viewpoint mode after the lapse of a certain time after the receipt of the photographer's view information by the communication terminal 2.

Figure 38B:
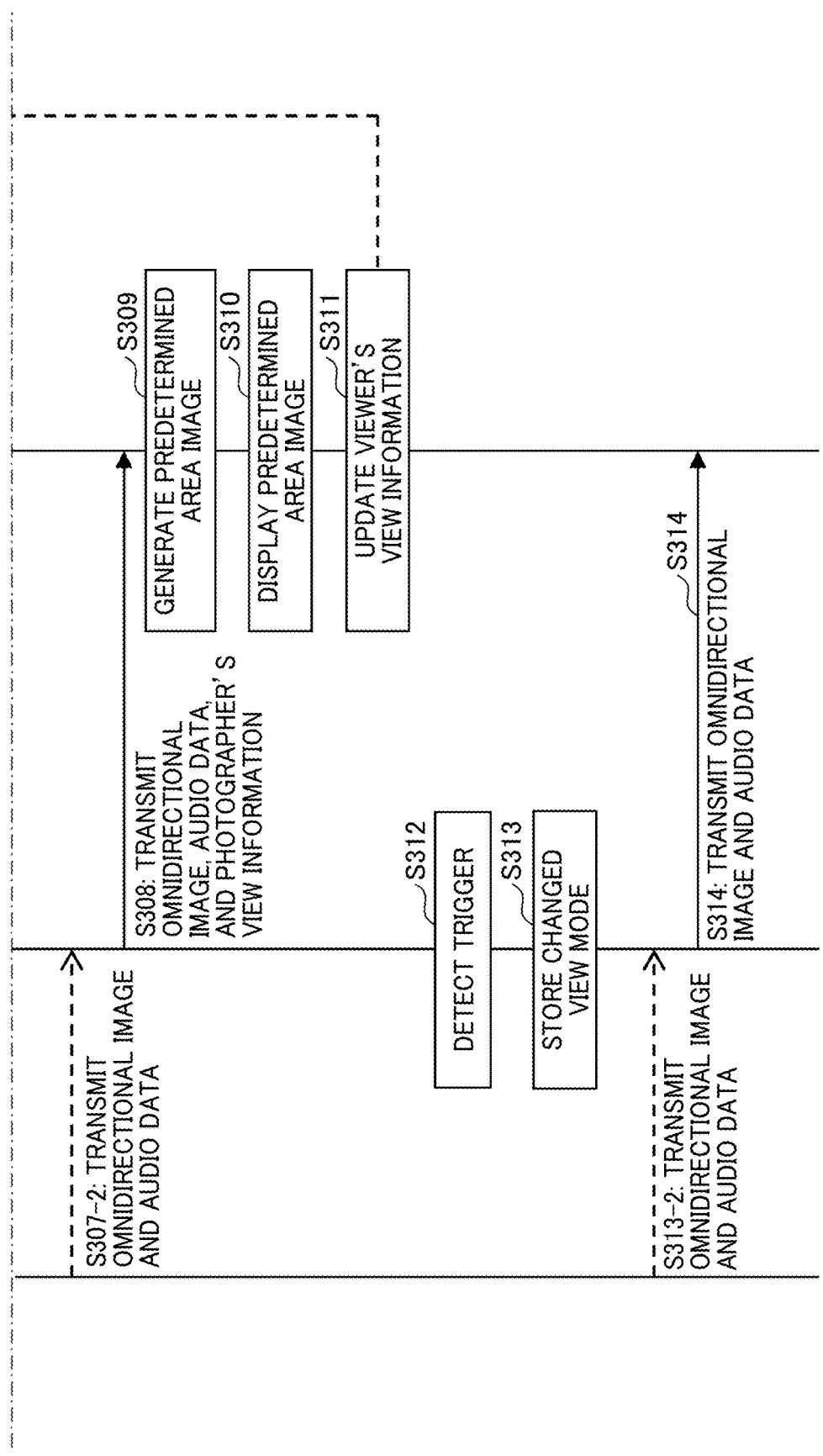

FIGS. 38A and 38B are a sequence diagram illustrating an exemplary procedure of a process of transmitting the photographer's view information when the mode switch trigger is detected by the communication terminal 1. The procedure of FIGS. 38A and 38B is basically similar to that of FIGS. 37A and 37B. The following description of the procedure of FIGS. 38A and 38B will focus on differences from the procedure of FIGS. 37A and 37B.

At step S300, the storing and reading unit 99 of the communication terminal 1 acquires the current view mode from a mode management DB of the communication terminal 1. The view mode is currently the free viewpoint mode.

At step S300-2, the image capturing device 5*a* transmits the omnidirectional image and the audio data to the communication terminal 1. In the case of the still image, the image capturing device 5*a* transmits the omnidirectional image once. In the case of the video image, the image capturing device 5*a* repeatedly transmits the omnidirectional image.

At step S301, the transmitting and receiving unit 91 of the communication terminal 1 transmits the omnidirectional image and the audio data to the communication terminal 2.

The following steps S302 to S304 may be similar to steps S202 to S204 in FIG. 37A.

At step S305, the communication terminal 1 detects the occurrence of the mode switch trigger. As illustrated in TABLE 1, the trigger for mode switching occurring in the communication terminal 1 is related to the software button or the image information.

At step S306, in response to switching of the view mode to the photographer's view mode due to the occurrence of the mode switch trigger, the storing and reading unit 99 reads the viewer's view information from the viewer's view information DB 9004. The thus-read viewer's view information serves as the photographer's view information.

At step S307, the storing and reading unit 99 stores in the mode management DB of the communication terminal 1 the information indicating that the view mode has switched to the photographer's view mode.

At step S307-2, the image capturing device 5*a* transmits the omnidirectional image and the audio data to the communication terminal 1. In the case of the still image, the image capturing device 5*a* transmits the omnidirectional image once. In the case of the video image, the image capturing device 5*a* repeatedly transmits the omnidirectional image.

At step S308, since the current view mode is the photographer's view mode, the transmitting and receiving unit 91 of the communication terminal 1 transmits the omnidirectional image, the audio data, and the photographer's view information to the communication terminal 2.

The following steps S309 to S311 may be similar to steps S209 to S211 in FIG. 37B.

At step S312, the communication terminal 1 again detects the occurrence of the mode switch trigger, and the photographer's view mode ends.

At step S313, since the view mode has switched to the free viewpoint mode, the storing and reading unit 99 stores the information indicating that the view mode has switched to the free viewpoint mode in the mode management DB of the communication terminal 1.

The following steps S313-2 and S314 may be similar to steps S300-2 and S301 in FIG. 38A.

As described above, the communication terminal 1 is also capable of detecting the mode switch trigger, enabling the photographer 8 to show the other users the object that the photographer 8 wants to show.

A process of the image capturing device 5*a* will be described with FIG. 39.

Figure 39:
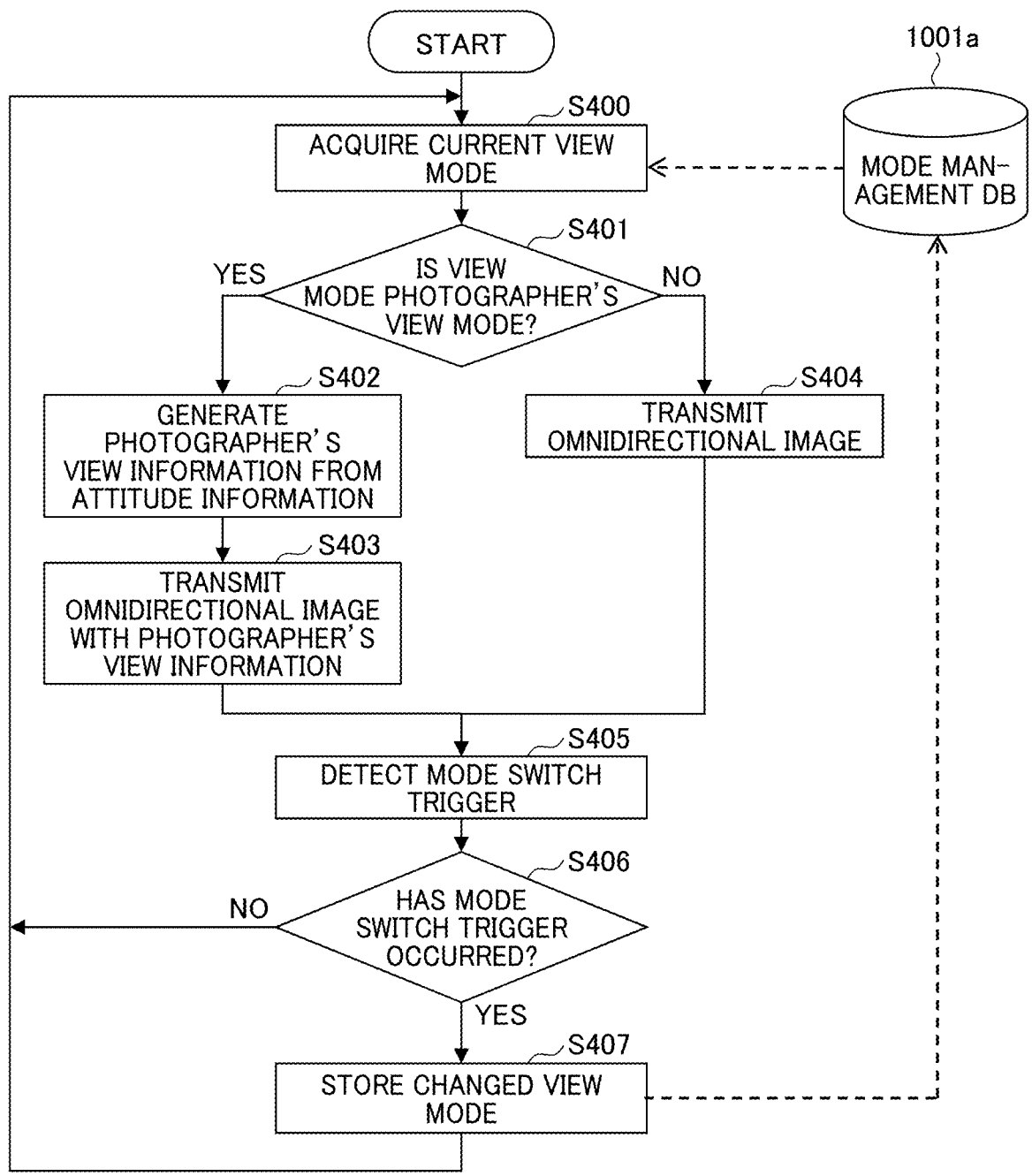
FIG. 39 is a flowchart illustrating an exemplary procedure of a process by the image capturing device of detecting the mode switch trigger and switching a view mode.

FIG. 39 is a flowchart illustrating an exemplary procedure of a process by the image capturing device 5*a* of detecting the mode switch trigger and switching the view mode. The process of FIG. 39 starts after the omnidirectional image to be transmitted is prepared, for example.

The storing and reading unit 19*a* first acquires the information of the current view mode from the mode management DB 1001*a* (step S400).

The point-of-interest converting unit 196 determines whether the current view mode is the photographer's view mode (step S401). If the current view mode is the photographer's view mode (YES at step S401), the point-of-interest converting unit 196 generates the photographer's view information from the attitude information (step S402).

The point-of-interest converting unit 196 attaches the photographer's view information to the image data. Then, the communication unit 18*a* transmits the omnidirectional image generated from the image data, the audio data, and the photographer's view information to the communication terminals 2 to 4 via the communication terminal 1 (step S403).

If the current view mode is the free viewpoint mode at step S401 (NO at step S401), the point-of-interest converting unit 196 does not generate the photographer's view information, and the communication unit 18*a* transmits the omnidirectional image and the audio data to the communication terminals 2 to 4 (step S404).

The point-of-interest specification determining unit 198 or the mode receiving unit 17*a* detects the mode switch trigger (step S405).

If the occurrence of the mode switch trigger is detected (YES at step S406), the storing and reading unit 99 stores the current view mode in the mode management DB 1001*a* (step S407).

If the mode switch trigger is detected by the communication terminal 1, the procedure is modified such that the photographer's view information is read from the viewer's view information DB 9004 at step S402, but the other steps of the procedure are similar to those described above.

A process of the communication terminal 2 will be described with FIG. 40.

Figure 40:
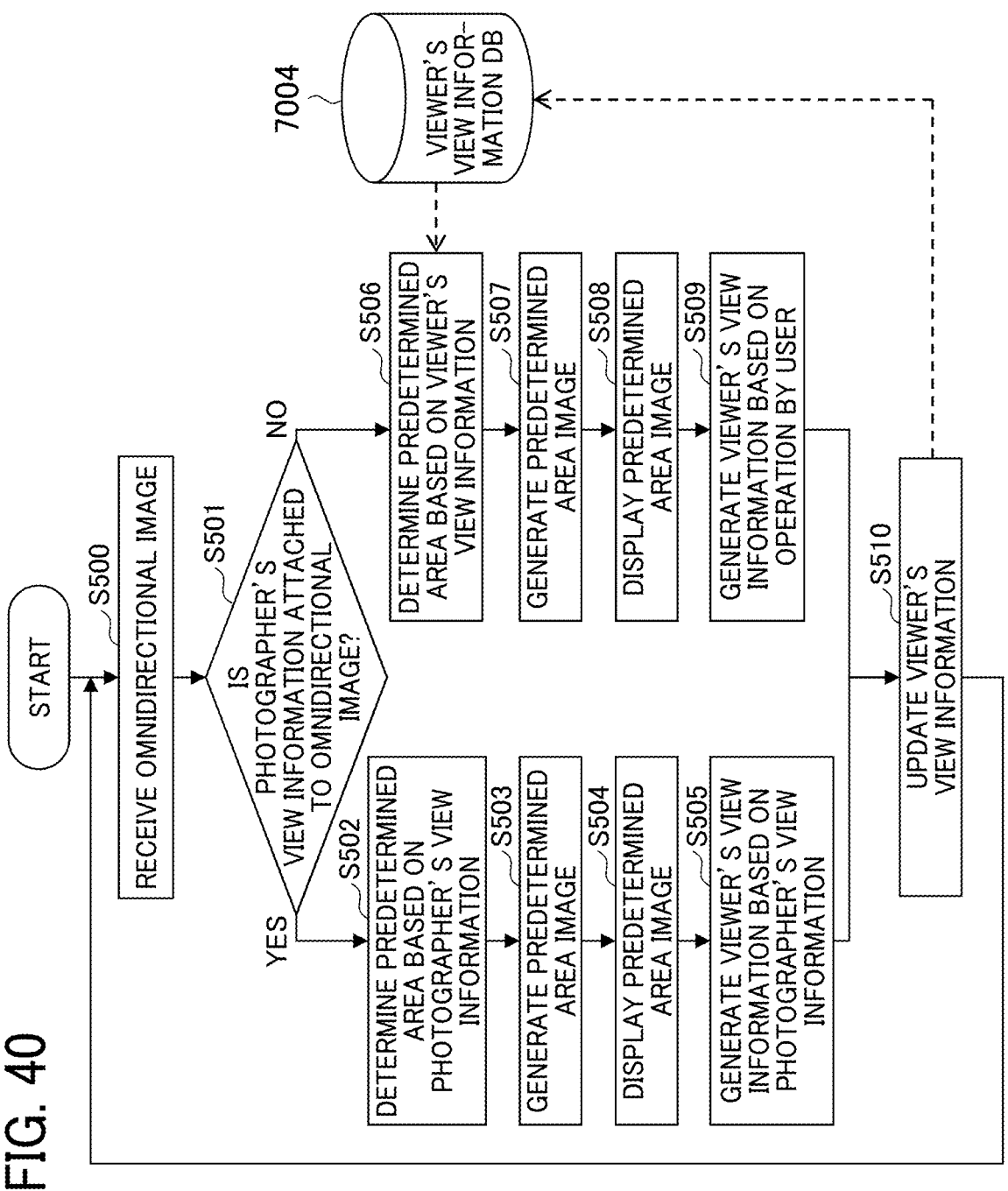
FIG. 40 is a flowchart illustrating an exemplary procedure of a process by a communication terminal of the image communication system of displaying the omnidirectional mage in accordance with the presence or absence of the photographer's view information.

FIG. 40 is a flowchart illustrating an exemplary procedure of a process by the communication terminal 2 of displaying the omnidirectional image in accordance with the presence or absence of the photographer's view information. The process of FIG. 40 is executed while the communication terminal 2 is participating in a communication session, for example. This processing procedure similarly applies to the communication terminals 1, 3, and 4.

The transmitting and receiving unit 71 of the communication terminal 2 receives the omnidirectional image (step S500). The determination unit 75 of the communication terminal 2 determines whether photographer's view information is attached to the received omnidirectional image (step S501).

If the photographer's view information is attached to the received omnidirectional image (YES at step S501), the display control unit 74 moves the point of interest, as described above with FIG. 35, for example, and determines the predetermined area T (step S502). Thereby, the point of interest is forcibly displayed irrespective of the predetermined area image displayed on the communication terminal 2 until the receipt of the photographer's view information.

The display control unit 74 then performs perspective projection transformation on the image of the predetermined area T to generate a predetermined area image (step S503).

Then, the display control unit 74 displays the thus-generated predetermined area image on the display 917 (step S504).

The calculation unit 77 generates the viewer's view information based on the photographer's view information (step S505). The photographer's view information used at step S502 is directly used as the viewer's view information.

The storing and reading unit 79 updates the viewer's view information in the viewer's view information DB 7004 with the photographer's view information (step S510).

If the photographer's view information is not attached to the omnidirectional image at step S501 (NO at step S501), the storing and reading unit 79 acquires the viewer's view information from the viewer's view information DB 7004. Then, the display control unit 74 calculates the predetermined area T based on the viewer's view information similarly as at step S502 (step S506).

Then, the display control unit 74 performs perspective projection transformation on the image of the predetermined area T to generate a predetermined area image (step S507).

The display control unit 74 then displays the thus-generated predetermined area image on the display 917 (step S508).

If the user 9b of the communication terminal 2 changes the predetermined area T of the omnidirectional image, the receiving unit 72 receives the change, and the calculation unit 77 generates the viewer's view information based on the changed predetermined area T (step S509).

The storing and reading unit 79 updates the viewer's view information in the viewer's view information DB 7004 with the viewer's view information calculated by the calculation unit 77 (step S510).

As described above, in response to receipt of the photographer's view information, the communication terminal 2 automatically displays the predetermined area T specified by the photographer's view information. Accordingly, the user 9b is able to view the object that the photographer 8 wants to show.

A method of notifying the photographer's view mode will be described.

In the examples illustrated in FIGS. 37A to 38B, the transmission of the photographer's view information serves as information notifying that the current view mode is the photographer's view mode. However, the photographer's view information is intended to specify the predetermined area T, and thus may also be used when the photographer's view mode is not selected. The image capturing device 5a therefore may transmit to the communication terminals 2 to 4 information explicitly indicating that the current view mode is the photographer's view mode.

Figure 41A:
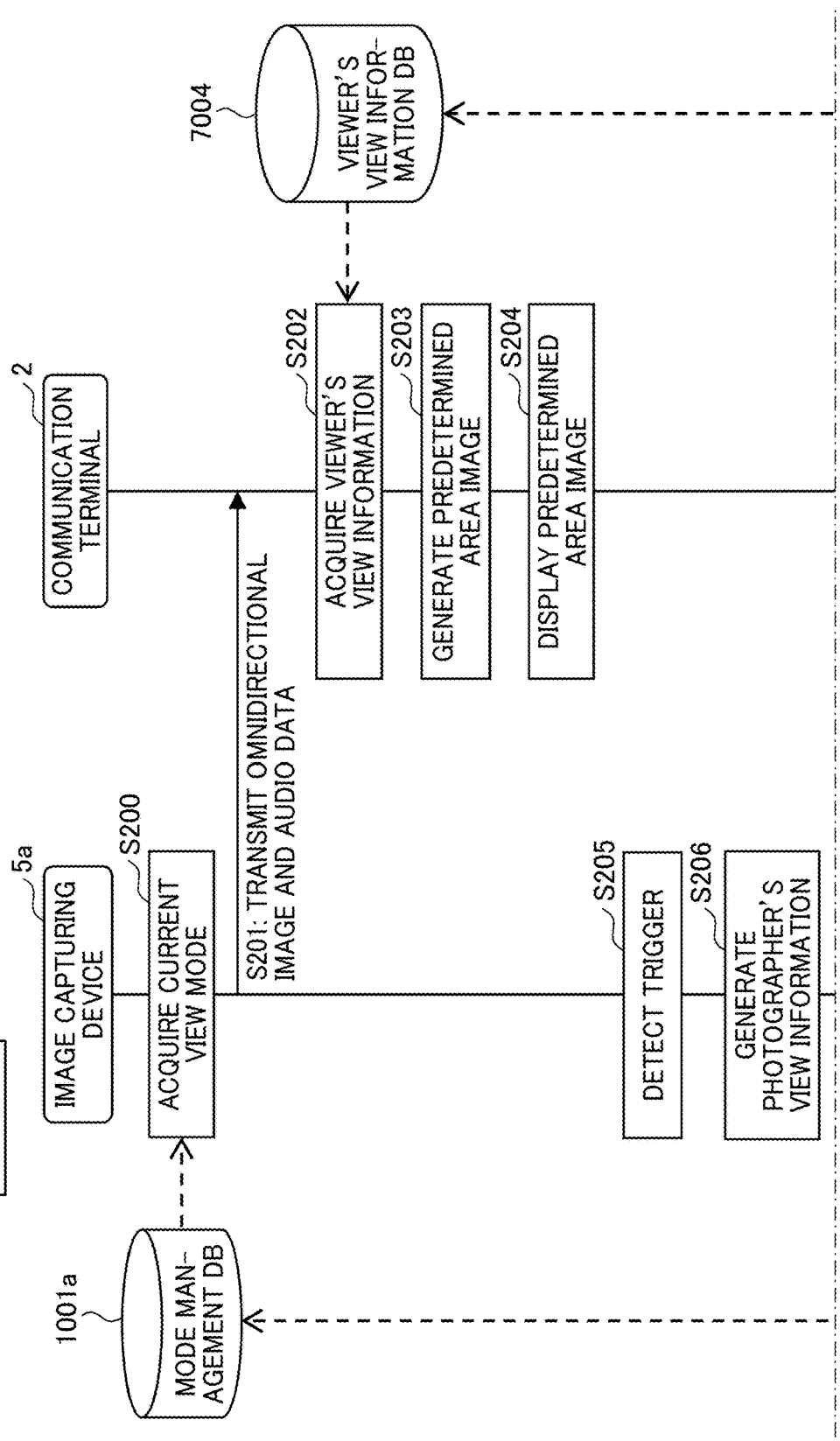
FIGS. 41A and 41B are a sequence diagram illustrating an exemplary procedure of a process of transmitting the photographer's view information and a photographer's view mode notification in response to detection of the mode switch trigger in the image capturing device.
Figure 41B:
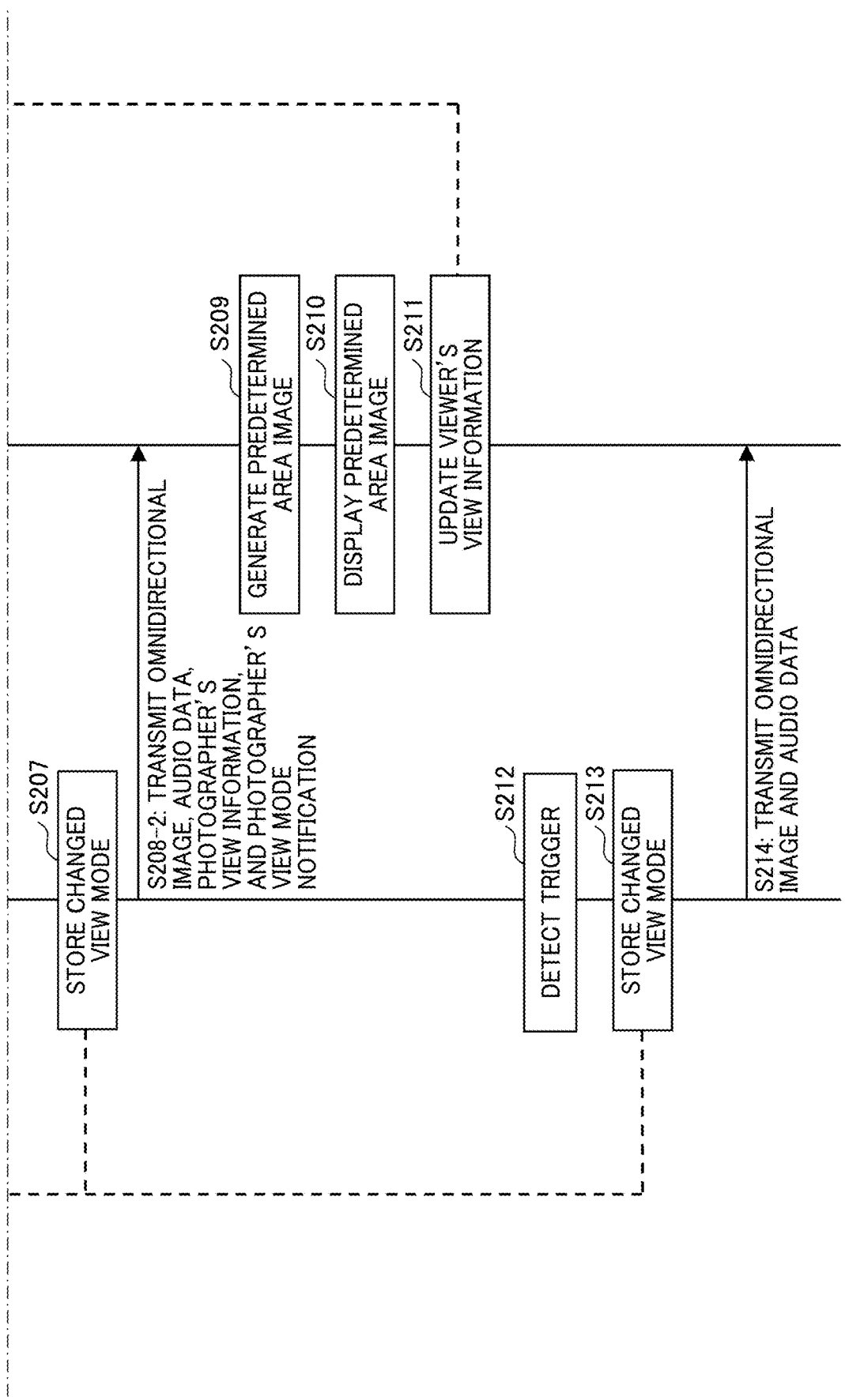

FIGS. 41A and 41B are a sequence diagram illustrating an exemplary procedure of a process of transmitting the photographer's view information and a photographer's view mode notification. The procedure of FIGS. 41A and 41B is similar to that of FIGS. 37A and 37B except that the photographer's view mode notification is transmitted at step S208-2 in addition to the omnidirectional image and the photographer's view information. The photographer's view mode notification is information notifying the communication terminals 2 to 4 that the current view mode is the photographer's view mode. In response to receipt of the photographer's view mode notification, therefore, the communication terminals 2 to 4 determine that the photographer's view information is the information specifying the predetermined area T, i.e., the information to be used to display the predetermined area Tin the display area. Therefore, the communication terminals 2 to 4 automatically display the predetermined area image.

An example of display of the omnidirectional image on a communication terminal will be described.

Figure 42:
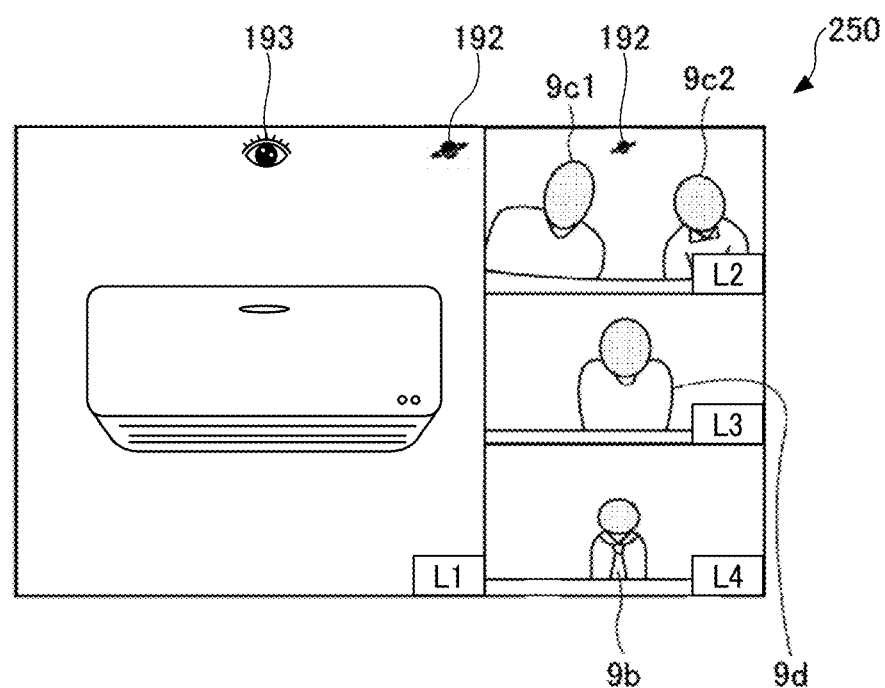
FIG. 42 is a diagram illustrating an example of an image display screen displayed on a display of a communication terminal at one site of the image communication system.

FIG. 42 illustrates an example of the image display screen 250 displayed on the display 917 of the communication terminal 2 at the site B. In the following description with FIG. 42, description of the same components as those in FIG. 27 will be omitted.

The left display area L1 of the image display screen 250 displays the omnidirectional image of the site A. The upper-right display area L2 of the image display screen 250 displays the omnidirectional image of the site C. The middle-right display area L3 of the image display screen 250 displays the image of the site D. The lower-right display area L4 of the image display screen 250 displays the image of the site B, at which the communication terminal 2 is located.

The display areas L1 and L2 display the omnidirectional image icon 192. The omnidirectional image icon 192 indicates that the image displayed in the corresponding display area is the omnidirectional image. In the free viewpoint mode, the user 9b is able to change the predetermined area T. The display area L1 further displays a point-of-interest icon 193. The point-of-interest icon 193 is displayed by the display control unit 74 when the photographer's view information is transmitted to the communication terminal 2. The point-of-interest icon 193 indicates that the current view mode is the photographer's view mode. With the point-of-interest icon 193, the user 9b understands that the point of interest is currently displayed, and that the predetermined area T is not allowed to be changed or there is a restriction on such a change.

That the predetermined area T is not allowed to be changed means that the receiving unit 72 does not accept a change in the predetermined area T displayed in the display area, or that the receiving unit 72 accepts a change in the predetermined area T, but when the user 9b stops the operation of changing the predetermined area T, the point of interest converted by the point-of-interest converting unit 196 is cut out from the omnidirectional image by the cutout unit 220 and displayed again. For example, the user 9b is able to display a desired predetermined area T while dragging the predetermined area T with a mouse of the communication terminal 2 kept clicked on the predetermined area T or while swiping the predetermined area T with a finger of the user 9b kept touched on the predetermined area T.

The predetermined area image based on the photographer's view information continues to be displayed during the photographer's view mode. Alternatively, the user 9b may be allowed to stop the forced display of the predetermined area image based on the photographer's view information. In this case, the communication terminal 2 is equipped with a predetermined button, for example. When the user 9b presses the predetermined button once, the forced display of the predetermined area image based on the photographer's view information stops, allowing the user 9b to display a desired predetermined area T. Further, when the user 9b presses the predetermined button again, the predetermined area image based on the photographer's view information is forcibly displayed.

According to the embodiment, video communication between multiple sites is possible, as illustrated in FIG. 42. Therefore, when the users 9b and 9d know each other but are unable to physically meet in the same place, for example, the users 9b and 9d are able to communicate as if in the same space. For example, the users 9b and 9d are able to see and comment on the same object from the different sites B and D.

A method of controlling display of the predetermined area T based on priority will be described.

In the present embodiment, when the photographer 8 using the communication terminal 1 switches the view mode to the photographer's view mode, the other communication terminals 2 to 4 display the predetermined area T based on the photographer's view information. As described above with reference to the image display screen 250 in FIG. 42, however, the users of the communication terminals 2 to 4 may display a desired predetermined area T after the predetermined area T based on the photographer's view information is displayed.

In some cases, however, it is desirable if the photographer 8 and the other users at the sites A to D are able to discuss while watching the same object. Therefore, a predetermined area T specified by a certain user with a communication terminal may be shared by the other communication terminals. Predetermined area information representing the predetermined area T specified by a certain user will hereinafter be referred to as the third-party's view information (an example of second predetermined area information). The third-party's view information may be transmitted by a user with an operation right, such as a user of a communication terminal with the largest amount of audio data or a user who claims the operation right by pressing a predetermined button of the corresponding communication terminal, for example.

According to the above-described method of setting the operation right, a user without the operation right may also be able to transmit the third-party's view information. If a plurality of users transmit the third-party's view information at a desired time without the operation right, however, the predetermined area T is frequently changed in the communication terminals 2 to 4 sharing the same omnidirectional image, distracting the users from viewing the screen. Therefore, priority is set for display of the predetermined area T. The communication terminals 1 to 4 are assigned with different priority values. When transmitting the third-party's view information, each of the communication terminals 1 to 4 attaches the corresponding priority value to the third-party's view information. In this case, the communication terminal 1 also transmits the photographer's view information. Then, the communication terminals 1 to 4 display the predetermined area T based on the third-party's view information from the communication terminal with the highest priority value.

The communication terminal 1 is assigned with a certain priority value similarly to the communication terminals 2 to 4. However, the photographer's view information of the communication terminal 1 should be given priority, and thus the communication terminal 1 is basically given the highest priority value. As an exception, however, the priority value of a communication terminal used by an important client, for example, may be set to be higher than that of the communication terminal 1 used by the photographer 8.

In the free viewpoint mode, therefore, it is possible to share the predetermined area T based on the predetermined area information from one of the communication terminals 1 to 4 having the highest priority value. In the photographer's view mode, it is possible to share the predetermined area T based on the photographer's view information, and also to share the predetermined area T specified by another user of a communication terminal assigned with an exceptionally high priority value.

The priority value is information for adjusting the predetermined area T to be displayed by the communication terminals 1 to 4 when the third-party's view information (and the photographer's view information) are transmitted substantially at the same time from two or more of the communication terminals 1 to 4. If the third-party's view information (and the photographer's view information) are not transmitted substantially at the same time, i.e., if the communication terminals 1 to 4 receive the third-party's view information (and the photographer's view information) with a certain time difference from each other, the third-party's view information received first is used irrespective of the priority value.

FIGS. 43A and 43B are a sequence diagram illustrating an exemplary procedure of a process by the communication terminals 1 to 4 of generating the predetermined area image T based on the priority value. In FIGS. 43A and 43B, a smaller priority value represents a higher priority.

Steps S601 to S607 are executed in the free viewpoint mode. At steps S601 to S603, the transmitting and receiving unit 91 of the communication terminal 1 transmits the omnidirectional image, the third-party's view information, and a priority value P3 to the communication terminals 2 to 4.

At steps S604 to S606, the transmitting and receiving unit 71 of the communication terminal 2 transmits the third-party's view information and a priority value P2 to the communication terminals 1, 3, and 4 substantially at the same time as the transmission of the above-described information from the communication terminal 1.

Since the priority value P2 represents a higher priority than that of the priority value P3, the communication terminals 1 to 4 display the predetermined area T of the omnidirectional image based on the third-party's view information of the communication terminal 2 (step S607). Thereby, the users are able to share the predetermined area T based on the third-party's view information of the user (i.e., communication terminal) assigned with the highest priority.

At steps S608 to S621, the photographer's view information is transmitted. At steps S608 to S610, the transmitting and receiving unit 91 of the communication terminal 1 transmits the omnidirectional image, the photographer's view information, and a priority value P1 to the communication terminals 2 to 4.

At steps S611 to S613, the transmitting and receiving unit 71 of the communication terminal 2 transmits the third-party's view information and the priority value P2 to the communication terminals 1, 3, and 4 substantially at the same time as the transmission of the above-described information from the communication terminal 1.

Since the priority value P1 represents a higher priority than that of the priority value P2, the communication terminals 1 to 4 display the predetermined area T of the omnidirectional image based on the photographer's view information of the communication terminal 1 (step S614).

Thereby, the users are able to share the predetermined area T specified by the photographer 8.

Then, at steps S615 to S617, the transmitting and receiving unit 91 of the communication terminal 1 transmits the omnidirectional image, the photographer's view information, and the priority value P1 to the communication terminals 2 to 4.

At steps S618 to S620, the transmitting and receiving unit 31*c* of the communication terminal 3 transmits the third-party's view information and a priority value P0 to the communication terminals 1, 2, and 4 substantially at the same time as the transmission of the above-described information from the communication terminal 1.

Since the priority value P0 represents a higher priority than that of the priority value P1, the communication terminals 1 to 4 display the predetermined area T of the omnidirectional image based on the third-party's view information of the communication terminal 3 (step S621). Even in the photographer's view mode, therefore, the users are able to share the predetermined area T specified by a user other than the photographer 8.

As described above, in the free viewpoint mode, the communication terminals 1 to 4 at the sites A to D are able to share the predetermined area T based on the predetermined area information of one of the communication terminals 1 to 4 with the highest priority value. In the photographer's view mode, the communication terminals 1 to 4 are able to share the predetermined area T specified by the user (i.e., communication terminal) assigned with an exceptionally high priority, while preferentially sharing the predetermined area T based on the photographer's view information.

As described above, according to the image communication system 10 of the embodiment, when the photographer 8 switches the view mode to the photographer's view mode, the communication terminal 1 transmits the omnidirectional image and the photographer's view information to the other communication terminals 2 to 4 at the sites B to D. The communication terminals 2 to 4 at the sites B to D receive the omnidirectional image and the photographer's view information, and display omnidirectional image based on the photographer's view information. Thereby, the image display operation of the communication terminals 2 to 4 at the sites B to D is switched.

The image communication system 10 of the embodiment is widely applicable to various situations in which an object at a given site is pointed with the image capturing device 5*a* and the image of the object captured by the image capturing device 5*a* is shared by users at multiple sites, such as viewing of a real estate property, an exhibition, a show, a factory tour, sightseeing, and an inspection, for example.

In the above-described embodiment, the object is pointed by a person with the image capturing device 5*a*. Alternatively, the object may be pointed by a machine, robot, or animal. For example, the image capturing device 5*a* may be fixed to the front side in the traveling direction of a movable machine to constantly display the image of an object present in front of the machine in the traveling direction, and if necessary, the image may be rotated to check the surroundings of the machine. In this case, switching between display and non-display of the coordinates of the point of interest may be performed by a device or apparatus that receives the omnidirectional image.

Further, in the above-described embodiment, the point of interest is displayed as a part of the omnidirectional image, for example. However, the omnidirectional image is not necessary required to be a 360-degree surrounding image. For example, a single hemispherical image may be captured, or the direction of capturing the 360-degree image may be limited to the horizontal direction. Further, a planar image with more pixels than the number of pixels covered by one display may be used.

The blocks in the exemplary configurations illustrated in drawings such as FIGS. 15A to 16B and FIG. 32 are divided in accordance with major functions of the image communication system 10 to facilitate the understanding of the processing of the image communication system 10. The present invention is not limited by how the processing units are divided or the names of the processing units. The processing of the image communication system 10 may be divided into a larger number of processing units depending on processes to be performed. Further, a processing unit of the image communication system 10 may be sub-divided to include more processes.

The image communication system 10 may include a plurality of communication management systems 50. Further, the functions of the communication management system 50 may be dividedly allocated to a plurality of servers. Further, the image communication system 10 may include a relay device that relays the image data and the audio data.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:
1. An image communication system comprising:
a first communication terminal configured to acquire an image captured by an image capturing device; and
a second communication terminal configured to receive the image from the first communication terminal via a network and display the image on a screen of a display,
the first communication terminal including first circuitry configured to
in response to receipt of an operation of switching a view mode related to viewing of the image, transmit the image and first viewable area information to the second communication terminal, the first viewable area information being related to a viewable area of the image to be displayed on the screen by the second communication terminal, and
the second communication terminal including second circuitry configured to
receive the image and the first viewable area information, and
display the viewable area of the image on the screen based on the received first viewable area information,
wherein, in addition to the first viewable area information, the first circuitry of the first communication terminal transmits to the second communication terminal a notification indicating that the view mode is a mode for displaying the viewable area of the image on the screen based on the first viewable area information, and wherein, in response to receipt of the notification, the second circuitry of the second communication terminal displays the viewable area of the image on the screen based on the first viewable area information.

2. The image communication system of claim 1, wherein the first circuitry of the first communication terminal is configured to transmit the image, without the first viewable area information, and in response to receipt of the image without the first viewable area information, the second circuitry of the second communication terminal displays on the screen an area determined by a user of the second communication terminal.

3. The image communication system of claim 1, wherein the second communicating terminal shares the viewable area of the image with another communication terminal that transmits second viewable area information, and wherein the second circuitry of the second communication terminal receives, in addition to the first viewable area information and the image, a first priority value from the first communication terminal, receives the second viewable area information and a second priority value from the another communication terminal, and displays the viewable area of the image on the screen based on one of the first viewable area information and the second viewable area information having a higher priority value.

4. The image communication system of claim 1, further comprising an image capturing device configured to capture the image, the image capturing device being included in or separated from the first communication terminal, wherein the first viewable area information is determined by an imaging direction of the image capturing device, the imaging direction being identified by attitude information of the image capturing device that captures the image.

5. The image communication system of claim 4, wherein the image capturing device defines a point of interest in the image, and converts the defined point of interest into the first viewable area information in accordance with the attitude information of the image capturing device.

6. The image communication system of claim 5, wherein the image capturing device executes zenith correction on the image with the attitude information, and converts the defined point of interest into the first viewable area information with a result of the zenith correction.

7. The image communication system of claim 6, wherein the image capturing device includes an imaging element, and the image capturing device executes zenith correction on a conversion table with the attitude information, the conversion table being used to convert coordinate values of the imaging element into coordinate values in a spherical coordinate system, determines the defined point of interest as the coordinate values of the imaging element, and converts the defined point of interest into coordinate values in a spherical coordinate system with the conversion table subjected to the zenith correction with the attitude information.

8. The image communication system of claim 6, wherein the image capturing device includes an imaging element, and the image capturing device executes the zenith correction to match an upper side of the image with an upper side of an actual space irrespective of an attitude of the image capturing device, and defines the point of interest as coordinate values of the imaging element corresponding to an image of an object pointed by an upper side in a longitudinal direction of the image capturing device.

9. The image communication system of claim 1, wherein the first circuitry of the first communication terminal displays the image on a screen of a display, determines the viewable area of the image based on an operation performed on the image displayed on the screen, and determines the first viewable area information based on the determined viewable area of the image.

10. A communication terminal communicable with a counterpart communication terminal, the communication terminal comprising circuitry configured to acquire an image captured by an image capturing device, and in response to receipt of an operation of switching a view mode related to viewing of the image, transmit first viewable area information to the counterpart communication terminal, the first viewable area information being related to a viewable area of the image to be displayed on a screen of a display by the counterpart communication terminal, transmit to the counterpart communication terminal a notification indicating that the view mode is a mode for displaying the viewable area of the image on the screen based on the first viewable area information.

11. A mode switching method executed by a communication terminal communicable with a counterpart communication terminal, the mode switching method comprising:

acquiring an image captured by an image capturing device;

in response to receipt of an operation of switching a view mode related to viewing of the image, transmitting first viewable area information to the counterpart communication terminal, the first viewable area information being related to a viewable area of the image to be displayed on a screen of a display by the counterpart communication terminal; and transmitting to the counterpart communication terminal a notification indicating that the view mode is a mode for displaying the viewable area of the image on the screen based on the first viewable area information.

12. The method of claim 11, further comprising:

transmitting the image, without the first viewable area information.

13. The method of claim 11, further comprising:

capturing the image using the image capturing device, wherein the first viewable area information is determined by an imaging direction of the image capturing device, the imaging direction being identified by attitude information of the image capturing device that captures the image.

14. The method of claim 13, further comprising:

defining, by the image capturing device, a point of interest in the image, and converting, by the image capturing device, the defined point of interest into the first viewable area information in accordance with the attitude information of the image capturing device.

15. The method of claim 14, further comprising:
executing, by the image capturing device, zenith correction on the image with the attitude information, and
converting, by the image capturing device, the defined point of interest into the first viewable area information with a result of the zenith correction.

16. The method of claim 11, further comprising:
displaying the image on a screen of a display,
determining the viewable area of the image based on an operation performed on the image displayed on the screen, and
determining the first viewable area information based on the determined viewable area of the image.

* * * * *